US008833348B2

(12) United States Patent
Iwazaki et al.

(10) Patent No.: US 8,833,348 B2
(45) Date of Patent: Sep. 16, 2014

(54) FUEL INJECTION AMOUNT CONTROL SYSTEM AND FUEL INJECTION AMOUNT CONTROL DEVICE FOR MULTI-CYLINDER INTERNAL COMBUSTION ENGINE

(75) Inventors: Yasushi Iwazaki, Ebina (JP); Hiroshi Miyamoto, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 591 days.

(21) Appl. No.: 13/194,923

(22) Filed: Jul. 30, 2011

(65) Prior Publication Data

US 2012/0024272 A1 Feb. 2, 2012

(30) Foreign Application Priority Data

Jul. 30, 2010 (JP) ................................ 2010-171579

(51) Int. Cl.

*F02D 41/14* (2006.01)
*F02D 41/00* (2006.01)
*F02D 41/18* (2006.01)
*F02D 41/24* (2006.01)
*F02D 41/30* (2006.01)
*G01N 27/00* (2006.01)

(52) U.S. Cl.

CPC ...... *F02D 41/1456* (2013.01); *F02D 2200/101* (2013.01); *F02D 41/0085* (2013.01); *F02D 2041/1432* (2013.01); *F02D 41/182* (2013.01); *F02D 41/2454* (2013.01); *F02D 41/1441* (2013.01); *F02D 41/1401* (2013.01)

USPC .......................................... 123/703; 701/103

(58) Field of Classification Search

USPC ........... 123/703, 690, 691, 700, 704; 60/276; 701/103–105

See application file for complete search history.

(56) References Cited

U.S. PATENT DOCUMENTS

| | | | | |
|---|---|---|---|---|
| 6,668,812 | B2 * | 12/2003 | Javaherian | 123/673 |
| 7,152,594 | B2 | 12/2006 | Anilovich et al. | |
| 8,452,517 | B2 * | 5/2013 | Sawada et al. | 123/692 |
| 8,583,348 | B2 * | 11/2013 | Iwazaki et al. | 701/103 |
| 8,694,226 | B2 * | 4/2014 | Kurahashi et al. | 701/103 |

FOREIGN PATENT DOCUMENTS

| | | | |
|---|---|---|---|
| JP | 11072473 | A | 3/1999 |
| JP | 2000065782 | A | 3/2000 |
| JP | 2004069547 | A | 3/2004 |
| JP | 2009-030455 | A | 2/2009 |

OTHER PUBLICATIONS

U.S. Appl. No. 13/194,922, filed Jul. 30, 2011.
U.S. Appl. No. 13/194,929, filed Jul. 30, 2011.

* cited by examiner

*Primary Examiner* — Hieu T Vo

(74) *Attorney, Agent, or Firm* — Gifford, Krass, Sprinkle, Anderson & Citkowski, P.C.

(57) ABSTRACT

A fuel injection amount control system acquires a pre-correction air-fuel ratio imbalance index value that increases as the degree of ununiformity in the air-fuel ratio among cylinders increases, based on an output value of an upstream air-fuel ratio sensor, and obtains a value (intake air amount correlation value) corresponding to the intake air amount and a value (engine speed correlation value) corresponding to the engine speed over a period in which the pre-correction air-fuel ratio imbalance index value is acquired. Also, a post-correction air-fuel ratio imbalance index value is acquired by correcting the pre-correction air-fuel ratio imbalance index value based on the intake air amount correlation value and the engine speed correlation value, and the air-fuel ratio of the engine is controlled based on the post-correction air-fuel ratio imbalance index value.

16 Claims, 21 Drawing Sheets

FIG. 17

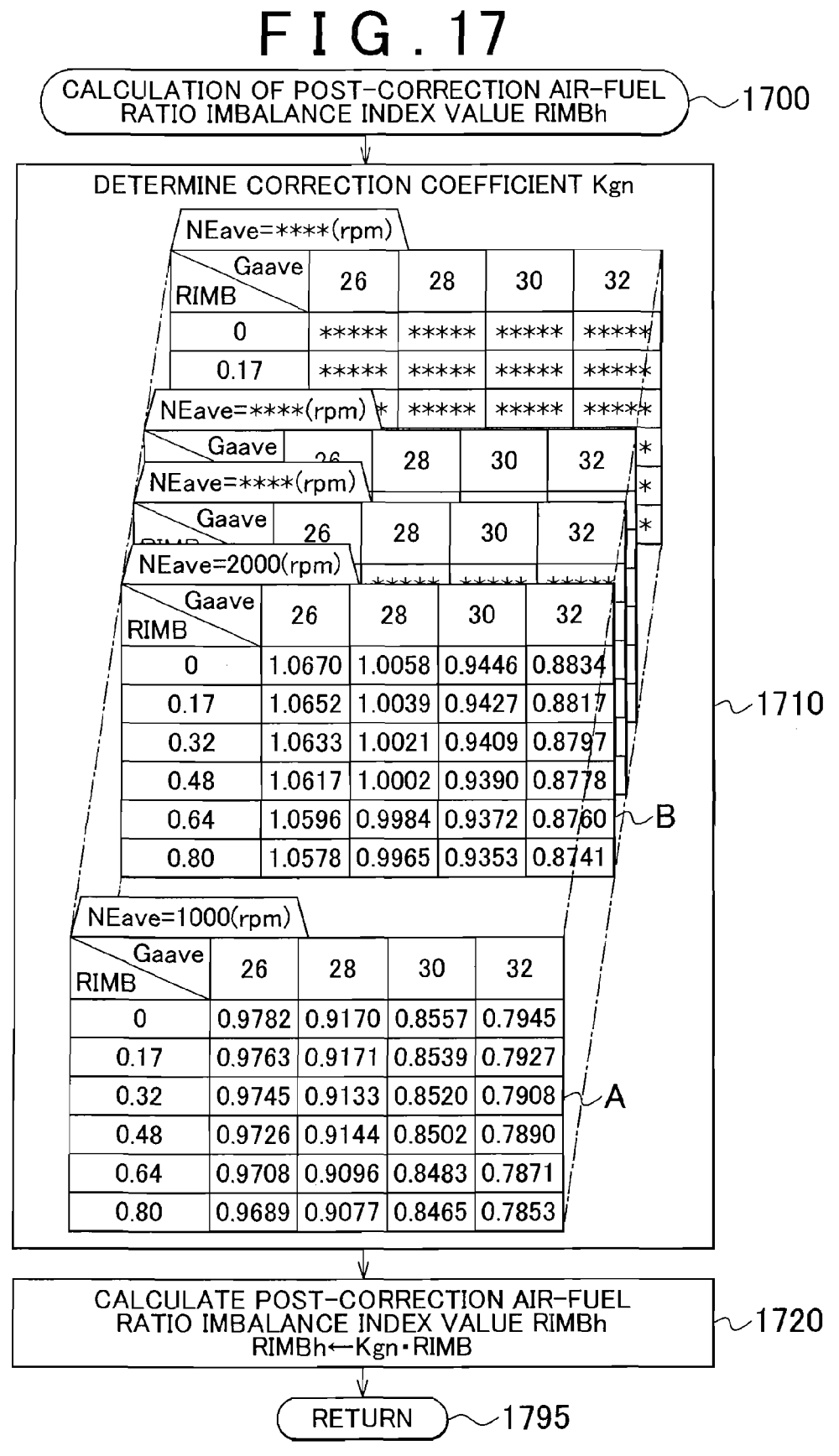

CALCULATION OF POST-CORRECTION AIR-FUEL RATIO IMBALANCE INDEX VALUE RIMBh ~1700

DETERMINE CORRECTION COEFFICIENT Kgn ~1710

NEave=****(rpm)

| RIMB \ Gaave | 26 | 28 | 30 | 32 |
|---|---|---|---|---|
| 0 | ***** | ***** | ***** | ***** |
| 0.17 | ***** | ***** | ***** | ***** |

NEave=****(rpm)

NEave=****(rpm)

NEave=2000(rpm) ~B

| RIMB \ Gaave | 26 | 28 | 30 | 32 |
|---|---|---|---|---|
| 0 | 1.0670 | 1.0058 | 0.9446 | 0.8834 |
| 0.17 | 1.0652 | 1.0039 | 0.9427 | 0.8817 |
| 0.32 | 1.0633 | 1.0021 | 0.9409 | 0.8797 |
| 0.48 | 1.0617 | 1.0002 | 0.9390 | 0.8778 |
| 0.64 | 1.0596 | 0.9984 | 0.9372 | 0.8760 |
| 0.80 | 1.0578 | 0.9965 | 0.9353 | 0.8741 |

NEave=1000(rpm) ~A

| RIMB \ Gaave | 26 | 28 | 30 | 32 |
|---|---|---|---|---|
| 0 | 0.9782 | 0.9170 | 0.8557 | 0.7945 |
| 0.17 | 0.9763 | 0.9171 | 0.8539 | 0.7927 |
| 0.32 | 0.9745 | 0.9133 | 0.8520 | 0.7908 |
| 0.48 | 0.9726 | 0.9144 | 0.8502 | 0.7890 |
| 0.64 | 0.9708 | 0.9096 | 0.8483 | 0.7871 |
| 0.80 | 0.9689 | 0.9077 | 0.8465 | 0.7853 |

CALCULATE POST-CORRECTION AIR-FUEL RATIO IMBALANCE INDEX VALUE RIMBh
RIMBh←Kgn・RIMB ~1720

RETURN ~1795

FIG. 18

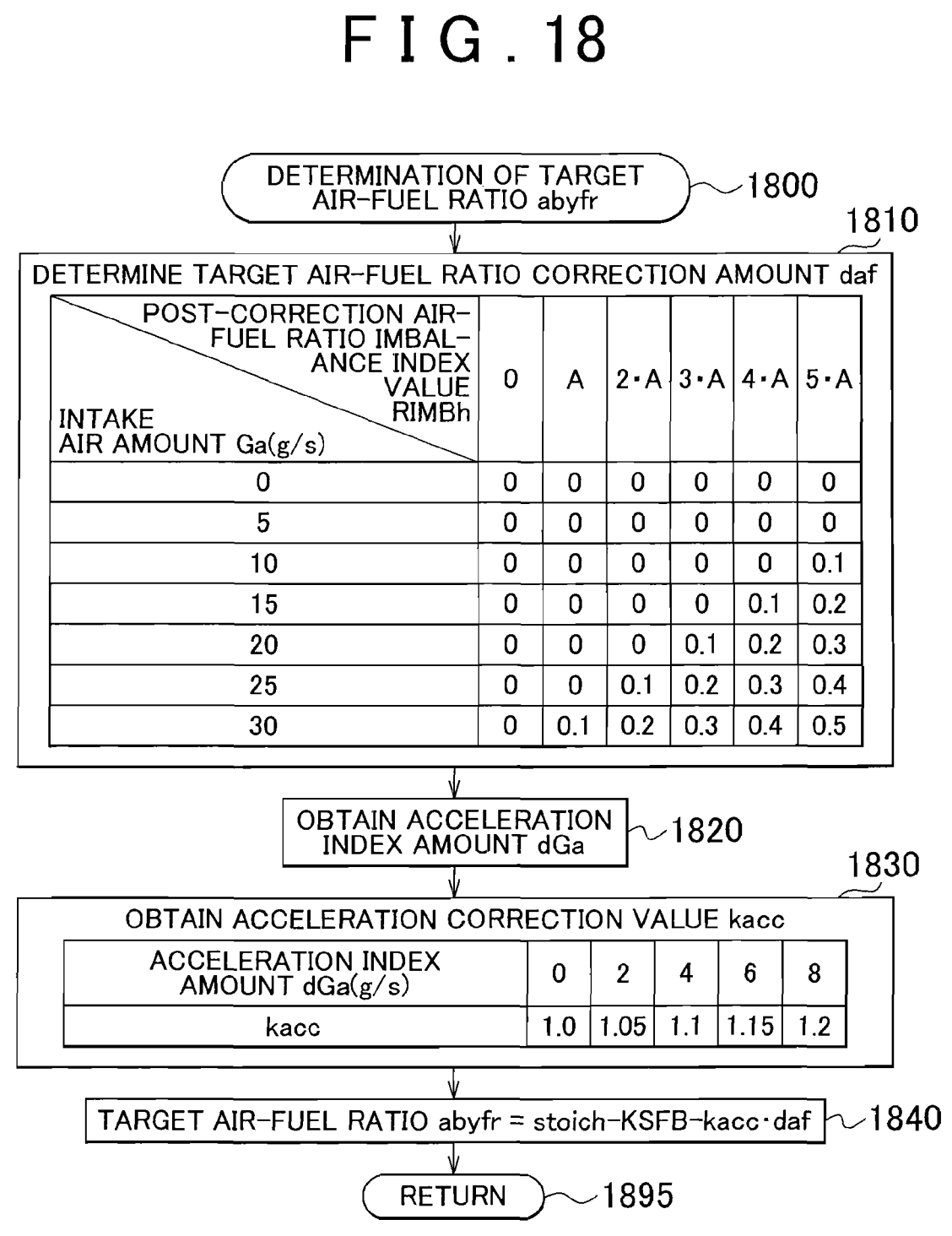

DETERMINATION OF TARGET AIR-FUEL RATIO abyfr ~1800

↓

1810: DETERMINE TARGET AIR-FUEL RATIO CORRECTION AMOUNT daf

| INTAKE AIR AMOUNT Ga(g/s) \ POST-CORRECTION AIR-FUEL RATIO IMBALANCE INDEX VALUE RIMBh | 0 | A | 2・A | 3・A | 4・A | 5・A |
|---|---|---|---|---|---|---|
| 0 | 0 | 0 | 0 | 0 | 0 | 0 |
| 5 | 0 | 0 | 0 | 0 | 0 | 0 |
| 10 | 0 | 0 | 0 | 0 | 0 | 0.1 |
| 15 | 0 | 0 | 0 | 0 | 0.1 | 0.2 |
| 20 | 0 | 0 | 0 | 0.1 | 0.2 | 0.3 |
| 25 | 0 | 0 | 0.1 | 0.2 | 0.3 | 0.4 |
| 30 | 0 | 0.1 | 0.2 | 0.3 | 0.4 | 0.5 |

↓

OBTAIN ACCELERATION INDEX AMOUNT dGa ~1820

↓

1830: OBTAIN ACCELERATION CORRECTION VALUE kacc

| ACCELERATION INDEX AMOUNT dGa(g/s) | 0 | 2 | 4 | 6 | 8 |
|---|---|---|---|---|---|
| kacc | 1.0 | 1.05 | 1.1 | 1.15 | 1.2 |

↓

TARGET AIR-FUEL RATIO abyfr = stoich−KSFB−kacc·daf ~1840

↓

RETURN ~1895

FUEL INJECTION AMOUNT CONTROL SYSTEM AND FUEL INJECTION AMOUNT CONTROL DEVICE FOR MULTI-CYLINDER INTERNAL COMBUSTION ENGINE

CROSS-REFERENCE TO RELATED APPLICATIONS

This application claims priority to Japanese Patent Application No. 2010- 171579 filed on Jul. 30, 2010, which is incorporated herein by reference in its entirety including the specification, claims and abstract.

INCORPORATION BY REFERENCE

The disclosure of Japanese Patent Application No. 2010-171579 filed on Jul. 30, 2010 including the specification, drawings and abstract is incorporated herein by reference in its entirety.

BACKGROUND OF THE INVENTION

1. Field of the Invention

The invention relates to a fuel injection amount control system and a fuel injection amount control device for a multi-cylinder internal combustion engine.

2. Description of Related Art

Generally, an air-fuel ratio control system including a three-way catalyst disposed in an exhaust passage of a multi-cylinder internal combustion engine and an upstream air-fuel ratio sensor located upstream of the three-way catalyst has been widely known.

The air-fuel ratio control system is configured to calculate an air-fuel ratio feedback amount (main feedback amount) based on an output value of the upstream air-fuel ratio sensor, so that the air-fuel ratio of an air-fuel mixture supplied to the internal combustion engine (the air-fuel ratio of the engine, accordingly, the air-fuel ratio of exhaust gas) coincides with a target air-fuel ratio, and performs feedback control on the air-fuel ratio of the engine, using the main feedback amount. The feedback amount is a controlled variable common to all of the cylinders. The target air-fuel ratio is set to a given reference air-fuel ratio within the window of the three-way catalyst. Generally, the reference air-fuel ratio is the stoichiometric air-fuel ratio. The reference air-fuel ratio may be changed to a value in the vicinity of the stoichiometric air-fuel ratio, according to the intake air amount of the engine, the degree of degradation of the three-way catalyst, and so forth.

Generally, the air-fuel ratio control system as described above is applied to an internal combustion engine that employs an electronically controlled fuel injection system. The internal combustion engine has at least one fuel injection valve for each cylinder or an intake port that communicates with each cylinder. With this arrangement, if a fuel injection valve of a particular cylinder turns to "a characteristic that it injects fuel in an amount excessively larger than a designated fuel injection amount", only the air-fuel ratio of the air-fuel mixture supplied to the particular cylinder (the air-fuel ratio of the particular cylinder) changes largely into a richer (smaller) value. Namely, the degree of ununiformity in the air-fuel ratio among cylinders (variations in the air-fuel ratio among cylinders, cylinder-to-cylinder air-fuel ratio imbalance proportion) becomes larger. In other words, significant imbalances appear among "the air-fuel ratios of the individual cylinders" as the air-fuel ratios of air-fuel mixtures supplied to the respective cylinders.

In the following description, the cylinder corresponding to "the fuel injection valve having a characteristic of injecting fuel in an amount excessively larger or excessively smaller than the designated fuel injection amount" will be called "imbalance cylinder", and the remaining cylinders (cylinders corresponding to "fuel injection valves that inject fuel in the designated fuel injection amount") will be called "non-imbalance cylinders (or normal cylinders)".

If the fuel injection valve of a certain particular cylinder turns to "a characteristic that it injects fuel in an amount excessively larger than the designated fuel injection amount", the average of the air-fuel ratios of air-fuel mixtures supplied to the engine as a whole becomes a richer air-fuel ratio than the target air-fuel ratio set to the reference air-fuel ratio. Accordingly, with the feedback amount of the air-fuel ratio common to all the cylinders, the air-fuel ratio of the particular cylinder is changed to a leaner (or larger) value so as to be closer to the reference air-fuel ratio, and at the same time, the air-fuel ratio of the other cylinders is changed to a leaner (or larger) value, deviate further from the reference air-fuel ratio. As a result, the average of the air-fuel ratios of the mixtures supplied to the engine as a whole (the average air-fuel ratio of exhaust gas) becomes equal to an air-fuel ratio in the vicinity of the reference air-fuel ratio.

However, the air-fuel ratio of the above-indicated particular cylinder is still a richer air-fuel ratio than the reference air-fuel ratio, and the air-fuel ratio of the remaining cylinders becomes a leaner air-fuel ratio than the reference air-fuel ratio. As a result, the amount of emissions discharged from each cylinder (the amount of unburned substances and/or the amount of nitrogen oxides) is increased, as compared with the case where the air-fuel ratio of each cylinder is equal to the reference air-fuel ratio. Therefore, even when the average of the air-fuel ratios of the mixtures supplied to the engine is equal to the reference air-fuel ratio, the increased emissions cannot be completely cleaned by the three-way catalyst, which may result in deterioration of the emissions.

In order to prevent emissions from being deteriorated, therefore, it is important to detect excessively large ununiformity in the air-fuel ratio among the individual cylinders (namely, the occurrence of air-fuel ratio imbalances among the cylinders), and take some measure against the imbalance condition. The air-fuel ratio imbalances among cylinders also occur, for example, when the fuel injection valve of a particular cylinder turns to "a characteristic that it injects fuel in an amount that is excessively smaller than the designated fuel injection amount".

One example of fuel injection amount control system according to the related art obtains a trace length of an output value (output signal) of an electromotive force type oxygen concentration sensor located upstream of a three-way catalyst. The control system compares the trace length with "a reference value that varies according to the engine speed", and determines whether an air-fuel ratio imbalance condition among cylinders has occurred based on the result of comparison (see, for example, U.S. Pat. No. 7,152,594).

In the meantime, if there is ununiformity or imbalances in the air-fuel ratio among the individual cylinders, the true average air-fuel ratio of the engine is controlled to "an air-fuel ratio that is larger than the reference air-fuel ratio (air-fuel ratio that is leaner than the reference air-fuel ratio)", through main feedback control for making the air-fuel ratio represented by the output value of the upstream air-fuel ratio sensor equal to "the target air-fuel ratio set to the reference air-fuel ratio, such as the stoichiometric air-fuel ratio". The reason will be hereinafter explained.

Fuel supplied to the engine is a compound of carbon and hydrogen. Accordingly, if the air-fuel ratio of an air-fuel mixture to be subjected to combustion is richer than the stoichiometric air-fuel ratio, unburned substances, such as "hydrocarbon HC, carbon monoxide CO and hydrogen $H_2$", are produced as intermediate products. In this case, as the air-fuel ratio of the mixture subjected to combustion, which ratio is richer than the stoichiometric air-fuel ratio, deviates further than the stoichiometric air-fuel ratio, the probability that the intermediate products meet and combine with oxygen during a combustion period is rapidly reduced. As a result, the amount of the unburned substances (HC, CO and $H_2$) rapidly increases (for example, quadratically), as the air-fuel ratio of the mixture supplied to each cylinder becomes richer, as shown in FIG. 2.

Suppose that only the air-fuel ratio of a particular cylinder shifts to be largely richer than the stoichiometric ratio, causing "ununiformity (or imbalance) in the air-fuel ratio among the individual cylinders". In this case, the air-fuel ratio of an air-fuel mixture supplied to the particular cylinder (the air-fuel ratio of the particular cylinder) changes to a greatly richer (or smaller) air-fuel ratio, as compared with the air-fuel ratio of air-fuel mixtures supplied to the remaining cylinders (the air-fuel ratio of the remaining cylinders). At this time, an extremely large amount of unburned substances (HC, CO, $H_2$) are discharged from the particular cylinder. Accordingly, even if the average air-fuel ratio of the mixtures supplied to the engine is equal to "a certain specified value", the total amount of hydrogen emitted from the engine when the degree of ununiformity in the air-fuel ratio among cylinders is large is significantly larger than the total amount of hydrogen that arises when there is no ununiformity (imbalance) in the air-fuel ratio among cylinders.

In the meantime, the upstream air-fuel ratio sensor has a porous layer (e.g., a diffusion resistance layer or protective layer) that permits gas (oxygen equilibrium gas) in a condition where unburned substances and oxygen are in chemical equilibrium to reach an air-fuel ratio sensing element. The upstream air-fuel ratio sensor generates a value (output value) commensurate with "the amount of oxygen (oxygen partial pressure, oxygen concentration) and the amount of unburned substances (partial pressure or concentration of unburned substances)" which have reached an exhaust-gas-side electrode layer (a surface of the air-fuel ratio sensing element) of the upstream air-fuel ratio sensor through the diffusion resistance layer.

On the other hand, molecules of hydrogen $H_2$ are smaller in size than those of hydrocarbon HC and carbon monoxide CO, for example. Accordingly, hydrogen $H_2$ diffuses into the porous layer of the upstream air-fuel ratio sensor more rapidly than the other unburned substances (HC, CO). Namely, selective diffusion (preferential diffusion) of hydrogen $H_2$ takes place in the porous layer.

Accordingly, if the air-fuel ratios of the individual cylinders become unequal or non-uniform among the cylinders (if there arises ununiformity in the air-fuel ratio among the cylinders), the output value of the upstream air-fuel ratio sensor shifts to a richer value, due to the selective diffusion of hydrogen. Namely, the air-fuel ratio represented by the output value of the upstream air-fuel ratio sensor becomes "a richer air-fuel ratio" than the true air-fuel ratio of the engine. As a result, under the main feedback control, the true average air-fuel ratio of the engine is controlled to "an air-fuel ratio that is larger than the reference air-fuel ratio (an air-fuel ratio that is leaner than the reference air-fuel ratio)".

On the other hand, exhaust gas that has passed through the three-way catalyst reaches a downstream air-fuel ratio sensor located downstream of the three-way catalyst. Hydrogen is converted and removed to some extent at the three-way catalyst. Accordingly, even when the degree of ununiformity in the air-fuel ratio among the cylinders is large, the downstream air-fuel ratio sensor generates an output value that is close to the true average air-fuel ratio of the engine.

Thus, another example of fuel injection amount control system according to the related art is configured to determine whether the degree of ununiformity in the air-fuel ratio among the cylinders is large, based on a parameter representing a degree of deviation between the air-fuel ratio sensed based on the upstream air-fuel ratio sensor and the air-fuel ratio sensed based on the downstream air-fuel ratio sensor (see Japanese Patent Application Publication No. 2009-30455 (JP-A-2009-30455).

The "shift of the air-fuel ratio to a learner (or larger) value due to selective diffusion of hydrogen and main feedback control" as described above will be simply called "erroneous lean correction". The "erroneous lean correction" also occurs in the case where the air-fuel ratio of the imbalance cylinder is shifted to be leaner than the air-fuel ratio of the non-imbalance cylinders. Furthermore, the amount of shift of the air-fuel ratio to the lean side due to the erroneous lean correction increases as the degree of selective diffusion of hydrogen increases, and therefore increases as the degree of ununiformity in the air-fuel ratio among cylinders increases.

If the erroneous lean correction occurs, the true average air-fuel ratio of the engine (accordingly, the average of the true air-fuel ratio of exhaust gas) may become leaner (larger) than "the window of the three-way catalyst". Accordingly, the NOx (nitrogen oxides) conversion efficiency of the three-way catalyst may be reduced, and the amount of NOx emissions may be increased.

As described above, the downstream air-fuel ratio sensor generates an output value that is close to the true average air-fuel ratio of the engine, even when the degree of ununiformity in the air-fuel ratio among the cylinders is large. Accordingly, the erroneous lean correction can be avoided if "known sub-feedback control" for making the output value of the downstream air-fuel ratio sensor equal to "a downstream-side target value corresponding to an air-fuel ratio around the stoichiometric ratio" is carried out.

However, the sub-feedback amount is often provided with the upper limit and the lower limit. If the sub-feedback amount becomes equal to the upper limit or the lower limit, the air-fuel ratio of the engine cannot be sufficiently controlled even with the sub-feedback amount, and the amount of NOx emissions may be increased. Also, the sub-feedback amount is adapted to change relatively slowly. Accordingly, even when the sub-feedback amount is not provided with the upper limit and the lower limit, or even when the sub-feedback amount does not coincide with the upper limit or lower limit, the amount of NOx emissions may be increased during a period, for example, after starting of the engine, in which period the sub-feedback amount is set to an inappropriate value.

To cope with the above-described situation, it is proposed to shift the air-fuel ratio of the engine to a richer air-fuel ratio (and consequently, to an air-fuel ratio in the vicinity of the stoichiometric air-fuel ratio) when the degree of ununiformity in the air-fuel ratio among the cylinders becomes large. More specifically, the control system obtains an air-fuel ratio imbalance index value that increases as the degree of ununiformity in the air-fuel ratio among the cylinders increases, based on at least a value correlated with the output value of the upstream air-fuel ratio sensor. The air-fuel ratio imbalance index value, which has not been subjected to correction that will be described later, is also called "pre-correction air-fuel ratio imbalance index value" for the sake of convenience. Further, the control system controls the designated fuel injection amount so that the air-fuel ratio of the engine shifts to a richer air-fuel ratio as the pre-correction air-fuel ratio imbalance index value increases. Namely, the control system increases the designated fuel injection amount, so that "a designated air-fuel ratio (=the in-cylinder intake air amount/the designated fuel injection amount) as an air-fuel ratio determined by the designated fuel injection amount" becomes "a richer (smaller) air-fuel ratio" as the pre-correction air-fuel ratio imbalance index value increases. In this manner, it is possible to make up for the erroneous lean correction However, if "the designated air-fuel ratio" is set based on the pre-correction air-fuel ratio imbalance index value, the amount of increase of the designated fuel injection amount may be excessively small or excessively large, and, in some cases, the emissions cannot be kept in a good condition. Having studied the phenomena, the inventor found that "even when the degree of ununiformity in the air-fuel ratio among the cylinders is equal to a particular value, the pre-correction air-fuel ratio imbalance index value may not necessarily be a constant value if the intake air amount Ga over a period in which the pre-correction air-fuel ratio imbalance index value is obtained (index value acquisition period) is different". The reason that the pre-correction air-fuel ratio imbalance index value is influenced by the intake air amount Ga will be explained in detail later.

Even in the case where the "designated air-fuel ratio" is not set based on the pre-correction air-fuel ratio imbalance index value, if it is determined, based on the pre-correction air-fuel ratio imbalance index value, whether the ununiformity in the air-fuel ratio among the cylinders is excessively large (namely, whether an air-fuel ratio imbalance condition among cylinders has occurred), an erroneous determination may be made because the pre-correction air-fuel ratio imbalance index value is influenced by the intake air amount Ga over the index value acquisition period.

SUMMARY OF THE INVENTION

The invention provides a fuel injection amount control system and a fuel injection amount control device that are able to acquire an air-fuel ratio imbalance index value (i.e., post-correction air-fuel ratio imbalance index value) that accurately represents the degree of ununiformity in the air-fuel ratio among cylinders, by correcting a pre-correction air-fuel ratio imbalance index value based on at least the intake air amount.

A fuel injection amount control system of a multi-cylinder internal combustion engine according to a first aspect of the invention includes a three-way catalyst, an upstream air-fuel ratio sensor, a plurality of fuel injection valves, designated fuel injection amount determining section, injection command signal sending section, pre-correction index value acquiring section, and post-correction index value acquiring section.

The three-way catalyst is mounted at a position downstream of "an exhaust gathering portion of an exhaust passage of the engine" into which exhaust gases emitted from a plurality of cylinders of the multi-cylinder internal combustion engine are collected.

The upstream air-fuel ratio sensor is located between the exhaust gathering portion of the exhaust passage and the three-way catalyst.

Each of the above-indicated plurality of fuel injection valves is arranged to inject fuel contained in an air-fuel mixture supplied to a combustion chamber of each of the plurality of cylinders.

The designated fuel injection amount determining section determines "a command value indicative of the amount of fuel to be injected from each of the plurality of fuel injection valves (namely, designated fuel injection amount)", by "feedback-correcting the amount of fuel injected from the fuel injection valve based on at least an output value of the upstream air-fuel ratio sensor", so that the air-fuel ratio of exhaust gas flowing into the three-way catalyst coincides with a target air-fuel ratio.

The injection command signal sending section sends an injection command signal to the plurality of fuel injection valves, so that the fuel is injected from each of the fuel injection valves in an amount corresponding to the designated fuel injection amount.

The pre-correction index value acquiring section acquires a pre-correction air-fuel ratio imbalance index value that increases as "the degree of ununiformity among the plurality of cylinders" in "the air-fuel ratio of the air-fuel mixture supplied to the combustion chamber of each of the cylinders (namely, the air-fuel ratio of each cylinder)" is larger, based on "at least a value correlated with the output value of the upstream air-fuel ratio sensor". As will be described later, the value correlated with the output value of the upstream air-fuel ratio sensor is selected from various values, such as "differential value (time differential value, first-order differential value) and second-order differential value" of the output value of the upstream air-fuel ratio sensor (or output value subjected to high-pass filtering, which is obtained by performing high-pass filtering on the output value of the upstream air-fuel ratio sensor so as to remove a fluctuation component of the average air-fuel ratio (central air-fuel ratio, base air-fuel ratio) of the engine from the output value of the upstream air-fuel ratio sensor), and "differential value and second-order differential value" of the air-fuel ratio represented by the output value of the upstream air-fuel ratio sensor (or output value subjected to high-pass filtering). Also, the value correlated with the output value of the upstream air-fuel ratio sensor may be a value (such as a steady-state component of a sub-feedback amount) corresponding to a sub-feedback amount as will be described later.

The post-correction index value acquiring section acquires "an intake air amount correlation value" that increases with increase of "the intake air amount of the engine over a period in which the pre-correction air-fuel ratio imbalance index value is acquired (namely, index value acquisition period)". Further, the post-correction index value acquiring section acquires a post-correction air-fuel ratio imbalance index value by correcting the acquired pre-correction air-fuel ratio imbalance index value based on the acquired intake air amount correlation value. The pre-correction air-fuel ratio imbalance index value increases or decreases as the intake air amount correlation value increases, depending on the type of parameter based on which the pre-correction air-fuel ratio imbalance index value was acquired.

With the above arrangement, the post-correction air-fuel ratio imbalance index value does not vary depending on the intake air amount over the index value acquisition period. In other words, the pre-correction air-fuel ratio imbalance index value is normalized into a value that would be obtained when "the intake air amount correlation value over the index value acquisition period" is equal to "a particular value".

As a result, a post-correction air-fuel ratio imbalance index value that accurately represents the degree of ununiformity in the air-fuel ratio among the cylinders is provided. Accordingly, air-fuel ratio control can be appropriately performed using the post-correction air-fuel ratio imbalance index value, and/or an imbalance determination can be accurately made using the post-correction air-fuel ratio imbalance index value.

A fuel injection amount control system of a multi-cylinder internal combustion engine according to a second aspect of the invention includes: a three-way catalyst mounted at a position downstream of an exhaust gathering portion of an exhaust passage of the engine into which exhaust gases emitted from a plurality of cylinders of the multi-cylinder internal combustion engine are collected, an upstream air-fuel ratio sensor located between the exhaust gathering portion of the exhaust passage and the three-way catalyst, a plurality of fuel injection valves each of which is arranged to inject fuel contained in an air-fuel mixture supplied to a combustion chamber of each of the plurality of cylinders, a designated fuel injection amount determining section that determines a designated fuel injection amount as a command value indicative of an amount of fuel injected from each of the plurality of fuel injection valves, by feedback-correcting the amount of fuel injected from each fuel injection valve based on at least an output value of the upstream air-fuel ratio sensor, so that an air-fuel ratio of exhaust gas flowing into the three-way catalyst coincides with a target air-fuel ratio, an injection command signal sending section that sends an injection command signal to the plurality of fuel injection valves so that the fuel is injected from each fuel injection valve in an amount corresponding to the designated fuel injection amount, a pre-correction index value acquiring section that acquires a pre-correction air-fuel ratio imbalance index value that increases as a degree of ununiformity in the air-fuel ratio of the air-fuel mixture supplied to the combustion chamber of each of the plurality of cylinders, among the plurality of cylinders, is larger, based on at least a value correlated with the output value of the upstream air-fuel ratio sensor, a correlation value acquiring section that acquires an intake air amount correlation value that increases with increase of an intake air amount of the engine over an index value acquisition period as a period in which the pre-correction air-fuel ratio imbalance index value is acquired, an intake air amount acquiring section that acquires an actual intake air amount of the engine, and a target air-fuel ratio determining section that determines the target air-fuel ratio based on the acquired pre-correction air-fuel ratio imbalance index value, the acquired intake air amount correlation value, and the acquired actual intake air amount.

A fuel injection amount control device of a multi-cylinder internal combustion engine according to a third aspect of the invention including: a three-way catalyst mounted at a position downstream of an exhaust gathering portion of an exhaust passage of the engine into which exhaust gases emitted from a plurality of cylinders of the multi-cylinder internal combustion engine are collected; an upstream air-fuel ratio sensor located between the exhaust gathering portion of the exhaust passage and the three-way catalyst; a plurality of fuel injection valves each of which is arranged to inject fuel contained in an air-fuel mixture supplied to a combustion chamber of each of said plurality of cylinders; a designated fuel injection amount determining section that determines a designated fuel injection amount as a command value indicative of an amount of fuel injected from each of said plurality of fuel injection valves, by feedback-correcting the amount of fuel injected from said each fuel injection valve based on at least an output value of the upstream air-fuel ratio sensor, so that an air-fuel ratio of exhaust gas flowing into the three-way catalyst coincides with a target air-fuel ratio; and an injection command signal sending section that sends an injection command signal to said plurality of fuel injection valves so that the fuel is injected from said each fuel injection valve in an amount corresponding to the designated fuel injection amount; the fuel injection amount control device including: a pre-correction index value acquiring section that acquires a pre-correction air-fuel ratio imbalance index value that increases as a degree of ununiformity in the air-fuel ratio of the air-fuel mixture supplied to the combustion chamber of each of said plurality of cylinders, among said plurality of cylinders, is larger, based on at least a value correlated with the output value of the upstream air-fuel ratio sensor; and a post-correction index value acquiring section that acquires an intake air amount correlation value that increases with increase of an intake air amount of the engine over an index value acquisition period as a period in which the pre-correction air-fuel ratio imbalance index value is acquired, and acquiring a post-correction air-fuel ratio imbalance index value by correcting the acquired pre-correction air-fuel ratio imbalance index value based on the acquired intake air amount correlation value.

A fuel injection amount control device of a multi-cylinder internal combustion engine, according to a fourth aspect of the invention including: a three-way catalyst mounted at a position downstream of an exhaust gathering portion of an exhaust passage of the engine into which exhaust gases emitted from a plurality of cylinders of the multi-cylinder internal combustion engine are collected; an upstream air-fuel ratio sensor located between the exhaust gathering portion of the exhaust passage and the three-way catalyst; a plurality of fuel injection valves each of which is arranged to inject fuel contained in an air-fuel mixture supplied to a combustion chamber of each of said plurality of cylinders; a designated fuel injection amount determining section that determines a designated fuel injection amount as a command value indicative of an amount of fuel injected from each of said plurality of fuel injection valves, by feedback-correcting the amount of fuel injected from said each fuel injection valve based on at least an output value of the upstream air-fuel ratio sensor, so that an air-fuel ratio of exhaust gas flowing into the three-way catalyst coincides with a target air-fuel ratio; and an injection command signal sending section that sends an injection command signal to said plurality of fuel injection valves so that the fuel is injected from said each fuel injection valve in an amount corresponding to the designated fuel injection amount; the fuel injection amount control device including: a pre-correction index value acquiring section that acquires a pre-correction air-fuel ratio imbalance index value that increases as a degree of ununiformity in the air-fuel ratio of the air-fuel mixture supplied to the combustion chamber of each of said plurality of cylinders, among said plurality of cylinders, is larger, based on at least a value correlated with the output value of the upstream air-fuel ratio sensor; a correlation value acquiring section that acquires an intake air amount correlation value that increases with increase of an intake air amount of the engine over an index value acquisition period as a period in which the pre-correction air-fuel ratio imbalance index value is acquired; an intake air amount acquiring section that acquires an actual intake air amount of the engine; and a target air-fuel ratio determining section that determines the target air-fuel ratio based on the acquired pre-correction air-fuel ratio imbalance index value, the acquired intake air amount correlation value, and the acquired actual intake air amount.

The fuel injection amount control system according to the second aspect of the invention, the fuel injection amount control device according to the third aspect of the invention and the fuel injection amount control device according to the fourth aspect of the invention provide substantially the same effects as those of the fuel injection amount control system according to the first aspect of the invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 17 is a flowchart illustrating a routine executed by the CPU of the first control device;

FIG. 18 is a flowchart illustrating a routine executed by the CPU of the first control device;

DETAILED DESCRIPTION OF EMBODIMENTS

A fuel injection amount control device (which will also be simply called "control device") of an internal combustion engine according to each embodiment of the invention will be described with reference to the drawings. This control device is a part of an air-fuel ratio control system for controlling the air-fuel ratio of an air-fuel mixture supplied to the internal combustion engine (the air-fuel ratio of the engine).

Figure 1:
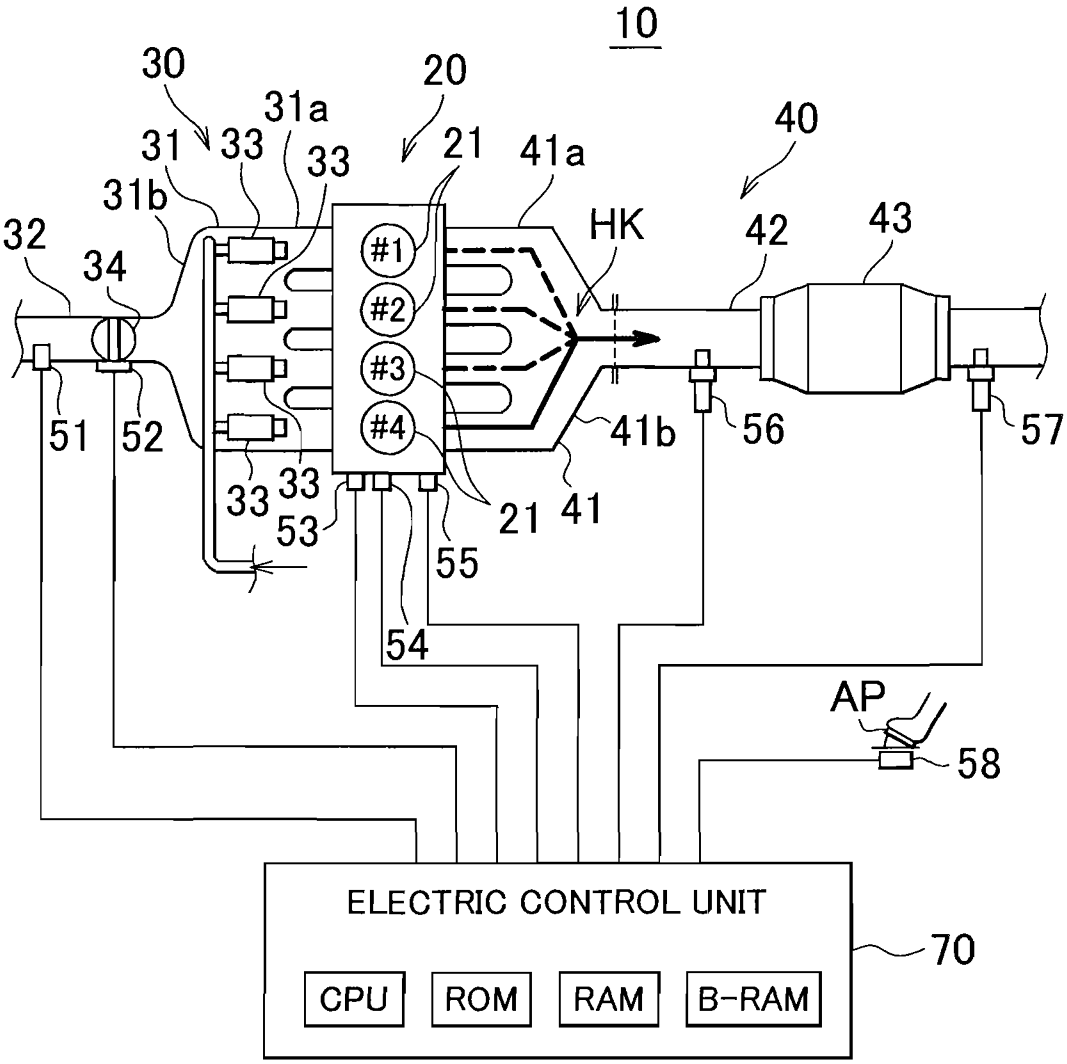
FIG. 1 is a schematic view of an internal combustion engine to which a fuel injection amount control system according to each embodiment of the invention is applied.

(First Embodiment) (Construction) FIG. 1 schematically shows the construction of a system in which a control device (which will also be called "first control device") according to a first embodiment of the invention is applied to a four-cycle, spark ignition type, multi-cylinder (in-line four cylinder), internal combustion engine 10.

The internal combustion engine 10 includes an engine main body 20, an intake system 30, and an exhaust system 40.

The engine main body 20 includes a cylinder block portion and a cylinder head portion. The engine main body 20 has a plurality of cylinders (combustion chambers) 21. Each cylinder communicates with "an intake port and an exhaust port" which are not illustrated. A communicating portion that communicates the intake port with the corresponding combustion chamber 21 is opened and closed by an intake valve (not shown). A communicating portion that communicates the exhaust port with the corresponding combustion chamber 21 is opened and closed by an exhaust valve (not shown). An ignition plug (not shown) is provided in each combustion chamber 21.

The intake system 30 has an intake manifold 31, an intake pipe 32, a plurality of fuel injection valves 33, and a throttle valve 34.

The intake manifold 31 has a plurality of branch portions 31*a* and a surge tank 31*b*. Each of the branch portions 31*a* is connected at one end to a corresponding one of a plurality of intake ports. The other ends of the branch portions 31*a* are connected to the surge tank 31*b*.

One end of the intake pipe 32 is connected to the surge tank 31*b*. An air filter (not shown) is provided at the other end of the intake pipe 32.

One fuel injection valve 33 is provided for one cylinder (combustion chamber) 21. The fuel injection valve 33 is disposed in the corresponding intake port. Namely, each of the cylinders is provided with the fuel injection valve 33 that supplies fuel to the cylinder, independently of the other cylinders. The fuel injection valve 33 operates in response to an injection command signal, and injects "fuel in a designated fuel injection amount included in the injection command signal" into the intake port (accordingly, into the cylinder corresponding to the fuel injection valve 33) when the valve 33 operates normally.

More specifically, the fuel injection valve 33 opens only for a period of time proportional to the designated fuel injection amount. The pressure of the fuel supplied to the fuel injection valve 33 is controlled by a pressure regulator (not shown) so that a difference between the pressure of the fuel and the pressure in the intake port becomes constant. Accordingly, the fuel injection valve 33, when in normal operation, injects fuel in an amount equal to the designated fuel injection amount. If, however, an abnormality occurs to the fuel injection valve 33, the fuel injection valve 33 would inject fuel in an amount different from the designated fuel injection amount. As a result, ununiformity or imbalance arises in the air-fuel ratio among individual cylinders.

The throttle valve 34 is pivotally mounted in the intake pipe 32. The throttle valve 34 is operable to make the cross-sectional area of the intake passage variable. In operation, the throttle valve 34 is rotated/driven by a throttle valve actuator (not shown) in the intake pipe 32.

The exhaust system 40 has an exhaust manifold 41, an exhaust pipe 42, an upstream catalyst 43 disposed in the exhaust pipe 42, and "a downstream catalyst (not shown)" located downstream of the upstream catalyst 43 in the exhaust pipe 42.

The exhaust manifold 41 has a plurality of branch portions 41*a* and a gathering portion 41*b*. Each of the branch portions 41*a* is connected at one end to a corresponding one of a plurality of exhaust ports. The other ends of the branch portions 41*a* join into the gathering portion 41*b*. The gathering portion 41*b*, into which exhaust gases emitted from a plurality of (two or more, four in this embodiment) cylinders gather, will also be called exhaust gathering portion HK.

The exhaust pipe 42 is connected to the gathering portion 41*b*. The exhaust ports, exhaust manifold 41 and the exhaust pipe 42 constitute an exhaust passage.

Each of the upstream catalyst 43 and downstream catalyst is a so-called three-way catalytic device (catalyst for cleaning exhaust gas) that supports an active ingredient comprising a noble metal (catalytic substance), such as platinum, rhodium, and palladium. Each catalyst has the function of oxidizing unburned components, such as HC, CO and $H_2$, and reducing nitrogen oxides (NOx), when the air-fuel ratio of gas flowing into each catalyst is "an air-fuel ratio (e.g., stoichiometric air-fuel ratio) within the window of the three-way catalyst". This function may also be called "catalytic function". In addition, each catalyst has an oxygen storage function of adsorbing (storing) oxygen. Owing to the oxygen storage function, each catalyst is able to remove or convert unburned components and nitrogen oxides even when the air-fuel ratio is shifted from the stoichiometric ratio. Namely, the width of the above-mentioned window increases due to the oxygen storage function. The oxygen storage function is provided by an oxygen storage material, such as ceria ($CeO_2$) supported on the catalyst.

The system of FIG. 1 has a hot-wire airflow meter 51, a throttle position sensor 52, a water temperature sensor 53, a crank position sensor 54, an intake cam position sensor 55, an upstream air-fuel ratio sensor 56, a downstream air-fuel ratio sensor 57, and an acceleration stroke sensor 58.

The airflow meter 51 generates a signal indicative of the mass flow (intake air flow rate) Ga of intake air flowing in the intake pipe 32. Namely, the intake air amount Ga represents the amount of intake air drawn into the engine 10 per unit time.

The throttle position sensor 52 detects the opening of the throttle valve 34 (throttle opening), and generates a signal indicative of the throttle opening TA.

The water temperature sensor 53 detects the temperature of a coolant of the internal combustion engine 10, and generates a signal indicative of the coolant temperature THW. The coolant temperature THW is a parameter representing a warm-up condition of the engine 10 (the temperature of the engine 10).

The crank position sensor 54 generates a signal having small-width pulses generated each time the crankshaft rotates 10°, and large-width pulses generated each time the crankshaft rotates 360°. The signal is converted into the engine speed NE by an electric control unit 70 which will be described later.

The intake cam position sensor 55 generates one pulse each time the intake camshaft rotates 90° from a given angle, then 90°, and then 180°. The electric control unit 70 which will be described later obtains an absolute crank angle CA with reference to the compression top dead center of a reference cylinder (e.g., first cylinder), based on the signals from the crank position sensor 54 and the intake cam position sensor 55. The absolute crank angle CA is set to "0° crank angle" at the compression top dead center of the reference cylinder, increases up to 720° crank angle according to the angle of rotation of the crankshaft, and is set again to 0° crank angle at the time when it reaches 720° crank angle.

The upstream air-fuel ratio sensor 56 is mounted in "either the exhaust manifold 41 or the exhaust pipe 42" at a position between the gathering portion 41*b* (exhaust gathering portion HK) of the exhaust manifold 41 and the upstream catalyst 43. The upstream air-fuel ratio sensor 56 may also be simply called "air-fuel ratio sensor".

The upstream air-fuel ratio sensor 56 is a "limiting current type wide range air-fuel ratio sensor having a diffusion resistance layer" as disclosed in, for example, Japanese Patent Application Publication No. 11-72473 (JP-A-11-72473), Japanese Patent Application Publication No. 2000-65782 (JP-A-2000-65782), and Japanese Patent Application Publication No. 2004-69547 (JP-A-2004-69547).

Figure 3:
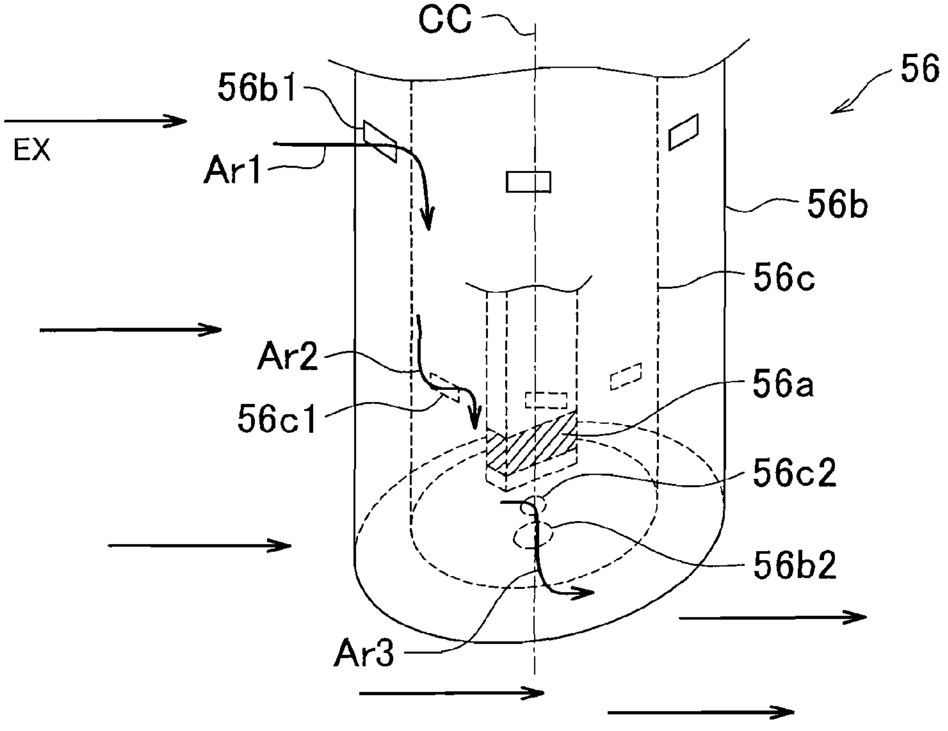
FIG. 3 is a schematic perspective view of a part of an upstream air-fuel ratio sensor shown in FIG. 1.
Figure 4:
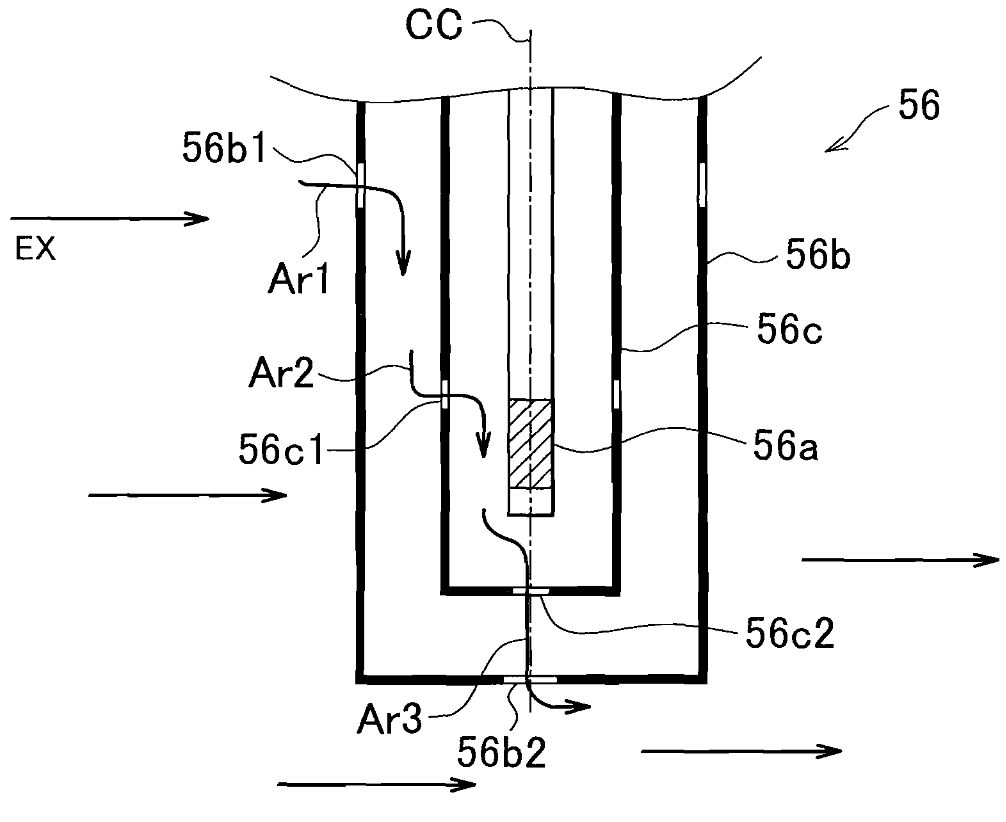
FIG. 4 is a cross-sectional view of a part of the upstream air-fuel ratio sensor shown in FIG. 1.

As shown in FIG. 3 and FIG. 4, the upstream air-fuel ratio sensor 56 has an air-fuel ratio sensing portion 56*a*, an outer protective cover 56*b*, and an inner protective cover 56*c*.

The outer protective cover 56*b* is a hollow cylindrical body made of metal. The inner protective cover 56*c* is housed in the outer protective cover 56*b* such that the outer protective cover 56*b* surrounds the inner protective cover 56*c*. The outer protective cover 56*b* has a plurality of inlet holes 56*b*1 formed through its side face. The inlet holes 56*b*1 are through holes that permit exhaust gas EX flowing in the exhaust passage (exhaust gas present outside the outer protective cover 56*b*) to flow into the inside of the outer protective cover 56*b*. In addition, the outer protective cover 56*b* has an outlet hole 56*b*2 formed through its bottom face, and the outlet hole 56*b*2 permits exhaust gas within the outer protective cover 56*b* to flow out to the outside (exhaust passage).

The inner protective cover 56*c* is a hollow cylindrical body made of metal and having a smaller diameter than that of the outer protective cover 56*b*. The air-fuel ratio sensing portion 56*a* is housed in the inner protective cover 56*c*, such that the inner protective cover 56*c* surrounds the air-fuel ratio sensing portion 56*a*. The inner protective cover 56*c* has a plurality of inlet holes 56*c*1 formed through its side face. The inlet holes 56*c*1 are through holes that permit exhaust gas that has entered "space between the outer protective cover 56*b* and the inner protective cover 56*c*" through the inlet holes 56*b*1 of the outer protective cover 56*b*, to flow into the inside of the inner protective cover 56*c*. In addition, the inner protective cover 56*c* has an outlet hole 56*c*2 formed through its bottom face, and the outlet hole 56*c*2 permits exhaust gas within the inner protective cover 56*c* to flow out to the outside.

Figure 5A:
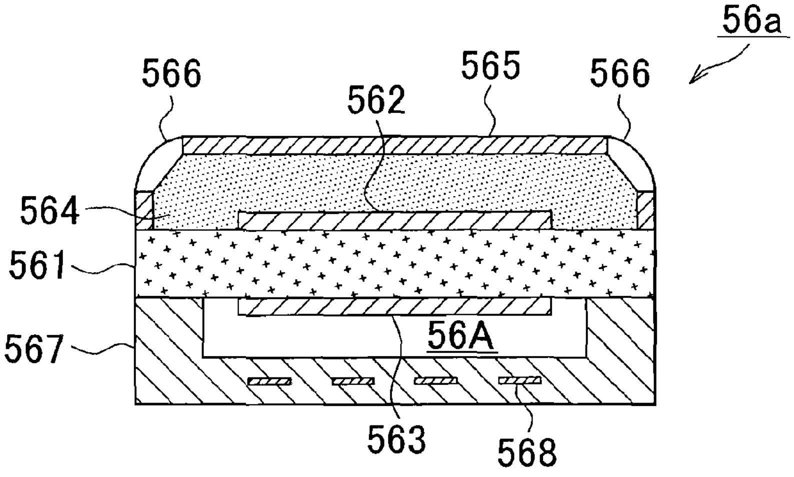
FIG. 5A to FIG. 5C are schematic cross-sectional views each showing an air-fuel ratio sensing portion included in the upstream air-fuel ratio sensor shown in FIG. 1.
Figure 5B:
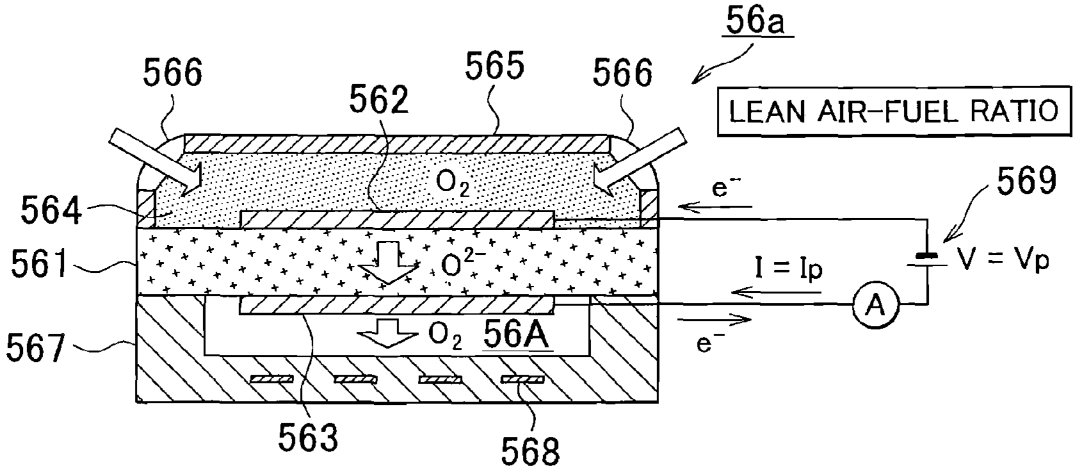
Figure 5C:
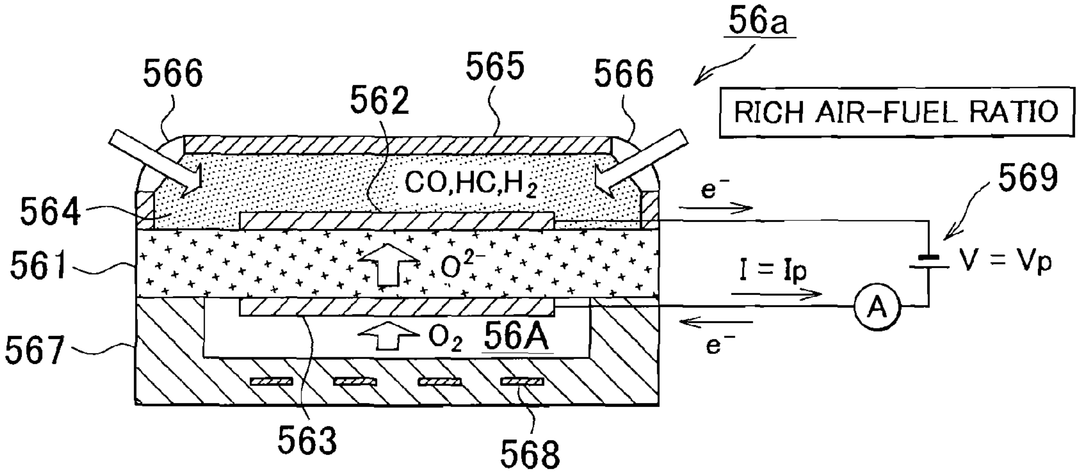

As shown in FIG. 5A through FIG. 5C, the air-fuel ratio sensing portion 56*a* includes a solid electrolyte layer 561, an exhaust-gas-side electrode layer 562, an atmosphere-side electrode layer 563, a diffusion resistance layer 564, a first wall portion 565, a catalyst portion 566, a second wall portion 567, and a heater 568.

The solid electrolyte layer 561 is a sintered body of an oxygen-ion-conductive oxide. In this embodiment, the solid electrolyte layer 561 is a "stabilized zirconia element" formed by dissolving CaO as a stabilizer in $ZrO_2$ (zirconia). The solid electrolyte layer 561 exhibits known "oxygen cell characteristics" and "oxygen pump characteristics" when its temperature is equal to or higher than an activating temperature.

The exhaust-gas-side electrode layer 562 is made of a noble metal, such as platinum (Pt), having a high catalytic activity. The exhaust-gas-side electrode layer 562 is formed on one surface of the solid electrolyte layer 561. The exhaust-gas-side electrode layer 562 is formed by chemical plating, or the like, so as to provide sufficient permeability (namely, it is formed as a porous layer).

The atmosphere-side electrode layer 563 is made of a noble metal, such as platinum (Pt), having a high catalytic activity. The atmosphere-side electrode layer 563 is formed on the other surface of the solid electrolyte layer 561, so as to be opposed to the exhaust-gas-side electrode layer 562 with the solid electrolyte layer 561 interposed therebetween. The atmosphere-side electrode layer 563 is formed by chemical plating, or the like, so as to provide sufficient permeability (namely, it is formed as a porous layer).

The diffusion resistance layer (diffusion-controlling or diffusion-limited layer) 564 is made of a porous ceramic material (heat-resisting inorganic substance). The diffusion resistance layer 564 is formed by, for example, plasma spraying, or the like, so as to cover the outer surface of the exhaust-gas-side electrode layer 562.

The first wall portion 565 is made of alumina as a ceramic that is dense and inhibits gas from passing therethrough. The first wall portion 565 is formed so as to cover the diffusion resistance layer 564 except for a corner portion (a part) of the diffusion resistance layer 564. Namely, the first wall portion 565 has a through portion that allows a part of the diffusion resistance layer 564 to be exposed to the outside.

The catalyst portion 566 is formed in the through portion so as to close the through portion of the first wall portion 565. Like the upstream catalyst 43, the catalyst portion 566 supports a catalyst substance that promotes oxidation-reduction reaction, and an oxygen storage material having an oxygen storage function. The catalyst portion 566 has a porous structure. Accordingly, exhaust gas (i.e., exhaust gas that has entered the inner protective cover 56*c* as described above) passes through the catalyst portion 566 and reaches the diffusion resistance layer 564, as indicated by white arrows in FIG. 5B and FIG. 5C, and the exhaust gas further passes through the diffusion resistance layer 564 and reaches the exhaust-gas-side electrode layer 562.

The second wall portion 567 is made of alumina as a ceramic that is dense and inhibits gas from passing therethrough. The second wall portion 567 is arranged to form "an atmosphere chamber 56A" as a space in which the atmosphere-side electrode layer 563 is housed. The atmosphere is introduced into the atmosphere chamber 56A.

A power supply 569 is connected to the upstream air-fuel ratio sensor 56. The power supply 569 applies a voltage V (=Vp) to the upstream air-fuel ratio sensor 56 so that the atmosphere-side electrode layer 563 is at a high potential, and the exhaust-gas-side electrode layer 562 is at a low potential.

The heater 568 is embedded in the second wall portion 567. The heater 568 generates heat when it is energized by the electric control unit 70 (which will be described later), so as to heat the solid electrolyte layer 561, exhaust-gas-side electrode layer 562 and the atmosphere-side electrode layer 563, and control the temperatures thereof.

Figure 6:
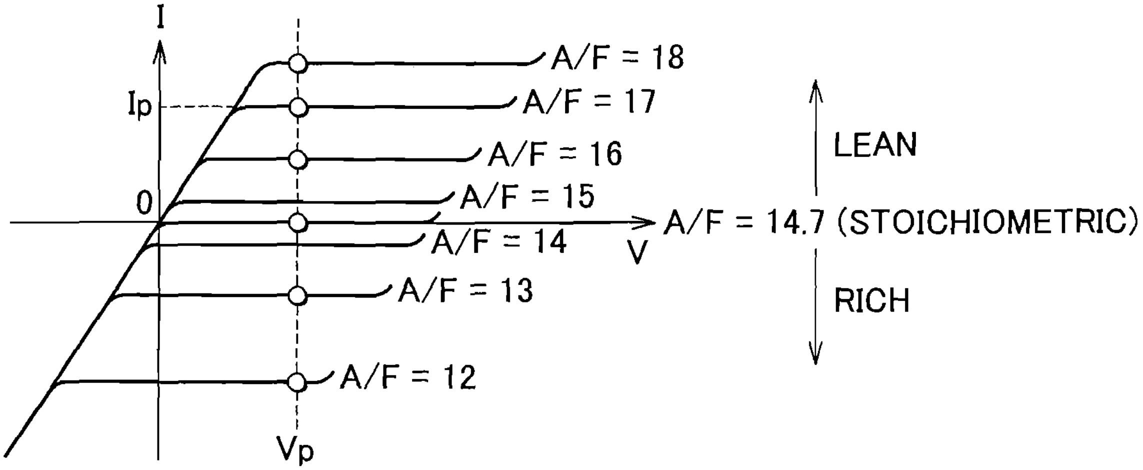
FIG. 6 is a graph relating to the first embodiment of the invention, and indicating the relationship between the air-fuel ratio of exhaust gas and a limiting current value of the air-fuel ratio sensor.

When the air-fuel ratio of exhaust gas is leaner or larger than the stoichiometric air-fuel ratio, the upstream air-fuel ratio sensor 56 constructed as described above causes oxygen that reaches the exhaust-gas-side electrode layer 562 through the diffusion resistance layer 564, to be ionized and passed through the solid electrolyte layer 561 toward the atmosphere-side electrode layer 563, as shown in FIG. 5B. As a result, current I flows from the positive electrode to negative electrode of the power supply 569. As shown in FIG. 6, where the voltage V is set to a predetermined value Vp or higher, the magnitude of the current I becomes a constant value that is proportional to the concentration of oxygen that reaches the exhaust-gas-side electrode layer 562 (the oxygen partial pressure, the air-fuel ratio of exhaust gas). The upstream air-fuel ratio sensor 56 generates a value (in voltage) into which this current (i.e., the limiting current Ip) is converted, as an output value Vabyfs.

On the other hand, when the air-fuel ratio of exhaust gas is richer or smaller than the stoichiometric air-fuel ratio, the upstream air-fuel ratio sensor 56 causes oxygen present in the atmosphere chamber 56A to be ionized and led to the exhaust-gas-side electrode layer 562, so as to oxidize unburned substances (such as HC, CO and $H_2$) that reaches the exhaust-gas-side electrode layer 562 through the diffusion resistance layer 564, as shown in FIG. 5C. As a result, current I flows from the negative electrode to positive electrode of the power supply 569. As shown in FIG. 6, where the voltage V is set to a predetermined value Vp or higher, the magnitude of this current I becomes a constant value that is proportional to the concentration of the unburned substances that reach the exhaust-gas-side electrode layer 562 (namely, the air-fuel ratio of exhaust gas). The upstream air-fuel ratio sensor 56 generates a value (in voltage) into which this current (i.e., the limiting current Ip) is converted, as an output value Vabyfs.

Figure 7:
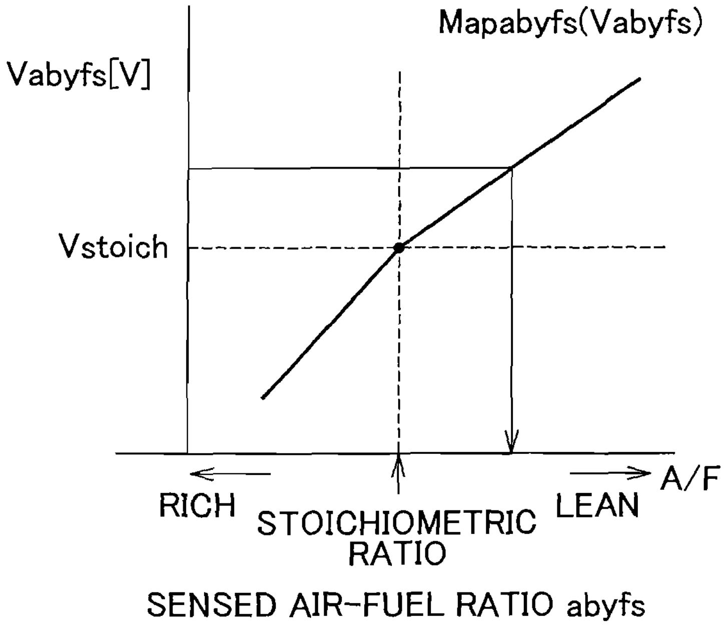
FIG. 7 is a graph relating to the first embodiment of the invention, and indicating the relationship between the air-fuel ratio of exhaust gas and the output value of the air-fuel ratio sensor.

Namely, the air-fuel ratio sensing portion 56*a* generates the output value Vabyfs commensurate with the air-fuel ratio of gas that flows at a location where the upstream air-fuel ratio sensor 56 is disposed, and reaches the air-fuel ratio sensing portion 56*a* through the inlet holes 56*b*1 of the outer protective cover 56*b* and the inlet holes 56*c*1 of the inner protective cover 56*c*, as "air-fuel ratio sensor output". The output value Vabyfs increases as the air-fuel ratio of the gas that reaches the air-fuel ratio sensing portion 56*a* becomes larger (or leaner). Namely, the output value Vabyfs is substantially proportional to the air-fuel ratio of the exhaust gas that reaches the air-fuel ratio sensing unit 56*a*, as shown in FIG. 7. When the air-fuel ratio of the gas that reaches the air-fuel ratio sensing portion 56*a* is the stoichiometric air-fuel ratio, the output value Vabyfs is equal to a value Vstoich corresponding to the stoichiometric air-fuel ratio.

Thus, the upstream air-fuel ratio sensor 56 can be said to be "an air-fuel ratio sensor which is mounted at a location between the exhaust gathering portion HK and the three-way catalyst 43 in the exhaust passage of the engine 10, and which has the air-fuel ratio sensing element (solid electrolyte layer) 561, the exhaust-gas-side electrode layer 562 and atmosphere-side electrode layer (reference-gas-side electrode layer) 563 that are positioned to be opposed to each other with the air-fuel ratio sensing element 561 interposed therebetween, and the porous layer (diffusion resistance layer) 564 that covers the exhaust-gas-side electrode layer, the air-fuel ratio sensor being operable to generate an output value commensurate with the amount of oxygen (oxygen concentration, oxygen partial pressure) and the amount of unburned substances (concentration of unburned substances, partial pressure of unburned substances) contained in the exhaust gas that reaches the exhaust-gas-side electrode layer 562 through the porous layer 564, out of the exhaust gas that passes the location where the air-fuel ratio sensor is mounted".

The electric control unit 70 stores an air-fuel ratio conversion table (map) Mapabyfs as shown in FIG. 7. The electric control unit 70 applies the air-fuel ratio conversion table Mapabyfs to the output value Vabyfs of the upstream air-fuel ratio sensor 56, thereby to detect the actual upstream-side air-fuel ratio abyfs (namely, obtain the detected air-fuel ratio abyfs).

In the meantime, the unburned substances contained in the exhaust gas and including hydrogen are converted to some extent at the catalyst portion 566, into harmless substances. However, when a large amount of unburned substances are contained in the exhaust gas, the unburned substances cannot be completely converted or removed at the catalyst portion 566. As a result, "oxygen, and excessive unburned substances compared to the oxygen" may reach the outer surface of the diffusion resistance layer 564. Also, since hydrogen has a smaller molecular size than the other unburned substances, as described above, hydrogen preferentially diffuses into the diffusion resistance layer 564, as compared with the other unburned substances.

In addition, the upstream air-fuel ratio sensor 56 is mounted at a location between the exhaust gathering portion HK and the upstream catalyst 43. Furthermore, the upstream air-fuel ratio sensor 56 is located such that the outer protective cover 56*b* is exposed to either the inside of the exhaust manifold 41 or the inside of the exhaust pipe 42.

More specifically, the upstream air-fuel ratio sensor 56 is placed in the exhaust passage, as shown in FIG. 3 and FIG. 4, such that the bottom faces of the protective covers (56*b*, 56*c*) extend in parallel with the flow of the exhaust gas EX, and the center axis CC of the protective covers (56*b*, 56*c*) is perpendicular to the flow of the exhaust gas EX. With this arrangement, the exhaust gas EX in the exhaust passage, which has reached the inlet holes 56*b*1 of the outer protective cover 56*b*, is sucked or drawn into the outer protective cover 56*b* and the inner protective cover 56*c*, due to the flow of the exhaust gas EX in the exhaust passage, which flows in the vicinity of the outlet hole 56*b*2 of the outer protective cover 56*b*.

Accordingly, the exhaust gas EX that flows in the exhaust passage passes through the inlet holes 56*b*1 of the outer protective cover 56*b*, and flows into the space between the outer protective cover 56*b* and the inner protective cover 56*c*, as indicated by arrow Ar1 in FIG. 3 and FIG. 4. Then, the exhaust gas flows into "the inside of the inner protective cover 56*c*" through "the inlet holes 56*c*1 of the inner protective cover 56*c*" as indicated by arrow Art, and then reaches the air-fuel ratio sensing portion 56*a*. Thereafter, the exhaust gas passes through "the outlet hole 56*c*2 of the inner protective cover 56*c* and the outlet hole 56*b*2 of the outer protective cover 56*b*", and flows out into the exhaust passage, as indicated by arrow Ar3 in FIG. 3 and FIG. 4.

Therefore, the flow rate of the exhaust gas within "the outer protective cover 56*b* and the inner protective cover 56*c*" varies according to the flow rate of the exhaust gas EX that flows in the vicinity of the outlet hole 56*b*2 of the outer protective cover 56*b* (accordingly, the intake air amount Ga as the amount of intake air per unit time). In other words, the length of time from "a point in time at which exhaust gas (first exhaust gas) having a certain air-fuel ratio reaches the inlet hole 56*b*1" to "a point in time at which the first exhaust gas reaches the air-fuel ratio sensing portion 56*a*" depends on the intake air amount Ga, but does not depend on the engine speed NE. Accordingly, the output response (response) of the upstream air-fuel ratio sensor 56 to "the air-fuel ratio of exhaust gas flowing in the exhaust passage" gets better as the amount (flow rate) of the exhaust gas flowing in the vicinity of the outer protective cover 56*b* of the upstream air-fuel ratio sensor 56 is larger, namely, as the intake air amount Ga is larger. This is also true in the case where the upstream air-fuel ratio sensor 56 has only the inner protective cover 56*c*.

Referring again to FIG. 1, the downstream air-fuel ratio sensor 57 is mounted in the exhaust pipe 42. The downstream air-fuel ratio sensor 57 is located downstream of the upstream catalyst 43 and upstream of the downstream catalyst (namely, in the exhaust passage between the upstream catalyst 43 and the downstream catalyst). The downstream air-fuel ratio sensor 57 is a known electromotive force type oxygen concentration sensor (a known concentration cell type oxygen concentration sensor using a solid electrolyte, such as stabilized zirconia). The downstream air-fuel ratio sensor 57 is operable to generate an output value Voxs commensurate with the sensed air-fuel ratio of gas passing through a portion of the exhaust passage in which the downstream air-fuel ratio sensor 57 is mounted. In other words, the output value Voxs is commensurate with or relates to the air-fuel ratio of gas that flows out of the upstream catalyst 43 and flows into the downstream catalyst.

Figure 8:
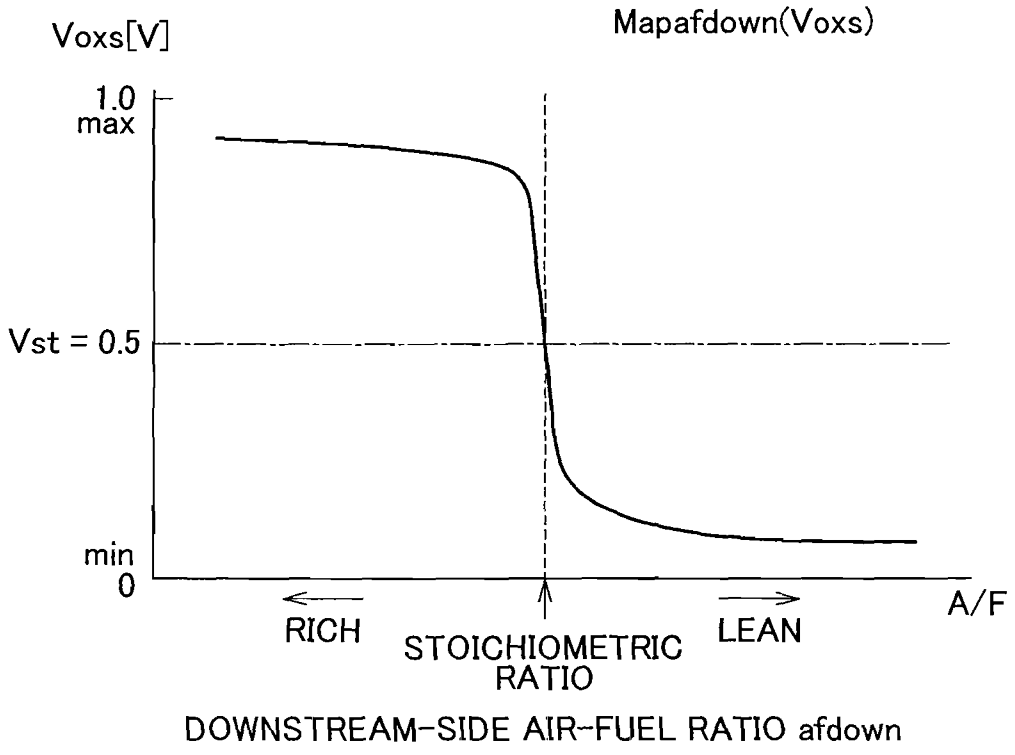
FIG. 8 is a graph relating to the first embodiment of the invention, and indicating the relationship between the air-fuel ratio of exhaust gas and the output value of a downstream air-fuel ratio sensor shown in FIG. 1.

As shown in FIG. 8, the output value Vox becomes equal to the maximum output value max (e.g., about 0.9V-1.0V) when the sensed air-fuel ratio of the gas is richer than the stoichiometric air-fuel ratio. The output value Voxs becomes equal to the minimum output value min (e.g., about 0.1V-0V) when the sensed air-fuel ratio of the gas is leaner than the stoichiometric ratio. Further, when the sensed air-fuel ratio of the gas is equal to the stoichiometric ratio, the output value Voxs becomes equal to a voltage Vst (intermediate voltage Vst, for example, about 0.5V) substantially intermediate between the maximum output value max and the minimum output value min. The output value Voxs rapidly changes from the maximum output value max to the minimum output value min when the sensed air-fuel ratio of the gas changes from an air-fuel ratio that is richer than the stoichiometric ratio to an air-fuel ratio that is leaner than the stoichiometric ratio. Similarly, the output value Voxs rapidly changes from the minimum output value min to the maximum output value max when the sensed air-fuel ratio of the gas changes from an air-fuel ratio that is leaner than the stoichiometric ratio to an air-fuel ratio that is richer than the stoichiometric ratio.

The downstream air-fuel ratio sensor 57 has a solid electrolyte layer, and "an exhaust-gas-side electrode layer and an atmosphere-side (reference-gas-side) electrode layer" which are disposed on the opposite surfaces of the solid electrolyte layer such that the electrode layers are opposed to each other with the solid electrolyte layer interposed therebetween, and the exhaust-gas-side electrode layer is covered with a porous layer (protective layer). Accordingly, the gas to be sensed is converted into oxygen-balanced gas (gas obtained after oxygen and unburned substances are chemically combined) when it passes through the porous layer, and reaches the exhaust-gas-side electrode layer. Hydrogen passes through the porous layer more easily than the other unburned substances. It is to be noted that "excessive hydrogen generated when an imbalance in the air-fuel ratio among individual cylinders occurs" is converted and removed by means of the upstream catalyst 43, except for special cases. Accordingly, except for special cases, the output value Voxs of the downstream air-fuel ratio sensor 57 does not change depending on the degree of ununiformity or imbalance in the air-fuel ratio among cylinders.

The acceleration stroke sensor 58 as shown in FIG. 1 is operable to generate a signal indicative of the amount of operation Accp of the accelerator pedal AP operated by the driver (the accelerator pedal operation amount, the stroke or position of the accelerator pedal AP). The accelerator pedal operation amount Accp increases as the amount of operation of the accelerator pedal AP increases.

The electric control unit 70 is a known microcomputer comprising "CPU, ROM in which programs to be executed by the CPU, tables (maps, functions), constants, etc. are stored in advance, RAM in which the CPU temporarily stores data as needed, backup RAM, interfaces including AD converters, etc.".

The backup RAM is supplied with electric power from a battery installed on the vehicle, irrespective of the position (any of OFF position, START position and ON position) of an ignition key switch (not shown) of the vehicle on which the engine 10 is installed. The backup RAM, when it is supplied with electric power from the battery, stores data in response to a command of the CPU (data is written into the backup RAM), and holds (stores) the data so that the data can be retrieved or read. Thus, the backup RAM is able to hold data even when the operation of the engine 10 is stopped.

The backup RAM cannot hold data if supply of electric power from the battery to the backup RAM is interrupted or stopped, such as when the battery is removed from the vehicle. Therefore, the CPU is configured to initialize data to be stored in the backup RAM (set data to default values) when the supply of electric power to the backup RAM is resumed. The backup RAM may be a non-volatile memory, such as EEPROM, from and into which data can be read and written.

The electric control unit 70 is connected to the above-described sensors, and signals are supplied from these sensors to the CPU. Also, the electric control unit 70 is adapted to send drive signals (command signals) to the ignition plug (actually, an igniter) provided for each cylinder, fuel injection valve 33 provided for each cylinder, the throttle valve actuator, and so forth, in response to commands of the CPU.

The electric control unit 70 sends a command signal to the throttle valve actuator, so that the throttle opening TA increases as the obtained operation amount Acc of the accelerator pedal is larger. Namely, the electric control unit 70 has a throttle valve driving means for changing the opening of "the throttle valve 34 disposed in the intake passage of the engine 10" according to the amount (accelerator pedal operation amount Accp) of an accelerating operation performed on the engine 10, which amount is changed by the driver.

(About Shift of Air-fuel Ratio to Lean Side (Erroneous Lean Correction) due to Selective Diffusion of Hydrogen and Main Feedback Control) The reason why the air-fuel ratio of the engine shifts to the lean side, due to the feedback control (main feedback control) of the air-fuel ratio based on the output value Vabyfs of the upstream air-fuel ratio sensor 56, when the air-fuel ratio of an imbalance cylinder shifts to a richer (or smaller) value than that of non-imbalance (or normal) cylinders, has been described above.

Figure 2:
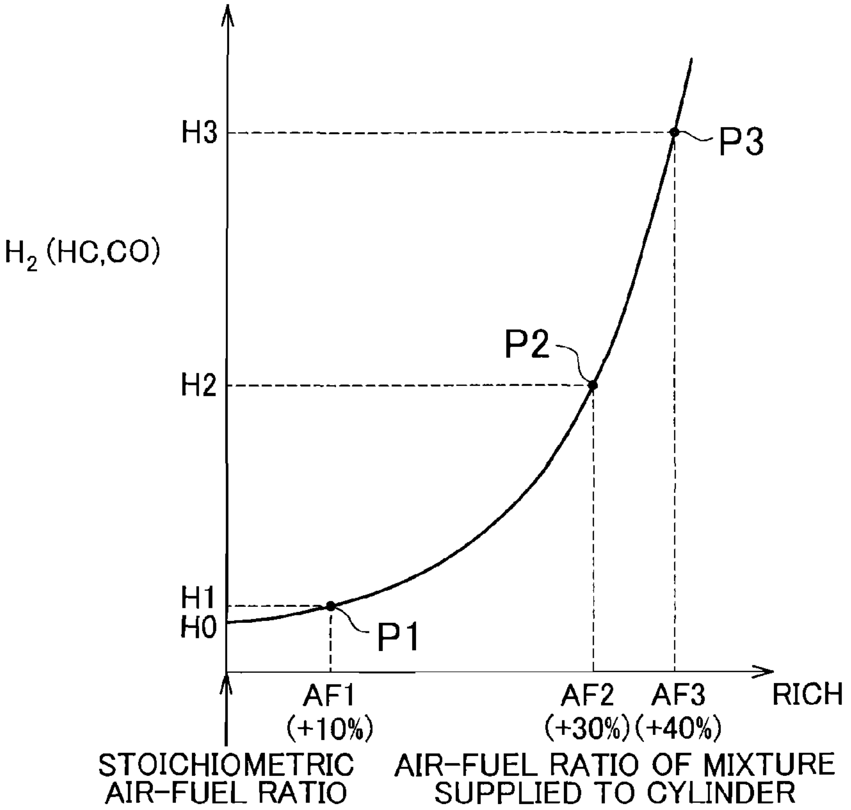
FIG. 2 is a graph indicating the relationship between the air-fuel ratio of an air-fuel mixture supplied to a cylinder, and the amount of unburned components emitted from the cylinder.

Namely, the amount of the unburned substances (HC, CO and $H_2$) in the exhaust gas rapidly increases as the air-fuel ratio of an air-fuel mixture supplied to each cylinder becomes richer than the stoichiometric air-fuel ratio, as shown in FIG. 2.

Therefore, the total amount SH1 of hydrogen $H_2$ contained in exhaust gas "when an excessive amount of fuel which is larger by 40% than the nominal amount is supplied only to a particular cylinder" is expressed as "SH1=H3+H0+H0+H0=H3+3·H0", according to FIG. 2.

Suppose that the air-fuel ratio A0/F0 is equal to the stoichiometric air-fuel ratio where A0 represents the amount (weight) of air drawn into each cylinder of the engine 10, and F0 represents the amount (weight) of fuel supplied to each cylinder. In this case, the total amount of fuel supplied to the four cylinders (the amount of fuel supplied to the engine as a whole while each cylinder completes one combustion cycle) "when an excessive amount of fuel which is larger by 40% than the nominal amount is supplied only to a particular cylinder" is expressed as 4.4·F0 (=1.4·F0+1·F0+1·F0+1·F0). Accordingly, the true average air-fuel ratio of the engine is "4·A0/(4.4·F0)=A0/(1.1·F0)".

On the other hand, the total amount SH2 of hydrogen $H_2$ contained in exhaust gas "when the amount of fuel supplied to each cylinder is uniformly larger by 10% than the nominal amount" is expressed as "SH2=H1+H1+H1+H1=4·H1", according to FIG. 2. In this case, the total amount of fuel supplied to the engine 10 is expressed as 4.4·F0(=1.1·F0+1.1·F0+1.1·F0+1.1F0). Accordingly, the true average air-fuel ratio of the engine is also "4·A0/(4.4·F0)=A0/(1.1·F0)". While the amount H1 is slightly larger than the amount H0, both the amount H1 and the amount H0 are extremely small. Namely, the amount H1 and the amount H0, when compared with the amount H3, may be said to be generally equal to each other. Accordingly, the total amount SH1 of hydrogen is considerably larger than the total amount SH2 of hydrogen (SH1>>SH2).

Thus, even when the true average value of the air-fuel ratios of air-fuel mixtures supplied to the engine 10 as a whole is equal, the total amount SH1 of hydrogen contained in the exhaust gas when an imbalance in the air-fuel ratio among cylinders occurs is significantly larger than the total amount SH2 of hydrogen contained in the exhaust gas when no imbalance in the air-fuel ratio among cylinders occurs.

Accordingly, when only the amount of fuel supplied to the particular cylinder is an excessive amount that is larger by 40% than the nominal amount, the sensed air-fuel ratio abyfs represented by the output value Vabyfs of the upstream air-fuel ratio sensor is richer (smaller) than "the true average value (A0/(1.1·F0)) of the air-fuel ratios of the mixtures supplied to the engine 10 as a whole", because of "selective diffusion of hydrogen $H_2$" in the diffusion resistance layer 564.

Namely, when an imbalance in the air-fuel ratio among cylinders occurs, the concentration of hydrogen $H_2$ at the exhaust-gas-side electrode layer 562 of the upstream air-fuel ratio sensor 56 becomes higher than that of the case where no imbalance in the air-fuel ratio among cylinders occurs, even if the average value of the air-fuel ratio of exhaust gas is equal; therefore, the output value Vabyfs of the upstream air-fuel ratio sensor 56 indicates an air-fuel ratio that is richer than "the true average value of the air-fuel ratio". As a result, the true average of the air-fuel ratios of the mixtures supplied to the engine 10 as a whole is controlled under the main feedback control, to be leaner (larger) than the target air-fuel ratio (stoichiometric air-fuel ratio). The first control device and control devices according to other embodiments of the invention make compensation for the correction to the lean side, thereby to reduce the amount of emissions of nitrogen oxides.

In the case where the air-fuel ratio of an imbalance cylinder shifts to be leaner (larger) than the air-fuel ratio of non-imbalance (or normal) cylinders, too, "shift of the air-fuel ratio to the lean side due to selective diffusion of hydrogen" takes place. This situation occurs, for example, when the fuel injection valve 33 provided for the particular cylinder has an injection characteristic that "it injects fuel in an amount that is noticeably smaller than the designated fuel injection amount".

Suppose that the amount of fuel supplied to a certain particular cylinder (which will be called "first cylinder" for the sake of convenience) is an excessively small amount (i.e., 0.6·F0) that is smaller by 40% than the nominal amount, and that the amount of fuel supplied to each of the remaining three cylinders (second, third and fourth cylinders) is equal to the amount (i.e., F0) of fuel which makes the air-fuel ratio of these cylinders equal to the stoichiometric air-fuel ratio. In this case, it is assumed that no misfiring occurs.

In the above case, it is assumed that the amount of fuel supplied to each of the first through fourth cylinders is increased by the same given amount (10%), under the main feedback control. In this case, the amount of fuel supplied to the first cylinder becomes equal to 0.7·F0, and the amount of fuel supplied to each of the second through fourth cylinders becomes equal to 1.1·F0.

In the above-described condition, the total amount of air supplied to the engine 10 as a four-cylinder engine (i.e., the amount of air supplied to the engine 10 as a whole while each cylinder completes one combustion cycle) is 4·A0. Also, the total amount of fuel supplied to the engine 10 (the amount of fuel supplied to the engine 10 as a whole while each cylinder completes one combustion cycle), as a result of the main feedback control, is 4·F0 (=0.7·F0+1.1·F0+1.1·F0+1.1·F0). Accordingly, the true average value of the air-fuel ratios of the mixtures supplied to the engine 10 as a whole becomes equal to "4·A0/(4·F0)=A0/F0", namely, becomes equal to the stoichiometric air-fuel ratio.

However, in fact, "the total amount SH3 of hydrogen $H_2$ contained in exhaust gas" in this condition is expressed as "SH3=H4+H1+H1+H1=H4+3·H1". H4 is the amount of hydrogen produced when the air-fuel ratio is A0/(0.7·F0), and is substantially equal to value H0 (the amount of hydrogen produced when the air-fuel ratio is equal to the stoichiometric ratio).

On the other hand, when no imbalance in the air-fuel ratio among cylinders occurs, and the air-fuel ratio of each cylinder is equal to the stoichiometric air-fuel ratio, "the total amount SH4 of hydrogen $H_2$ contained in exhaust gas" is expressed as "SH4=H0+H0+H0+H0=4·H0". It follows that the relationship that "the total amount SH3 (=H4+3·H1)=H0+3·H1 is larger than the total amount SH4 (=4·H0)" is established.

Accordingly, in the case where "the air-fuel ratio of the imbalance cylinder shifts to be leaner than the air-fuel ratio of the non-imbalance cylinders", too, an influence of selective diffusion of hydrogen appears in the output value Vabyfs of the upstream air-fuel ratio sensor 56. Namely, the sensed air-fuel ratio abyfs obtained by applying the output value Vabyfs to the air-fuel ratio conversion table Mapabyfs becomes richer (smaller) than the stoichiometric air-fuel ratio as an upstream-side target air-fuel ratio abyfr. As a result, the main feedback control is further carried out, so that the true average value of the air-fuel ratios of the mixtures supplied to the engine 10 as a whole is corrected to be leaner than the stoichiometric ratio. The first control device and control devices according to other embodiments of the invention are configured to make compensation for the correction to the lean side, thereby to reduce the amount of emissions of nitrogen oxides.

(Acquisition of Pre-correction Air-fuel Ratio Imbalance Index Value) Next, "a method of acquiring a pre-correction air-fuel ratio imbalance index value and a post-correction air-fuel ratio imbalance index value" employed by the first control device will be described. The post-correction air-fuel ratio imbalance index value is a parameter representing "the degree of ununiformity (imbalance) in the air-fuel ratio among cylinders" caused by changes in characteristics of the fuel injection valves 33, for example. The first control device increases the designated fuel injection amount Fi (reduces the designated air-fuel ratio), based on the post-correction air-fuel ratio imbalance index value. The first control device initially acquires the pre-correction air-fuel ratio imbalance index value, and then acquires the post-correction air-fuel ratio imbalance value, by correcting the pre-correction air-fuel ratio imbalance index value based on "the intake air amount Ga and the engine speed NE".

The first control device acquires the pre-correction air-fuel ratio imbalance index value in the following manner. (1) When certain parameter acquisition conditions (air-fuel ratio imbalance index value acquisition conditions) are satisfied, the first control device obtains "the amount of change per given unit time" of "the output value Vabyfs of the upstream air-fuel ratio sensor 56 (or the output value that has been subjected to the high-pass filter processing as described above) each time a given time (a fixed sampling time ts) elapses.

The "amount of change of the output value Vabyfs per unit time" may be referred to as a differential value (time differential value d(Vabyfs)/dt, first-order differential value d(Vabyfs)/dt), when the unit time is an extremely short time around about 4 milliseconds, for example. Accordingly, "the amount of change of the output value Vabyfs per unit time" may be called "rate of change ΔAF" or "slope ΔA/F". Also, the rate of change ΔAF may be called "basic index value" or "basic parameter".

(2) The first control device obtains an average value AveΔAF of absolute values |ΔAF| of a plurality of change rates ΔAF obtained over one unit combustion cycle period. The unit combustion cycle period is a period of time it takes for the crankshaft to rotate by a crank angle required for completion of one combustion cycle for each cylinder, in all of the cylinders from which exhaust gases that will reach the single upstream air-fuel ratio sensor 56 are emitted. The engine 10 of this embodiment is an in-line four-cylinder, four-cycle engine, and exhaust gases from the first through fourth cylinders reach the single upstream air-fuel ratio sensor 56. Thus, the unit combustion cycle period is a period it takes for the crankshaft to rotate by a crank angle of 720°.

(3) The first control device obtains an average value of the average values AveΔAF obtained with respect to the respective unit combustion cycle periods, and uses the obtained value as a pre-correction air-fuel ratio imbalance index value RIMB. It is to be understood that the pre-correction air-fuel ratio imbalance index value RIMB is not limited to the thus obtained value, but may be acquired by various methods (which will be described later).

If the intake air amount Ga and the engine speed NE are constant, the pre-correction air-fuel ratio imbalance index value RIMB (value correlated with the rate of change ΔAF) obtained as described above increases as "the degree of ununiformity (imbalance) in the air-fuel ratio among cylinders, or differences in the air-fuel ratio among individual cylinders" is/are larger. In other words, the pre-correction air-fuel ratio imbalance index value RIMB may be referred to as an air-fuel ratio fluctuation index value AFD that increases as fluctuations in the output value Vabyfs of the upstream air-fuel ratio sensor 56 are larger. The pre-correction air-fuel ratio imbalance index value RIMB increases as differences (cylinder-to-cylinder air-fuel ratio differences) in the air-fuel ratio of an air-fuel mixture supplied to a combustion chamber of each of the cylinders, among individual cylinders, are larger. In the following, the reason will be explained.

The exhaust gases emitted from the respective cylinders reach the upstream air-fuel ratio sensor 56 in the order in which the ignition takes place in the cylinder (which is the same as the order in which exhaust gas is discharged from the cylinder). If there is no difference in the air-fuel ratio among the cylinders (i.e., if no imbalance in the air-fuel ratio among the cylinders occurs), the air-fuel ratio of exhaust gas emitted from each cylinder and reaching the upstream air-fuel ratio sensor 56 is substantially equal. Accordingly, when there is no difference in the air-fuel ratio among the cylinders, the output value Vabyfs varies as indicated by the broken line C1 in FIG. 9B. Namely, if there is no imbalance in the air-fuel ratio among the cylinders, the output value Vabyfs of the upstream air-fuel ratio sensor 56 assumes a generally flat waveform pattern. Therefore, if there is no difference in the air-fuel ratio among the cylinders, the absolute value of the change rate ΔAF (differential value d(Vabyfs)/dt) is small, as indicated by the broken line C3 in FIG. 9C.

On the other hand, if "the fuel injection valve 33 that injects fuel into a particular cylinder (e.g., first cylinder)" is provided with "a characteristic that it injects a larger amount of fuel than the designated fuel injection amount", a difference in the air-fuel ratio among the cylinders becomes large. Namely, there arises a large difference between the air-fuel ratio of exhaust gas of the particular cylinder (the air-fuel ratio of the imbalance cylinder), and the air-fuel ratio of exhaust gases of the cylinders other than the particular cylinder (the air-fuel ratio of the non-imbalance cylinders).

Figure 9A:
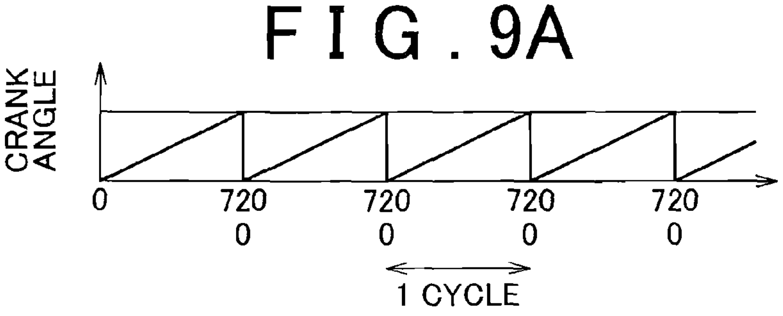
FIG. 9A to FIG. 9D are time charts relating to the first embodiment of the invention, and showing "the behavior of each value related to the air-fuel ratio imbalance index value" in the case where an air-fuel ratio imbalance condition among cylinders occurs (the degree of ununiformity in the air-fuel ratio among cylinder is large) and the case where no air-fuel ratio imbalance condition among cylinders occurs (there is no ununiformity in the air-fuel ratio among cylinders)
Figure 9B:
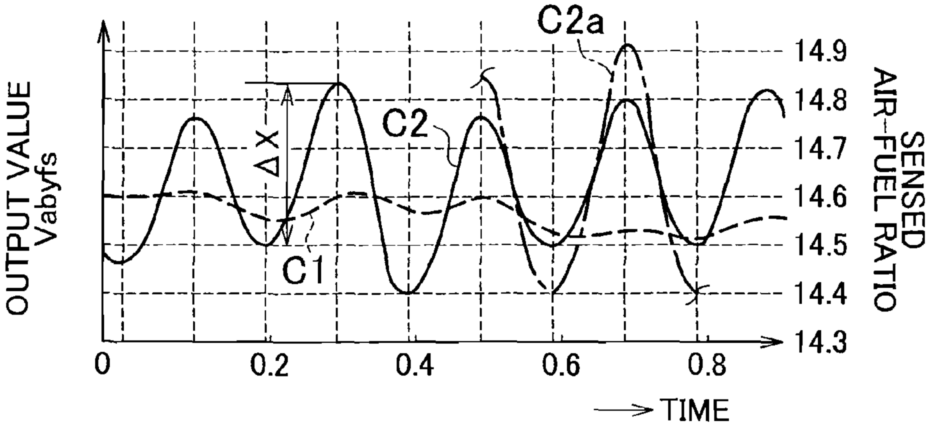

Accordingly, when an imbalance in the air-fuel ratio among the cylinders occurs, the output value Vabyfs largely fluctuates at intervals of the unit combustion cycle period, as indicated by the solid line C2 in FIG. 9B, for example. Therefore, when an imbalance in the air-fuel ratio among the cylinders occurs, the absolute value of the change rate ΔAF (differential value d(Vabyfs)/dt) becomes large, as indicated by the solid line C4 in FIG. 9C.

Furthermore, the absolute value |ΔAF| of the change rate ΔAF fluctuates by a larger degree as the air-fuel ratio of the imbalance cylinder deviates further from the air-fuel ratio of the non-imbalance cylinders. For example, if the output value varies as indicated by the solid line C2 in FIG. 9B when a difference between the air-fuel ratio of the imbalance cylinder and the air-fuel ratio of the non-imbalance cylinders is a first value, the output value Vabyfs varies as indicated by the one-dot chain line C2*a* in FIG. 9B when a difference between the air-fuel ratio of the imbalance cylinder and the air-fuel ratio of the non-imbalance cylinders is "a second value that is larger than the first value".

Figure 10:
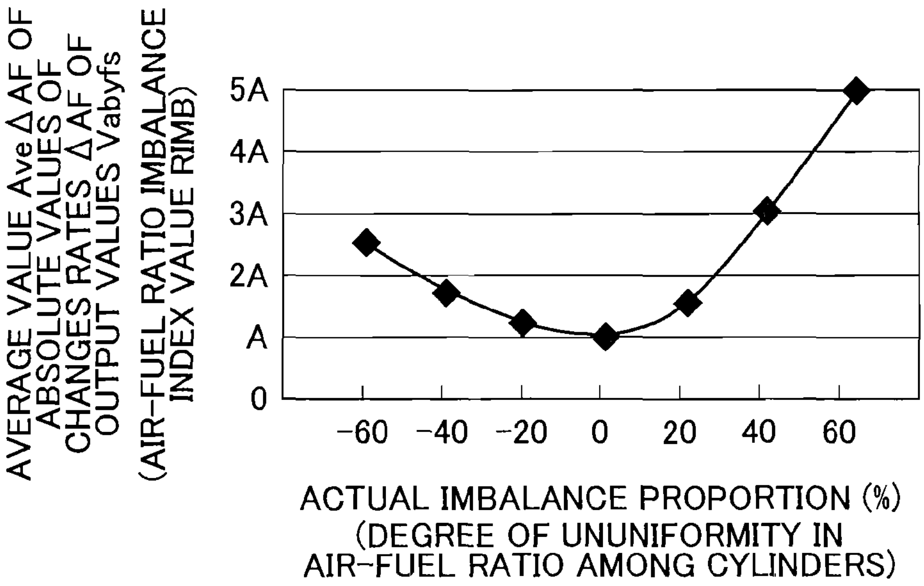
FIG. 10 is a graph relating to the first embodiment of the invention, and indicating the relationship between the actual imbalance proportion and an air-fuel ratio imbalance index value correlated with the rate of change of the output value of the upstream air-fuel ratio sensor.

Accordingly, as indicated by FIG. 10, the average value AveΔAF (the pre-correction air-fuel ratio imbalance index value RIMB) of the absolute values |ΔAF| of the change rates ΔAF over "the plurality of unit combustion cycle periods" increases as the air-fuel ratio of the imbalance cylinder deviates further from the air-fuel ratio of the non-imbalance (or normal) cylinders (as the actual imbalance proportion increases). Namely, the pre-correction air-fuel ratio imbalance index value RIMB increases as the actual cylinder-to-cylinder air-fuel ratio difference increases (as the degree of ununiformity in the air-fuel ratio among the cylinders increases).

Once the first control device acquires the pre-correction air-fuel ratio imbalance index value RIMB, it acquires a post-correction air-fuel ratio imbalance index value RIMBh by correcting the pre-correction air-fuel ratio imbalance index value RIMB based on "the intake air amount Ga and the engine speed NE".

Figure 11:
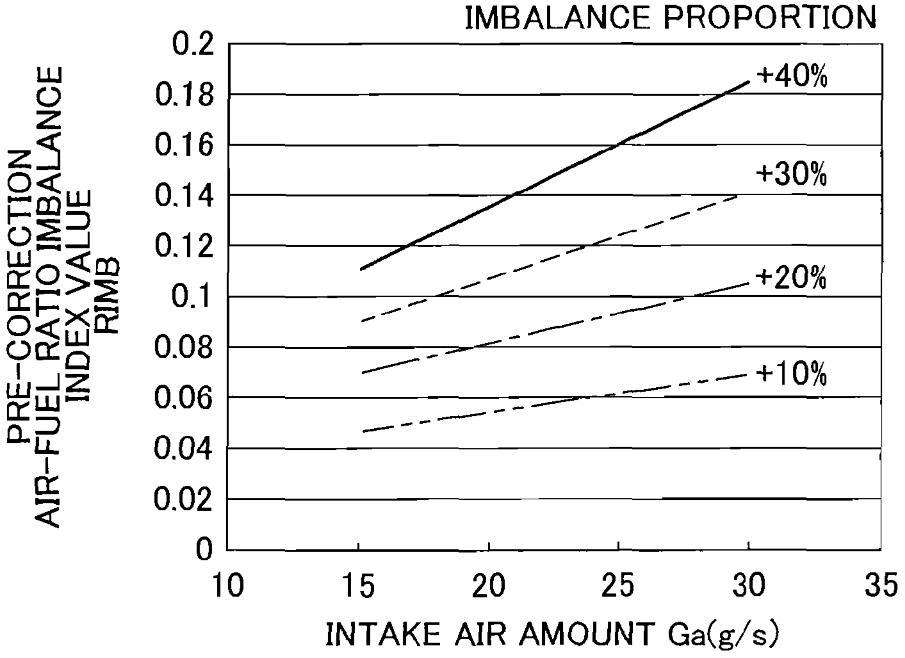
FIG. 11 is a graph relating to the first embodiment of the invention, and indicating the relationship between a pre-correction air-fuel ratio imbalance index value obtained based on the rate of change of the output value of the upstream air-fuel ratio sensor, and the intake air amount.

(Acquisition of Post-Correction Air-Fuel Ratio Imbalance Index Value) As shown in FIG. 11, the pre-correction air-fuel ratio imbalance index value RIMB increases as the intake air amount Ga of the engine 10 increases, even when the degree of ununiformity (imbalance proportion) in the air-fuel ratio among individual cylinders is equal to "a certain fixed value".

One of the reasons for the above phenomenon is that the output response (response) of the upstream air-fuel ratio sensor 56 to "the air-fuel ratio of exhaust gas flowing in the exhaust passage" gets better as the quantity of flow (flow rate) of the exhaust gas is larger (i.e., as the intake air amount Ga is larger), due to the presence of the outer protective cover 56*b* and the inner protective cover 56*c*, as described above. Another reason is that the output response of the upstream air-fuel ratio sensor 56 is dependent on the pressure of the exhaust gas.

Figure 12:
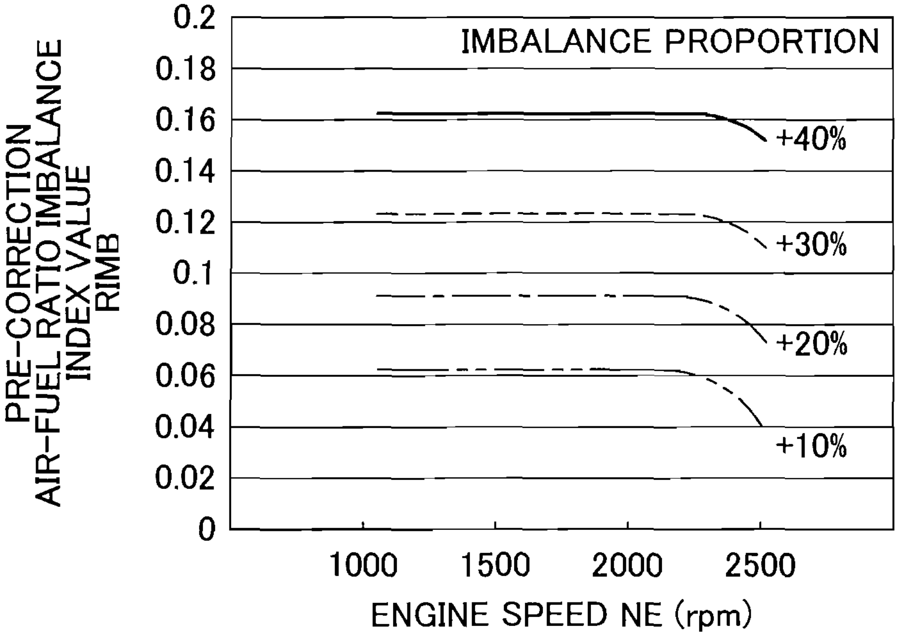
FIG. 12 is a graph relating to the first embodiment of the invention, and indicating the relationship between the pre-correction air-fuel ratio imbalance index value obtained based on the rate of change of the output value of the upstream air-fuel ratio sensor, and the engine speed.

Furthermore, as shown in FIG. 12, the pre-correction air-fuel ratio imbalance index value RIMB varies under the influence of the engine speed NE, even when the degree of ununiformity (imbalance proportion) in the air-fuel ratio among individual cylinders is equal to "a certain fixed value". For example, the pre-correction air-fuel ratio imbalance index value RIMB decreases as the engine speed NE increases, in a high-speed rotation range in which the engine speed NE is equal to or higher than a given rotational speed.

The reason for the above phenomenon may be as follows. The exhaust gas of the non-imbalance cylinders reaches the upstream air-fuel ratio sensor 56 before the output value Vabyfs of the upstream air-fuel ratio sensor 56 is reduced down to a value indicative of the air-fuel ratio of the exhaust gas of the imbalance cylinder which gas has reached the upstream air-fuel ratio sensor 56; as a result, the output value Vabyfs is not sufficiently changed to be equal to the value corresponding to the air-fuel ratio of the exhaust gas of the imbalance cylinder.

Thus, the first control device acquires a value (intake air amount correlation value) correlated with the intake air amount Ga over a period (index value acquisition period) in which the pre-correction air-fuel ratio imbalance index value RIMB is acquired, and also acquires a value (engine speed correlation value) correlated with the engine speed NE over the index value acquisition period. The intake air amount correlation value is, for example, the average value GaAve of the intake air amount Ga in the index value acquisition period.

The engine speed correlation value is, for example, the average value NEAve of the engine speed NE in the index value acquisition period.

Then, once the pre-correction air-fuel ratio imbalance index value RIMB is acquired, the first control device acquires a post-correction air-fuel ratio index value RIMBh, by correcting the pre-correction air-fuel ratio imbalance index value RIMB based on the intake air amount correlation value and the engine speed correlation value. In this manner, the control device is able to obtain a post-correction air-fuel ratio imbalance index value RIMBh representing the degree of ununiformity of the air-fuel ratio among cylinders with high accuracy, irrespective of the intake air amount and the engine speed in the index value acquisition period. In other words, the post-correction air-fuel ratio imbalance index value RIMBh is obtained by normalizing the pre-correction air-fuel ratio imbalance index value RIMB into a value corresponding to "a specified intake air amount and a specified engine speed".

As is understood from FIG. 11 and FIG. 12, the degree of dependence (correlation) of the pre-correction air-fuel ratio imbalance index value RIMB on (with) the engine speed NE is smaller than the degree of dependence (correlation) of the pre-correction air-fuel ratio imbalance index value RIMB on (with) the intake air amount Ga. Accordingly, the first control device may acquire the post-correction air-fuel ratio imbalance index value RIMBh, by correcting the pre-correction air-fuel ratio imbalance index value RIMB solely based on the intake air amount correlation value.

(Summary of Fuel Injection Amount Control) Next, the summary of fuel injection amount control executed by the first control device will be described. The first control device corrects (increases or reduces) the designated fuel injection amount in a feedback manner, so that the sensed air-fuel ratio abyfs represented by the output value Vabyfs of the upstream air-fuel ratio sensor 56 coincides with "the target air-fuel ratio (upstream-side target air-fuel ratio) abyfr". Namely, the first control device performs main feedback control.

Also, the first control device increases the designated fuel injection amount, so that an increased amount of fuel is injected as the acquired post-correction air-fuel ratio imbalance index value RIMBh is larger. Namely, the first control device performs fuel amount increasing control for increasing/correcting the designated fuel injection amount, so that "the air-fuel ratio (i.e., designated air-fuel ratio) determined by the designated fuel injection amount" becomes "a richer (or smaller) air-fuel ratio" as the acquired post-correction air-fuel ratio imbalance index value RIMBh is larger.

More specifically, when the post-correction air-fuel ratio imbalance index value RIMBh is equal to "0" (namely, when there is no difference in the air-fuel ratio among cylinders), the first control device sets the upstream-side target air-fuel ratio abyfr to the stoichiometric air-fuel ratio stoich as a reference air-fuel ratio. As the air-fuel ratio imbalance index value RIMB increases, the first control device reduces the upstream-side target air-fuel ratio abyfr within a range smaller than the stoichiometric ratio stoich. As a result, the air-fuel ratio of the engine obtained through the main feedback control gets close to the stoichiometric air-fuel ratio. Namely, the "shift of the air-fuel ratio to the lean side due to selective diffusion of hydrogen" as described above can be prevented. Consequently, the first control device is able to avoid an otherwise possible increase in the amount of emissions of NOx.

(Actual Operation) Next, the actual operation of the first control device will be described.

Figure 13:
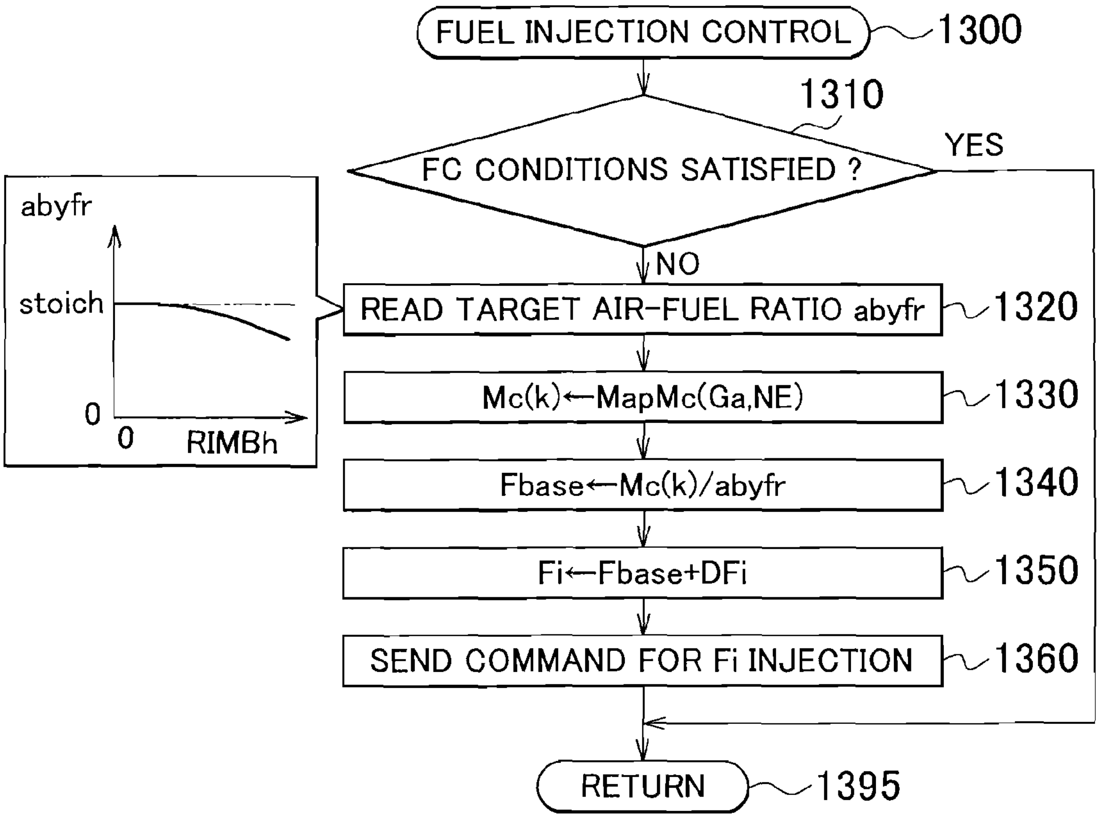
FIG. 13 is a flowchart illustrating a routine executed by CPU of the fuel injection amount control system (first control device) according to the first embodiment of the invention.

(Fuel Injection Control) Each time the crank angle of a given cylinder becomes equal to a predetermined crank angle before the top dead center of the suction stroke, the CPU of the first control device repeatedly executes a fuel injection control routine as illustrated in FIG. 13, with respect to the given cylinder. The predetermined crank angle is, for example, BTDC90°CA (90° crank angle before the top dead center of the suction stroke). The cylinder whose crank angle is equal to the predetermined crank angle will also be called "fuel injection cylinder". The CPU calculates the designated fuel injection amount Fi and issues a command for fuel injection, by executing the fuel injection control routine.

If the crank angle of a given cylinder coincides with the predetermined crank angle before the top dead center of the suction stroke, the CPU starts processing from step 1300, and determines in step 1310 whether fuel-cut conditions (which will be denoted as "FC conditions") are satisfied.

Suppose that the FC conditions are not satisfied at present. In this case, the CPU makes a negative decision "No" in step 1310, executes step 1320 through step 1360 which will be described below, in the order as indicated in FIG. 13, and proceeds to step 1395 to once finish this routine.

The CPU reads a target air-fuel ratio abyfr determined by a routine of FIG. 18 which will be described later (step 1320). Basically, if a sub-feedback amount KSFB as will be described later is "0", the target air-fuel ratio abyfr is determined so as to be gradually reduced within a range equal to or smaller than the stoichiometric air-fuel ratio as the post-correction air-fuel ratio imbalance index value RIMBh increases.

The CPU obtains "an in-cylinder intake air amount Mc(k)" as "the amount of air drawn into the fuel injection cylinder during a single suction stroke of the fuel injection cylinder", based on "the intake air amount Ga measured by the air flow meter 51, the engine speed NE obtained based on a signal of the crank position sensor 54, and a lookup table MapMc" (step 1330). The in-cylinder intake air amount Mc(k), which is associated with each suction stroke, is stored in the RAM. The in-cylinder intake air amount Mc(k) may be calculated using a known air amount estimation model (a model constructed according to physical laws, which simulates the behavior of air in the intake passage).

The CPU obtains a basic fuel injection amount Fbase, by dividing the in-cylinder intake air amount Mc(k) by the target air-fuel ratio abyfr (step 1340). Thus, the basic fuel injection amount Fbase is a feed-forward amount of the fuel injection amount mathematically required to obtain the target air-fuel ratio abyfr. This step 1340 provides a feed-forward control means (air-fuel ratio control means) for making the air-fuel ratio of an air-fuel mixture supplied to the engine equal to the target air-fuel ratio abyfr.

The CPU corrects the basic fuel injection amount Fbase with a main feedback amount DFi (step 1350). More specifically, the CPU calculates a designated fuel injection amount (final fuel injection amount) Fi, by adding the main feedback amount DFi to the basic fuel injection amount Fbase. The main feedback amount DFi is an air-fuel ratio feedback amount for making the air-fuel ratio of the engine (accordingly, the air-fuel ratio of exhaust gas flowing into the upstream catalyst 43) equal to the target air-fuel ratio abyfr, and is also a feedback amount of air-fuel ratio obtained based on the output value Vabyfs of the upstream air-fuel ratio sensor 56. A method of calculating the main feedback amount DFi will be described later.

The CPU sends an injection command signal for causing "the fuel of the designated fuel injection amount Fi" to be injected from "the fuel injection valve 33 corresponding to the fuel injection cylinder", to the fuel injection valve 33 (step 1360).

As a result, the fuel of the amount mathematically required (the amount supposed to be required) to make the air-fuel ratio of the engine equal to the target air-fuel ratio abyfr is injected from the fuel injection valve 33 of the fuel injection cylinder. Namely, step 1330 through step 1360 provide a designated fuel injection amount control means for controlling the designated fuel injection amount Fi so that "the air-fuel ratio of air-fuel mixtures supplied to the combustion chambers 21 of two or more cylinders (all of the cylinders in this embodiment) from which exhaust gases that will reach the upstream air-fuel ratio sensor 56 are emitted" becomes equal to the target air-fuel ratio abyfr.

According to the routine of FIG. 13, the target air-fuel ratio abyfr is reduced as the post-correction air-fuel ratio imbalance index value RIMBh is larger; therefore, the basic fuel injection amount Fbase obtained in step 1340 is increased to be larger as the post-correction air-fuel ratio imbalance index value RIMBh is larger. Furthermore, the main feedback amount DFi which will be described later is changed so that the sensed air-fuel ratio abyfs coincides with the target air-fuel ratio abyfr. Accordingly, the designated fuel injection amount Fi obtained in step 1350 is increased to be larger as the post-correction air-fuel ratio imbalance index value RIMBh is larger. Namely, the routine of FIG. 13 provides a fuel amount increasing means for increasing the designated fuel injection amount Fi for correction thereof, so that "the air-fuel ratio (designated air-fuel ratio=Mc(k)/Fi) determined by the designated fuel injection amount Fi" becomes a richer air-fuel ratio (smaller air-fuel ratio) as the acquired post-correction air-fuel ratio imbalance index value RIMBh is larger.

If the FC conditions are satisfied at the time when the CPU executes step 1310, the CPU makes an affirmative decision (Yes) in step 1310, and directly proceeds to step 1395 to once finish this routine. In this case, no fuel injection is carried out in step 1360, but fuel cut control (control for stopping fuel supply) is executed.

Figure 14:
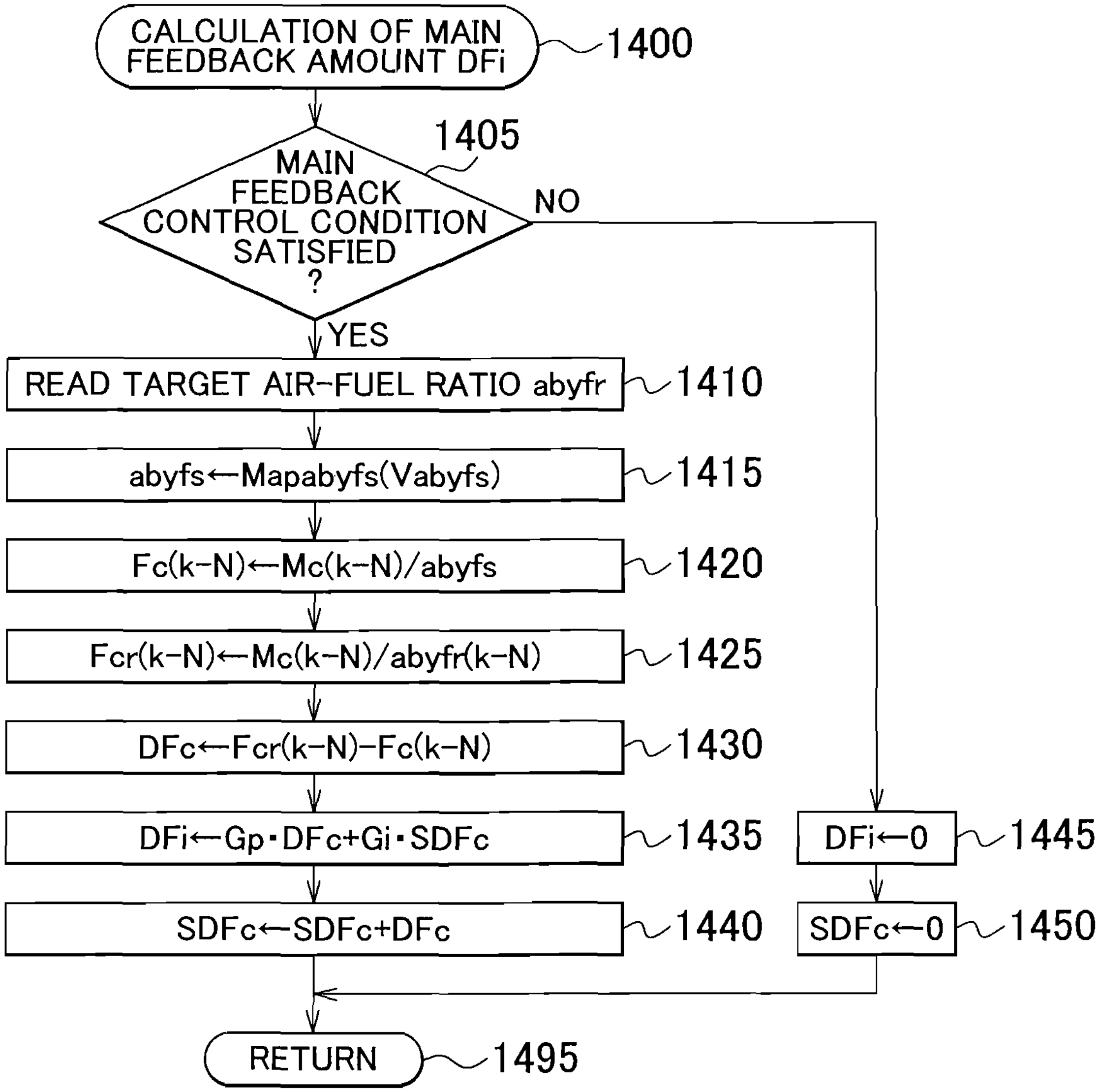
FIG. 14 is a flowchart illustrating a routine executed by the CPU of the first control device.

(Calculation of Main Feedback Amount) The CPU repeatedly executes "a main feedback amount calculation routine" illustrated in the flowchart of FIG. 14 upon each lapse of a predetermined time. Each time the predetermined time expires, the CPU starts processing from step 1400, and proceeds to step 1405 to determine whether "a main feedback control condition (upstream air-fuel ratio feedback control condition)" is satisfied.

The main feedback control condition is satisfied when all of the following conditions A1 to A3 are satisfied. The upstream air-fuel ratio sensor 56 has been activated (condition A1). The load KL of the engine is equal to or lower than a threshold value KLth (condition A2). The engine is not under fuel cut control (condition A3).

The above-indicated load KL is a load factor obtained according to Equation (1) below. The accelerator pedal operation amount Accp may be used in place of the load KL. In Eq. (1) below, Mc is the in-cylinder intake air amount, ρ is the air density (in units of (g/1)), L is the amount of emissions of the engine 10 (in units of (1)), and "4" indicates the number of cylinders of the engine 10.

$$KL=(Mc/(\rho\cdot L/4))\cdot 100\% \quad (1)$$

If the main feedback control condition is satisfied, the CPU makes an affirmative decision (Yes) in step 1405, executes step 1410 through step 1440 which will be described below, in the order as indicated in FIG. 14, and proceeds to step 1495 to once finish this routine.

The CPU reads a target air-fuel ratio abyfr calculated separately in the routine illustrated in FIG. 18 (step 1410).

The CPU obtains the sensed air-fuel ratio abyfs, by applying the output value Vabyfs of the upstream air-fuel ratio sensor 56 to the table Mapabyfs indicated in FIG. 7, as indicated in Equation (2) below (step 1415).

$$abyfs=Mapabyfs(Vabyfs) \quad (2)$$

The CPU obtains "an in-cylinder fuel supply amount Fc(k−N)" as "the amount of fuel that was actually supplied to the combustion chamber 21 at the time N cycles prior to the present time", according to Equation (3) below (step 1420). Namely, the CPU obtains the in-cylinder fuel supply amount Fc(k−N), by dividing "the in-cylinder intake air amount Mc(k−N) at the time N cycles (i.e., N·720° crank angle) prior to the present time" by the "sensed air-fuel ratio abyfs".

$$Fc(k-N)=Mc(k-N)/abyfs \quad (3)$$

Thus, the in-cylinder intake air amount Mc(k−N) at the time N cycles prior to the present time is divided by the sensed air-fuel ratio abyfs, so as to obtain the in-cylinder fuel supply amount Fc(k−N), because "a length of time corresponding to N cycles" is required for "the exhaust gas produced by combustion of the air-fuel mixture in the combustion chamber 21" to reach the upstream air-fuel ratio sensor 56.

The CPU obtains "a target in-cylinder fuel supply amount Fcr(k−N)" as "the amount of fuel that should have been supplied to the combustion chamber 21 at the time N cycles prior to the present time", according to Equation (4) below (step 1425). Namely, the CPU obtains the target in-cylinder fuel supply amount Fcr(k−N), by dividing the in-cylinder intake air amount Mc(k−N) at the time N cycles prior to the present time, by the target air-fuel ratio abyfr(k−N) at the time N cycles prior to the present time.

$$Fcr(k-N)=Mc(k-N)/abyfr(k-N) \quad (4)$$

The CPU obtains an in-cylinder fuel supply amount deviation DFc, according to Equation (5) below. (step 1430). Namely, the CPU obtains the in-cylinder fuel supply amount deviation DFc, by subtracting the in-cylinder fuel supply amount Fc(k−N) from the target in-cylinder fuel supply amount Fcr(k−N). The in-cylinder fuel supply amount deviation DFc is an amount representing an amount of excess or deficiency of the fuel supplied to the cylinder at the time N strokes prior to the present time.

$$DFc=Fcr(k-N)-Fc(k-N) \quad (5)$$

The CPU obtains the main feedback amount DFi according to Equation (6) below (step 1435). In Eq. (6), Gp is preset proportional gain, and Gi is preset integral gain. Also, "value SDFe" in Eq. (6) is "an integral value of the in-cylinder fuel supply amount deviation DFc". Namely, the CPU calculates "the main feedback amount DFi" according to proportional integral (PI) control for making the sensed air-fuel ratio abyfs equal to the target air-fuel ratio abyfr.

$$DFi=Gp\cdot DFc+Gi\cdot SDFc \quad (6)$$

The CPU obtains a new integral value SDFc of the in-cylinder fuel supply amount deviation, by adding the in-cylinder fuel supply amount deviation DFc obtained in the above step 1430 to the current integral value SDFc of the in-cylinder fuel supply amount deviation DFc (step 1440).

In the above-described manner, the main feedback amount DFi is calculated by proportional integral control, and the thus obtained main feedback amount DFi is reflected by the designated fuel injection amount Fi in step 1350 of FIG. 13 as described above.

On the other hand, if it is determined in step 1405 of FIG. 14 that the main feedback control condition is not satisfied, the CPU makes a negative decision (No) in step 1405, and proceeds to step 1445 to set the value of the main feedback amount DFi to "0". Then, the CPU stores "0" in the integral value SDFc of the in-cylinder fuel supply amount deviation in step 1450. Thereafter, the CPU proceeds to step 1495 to once finish the routine of FIG. 14. Thus, when the main feedback control condition is not satisfied, the main feedback amount DFi is set to "0". Accordingly, no correction is performed using the main feedback amount DFi of the basic fuel injection amount Fbase.

Figure 15:
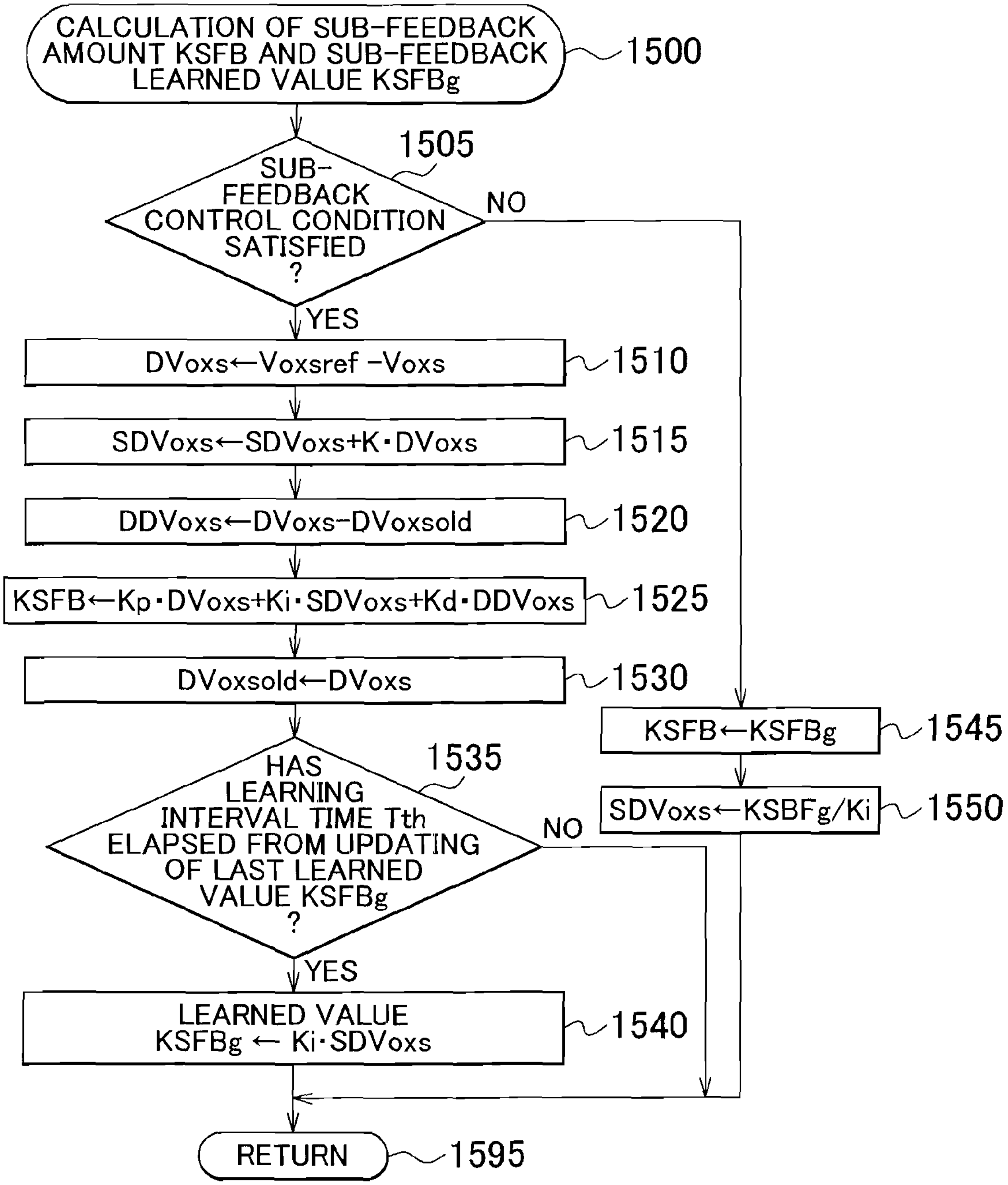
FIG. 15 is a flowchart illustrating a routine executed by the CPU of the first control device.

(Calculation of Sub-Feedback Amount KSFB and Sub-Feedback (FB) Learned Value SFBg) The CPU repeatedly executes "a routine for calculating a sub-feedback amount KSFB and a sub-feedback learned value KSFBg" illustrated in the flowchart of FIG. 15, upon each lapse of a predetermined time. Each time the predetermined time expires, the CPU starts processing from step 1500, and proceeds to step 1505 to determine whether a sub-feedback control condition is satisfied.

The sub-feedback control condition is satisfied when the following condition B1 and condition B2 are satisfied. The main feedback control condition is satisfied (condition B1). The downstream air-fuel ratio sensor 57 has been activated (condition B2).

If the sub-feedback control condition is satisfied, the CPU makes an affirmative decision (Yes) in step 1505, and executes step 1510 through step 1530 (a sub-feedback amount calculating process) which will be described below. Then, the CPU proceeds to step 1535.

The CPU obtains "an output deviation amount DVoxs" as a difference between "a downstream-side target value Voxsref" and "an output value Voxs of the downstream air-fuel ratio sensor 57", according to Equation (7) below (step 1510). Namely, the CPU obtains "the output deviation amount DVoxs" by subtracting "the output value Voxs of the downstream air-fuel ratio sensor 57 at the present time" from "the downstream-side target value Voxsref". The downstream-side target value Voxsref is set to a value equivalent to a value (e.g., the stoichiometric air-fuel ratio) corresponding to the reference air-fuel ratio abyfr0 within the window of the three-way catalyst 43.

$$DVoxs=Voxsref-Voxs \tag{7}$$

The CPU obtains a new integral value SDVoxs (=SDVoxs (n)) of the output deviation amount, by adding "the product of the output deviation amount DVoxs obtained in the above step 1510 and gain K" to "the current integral value SDVoxs (=SDVoxs(n−1))", according to Equation (8) below (step 1515). In this embodiment, the gain K is set to "1". The integral value SDVoxs is also called "time integral value SDVoxs or integral processing value SDVoxs".

$$SDVoxs(n)=SDVoxs(n-1)+K\cdot DVoxs \tag{8}$$

The CPU obtains a new differential value DDVoxs of the output deviation amount, by subtracting "the last output deviation amount DVoxsold as an output deviation amount calculated when the last cycle of this routine was executed" from "the output deviation amount DVoxs calculated in the above step 1510" (step 1520).

The CPU obtains a sub-feedback amount KSFB, according to Equation (9) below (step 1525). In Eq. (9), Kp is a preset proportional gain (proportional constant), Ki is a preset integral gain (integral constant), and Kd is a preset differential gain (differential constant). Namely, Kp·DVoxs is a proportional term, Ki·SDVoxs is an integral term, and Kd·DDVoxs is a differential term. The integral term Ki·SDVoxs is also a steady-state component of the sub-feedback amount KSFB.

$$KSFB=Kp\cdot DVoxs+Ki\cdot SDVoxs+Kd\cdot DDVoxs \tag{9}$$

The CPU stores "the output deviation amount DVoxs calculated in the above step 1510" as "the last output deviation amount DVoxsold".

Thus, the CPU calculates "the sub-feedback amount KSFB" through the proportional integral and differential (PID) control for making the output value Voxs of the downstream air-fuel ratio sensor 57 equal to the downstream-side target value Voxsref. The sub-feedback amount KSFB is used for calculating the target air-fuel ratio abyfr (abyfr=stoich−KSFB−kacc·daf), as will be described later.

Namely, when the output value Voxs is smaller than the downstream-side target value Voxsref (when the exhaust gas flowing into the downstream air-fuel ratio sensor 57 is fuel-lean), the sub-feedback amount KSFB gradually increases. As the sub-feedback amount KSFB increases, the target air-fuel ratio abyfr is corrected so as to be reduced (to be a richer air-fuel ratio). As a result, the true average air-fuel ratio of the engine 10 is reduced (to be a rich air-fuel ratio), so that the output value Voxs increases to be equal to the downstream-side target value Voxsref.

To the contrary, when the output value Voxs is larger than the downstream-side target value Voxsref (when the exhaust gas flowing into the downstream air-fuel ratio sensor 57 is fuel-rich), the sub-feedback amount KSFB gradually decreases.

As the sub-feedback amount KSFB decreases, the target air-fuel ratio abyfr is corrected so as to be increased (to be a leaner air-fuel ratio). As a result, the true average air-fuel ratio of the engine 10 is increased (to be a lean air-fuel ratio), so that the output value Voxs is reduced to be equal to the downstream-side target value Voxsref.

The CPU then proceeds to step 1535 to determine whether a learning interval time Tth has elapsed from the time when the learned value (sub-feedback learned value) KSFBg of the sub-feedback amount was updated last time. At this time, if the learning interval time Tth has not elapsed from the last updating of the sub-feedback learned value KSFBg, the CPU makes a negative decision (No) in step 1535, and directly proceeds to step 1595 to once finish the routine of FIG. 15.

On the other hand, if the learning interval time Tth has elapsed from the last updating of the sub-feedback learned value KSFBg, at the time that the CPU executes step 1535, the CPU makes an affirmative decision (Yes) in step 1535, and proceeds to step 1540 to store the product (Ki·SDVoxs) of the current integral value SDVoxs and the integral gain Ki as the sub-feedback learned value KSFBg, in the backup RAM. Then, the CPU proceeds to step 1595 to once finish the routine of FIG. 15.

Thus, the CPU receives the steady-state term Ki·SDVoxs of the sub-feedback amount KSFB at the time of expiration of a longer period (learning interval time Tth) than the period or interval of updating of the sub-feedback amount KSFB, as the sub-feedback learned value KSFBg.

On the other hand, if the sub-feedback control condition is not satisfied when the CPU executes step 1505, the CPU makes a negative decision (No) in step 1505, and proceeds to step 1545 to set the sub-feedback learned value KSFBg as the sub-feedback amount KSFB. Namely, the CPU stops updating of the sub-feedback amount KSFB. Then, the CPU proceeds to step 1550, and stores a value (sub-feedback learned value KSFBG/integral gain Ki) obtained by dividing the sub-feedback learned value KSFBg by the integral gain Ki, as an integral value SDVoxs, in the backup RAM. Then, the CPU proceeds to step 1595 to once finish the routine of FIG. 15.

The output value Voxs of the downstream air-fuel ratio sensor 57 reflects the true average air-fuel ratio of the engine 10 (accordingly, "the air-fuel ratio corrected excessively to the lean side" due to the main feedback control). This is because a large amount of hydrogen produced when an imbalance in the air-fuel ratio among cylinders occurs is converted and removed at the upstream catalyst 43. Accordingly, through the sub-feedback control using the sub-feedback amount for making the output value Voxs equal to the downstream-side target value Voxsref, the true average air-fuel ratio of the engine 10 is corrected to be equal to "a value (e.g., the stoichiometric air-fuel ratio) corresponding to the reference air-fuel ratio abyfr0 within the window of the three-way catalyst 43". Accordingly, if the sub-feedback amount is controlled to an appropriate value, a large amount of NOx is prevented from being emitted from the engine.

However, the sub-feedback control is performed so as to gradually change "the average of the air-fuel ratio of the engine". Therefore, in general, the sub-feedback amount KSFB is updated so as to slowly change the target air-fuel ratio abyfr. Accordingly, a period over which the sub-feedback amount is not controlled to an appropriate value appears, for example, after starting of the engine. In addition, the degree of "erroneous lean correction" varies depending on operating conditions of the engine 10, even where the degree of ununiformity in the air-fuel ratio among cylinders is "a certain specified value". For example, the degree of erroneous lean correction increases as the intake air amount Ga increases.

Accordingly, when there is an imbalance in the air-fuel ratio among cylinders, and the engine is in transient operation, for example, after the engine is started, or when rapid changes (in particular, increases) in the intake air amount occur, the period over which the sub-feedback amount is an inappropriate value is prolonged, and the true average air-fuel ratio of the engine 10 may not be corrected to the reference air-fuel ratio abyfr0.

On the other hand, the first control device changes the target air-fuel ratio abyfr, based on the post-correction air-fuel ratio imbalance index value RIMBh. Accordingly, the true average air-fuel ratio of the engine 10 can be made equal to the reference air-fuel ratio abyfr0.

(Acquisition of Pre-correction Air-fuel Ratio Imbalance Index Value RIMB) Next, a process for acquiring an air-fuel ratio imbalance index value will be described. The CPU executes a routine illustrated in the flowchart of FIG. 16A and FIG. 16B, each time 4 ms (a given sampling time ts) elapses.

Each time the given sampling time (ts) expires, the CPU starts processing from step 1600, and proceeds to step 1605 to determine whether a value of a parameter acquisition permission flag Xkyoka is "1".

The value of the parameter acquisition permission flag Xkyoka is set to "1" when a parameter acquisition condition (air-fuel ratio imbalance index value acquisition permission condition) which will be described later is satisfied at the time when the absolute crank angle CA is equal to 0°, and is immediately set to "0" at the time when the parameter acquisition condition fails to be satisfied.

The parameter acquisition condition is satisfied when all of the following condition C1 through condition C5 are satisfied. Accordingly, the parameter acquisition condition is not satisfied if at least one of the following conditions (condition C1 through condition C5) is not satisfied. Needless to say, the conditions that constitute the parameter acquisition condition are not limited to the condition C1 through condition C5 below.

The intake air amount Ga obtained by the air flow meter 51 is within a predetermined range (condition C1). Namely, the intake air amount Ga is equal to or larger than a lower threshold value GaLoth of the air flow rate, and is equal to or smaller than a higher threshold value GaHith of the air flow rate. The engine speed NE is within a predetermined range (condition C2). Namely, the engine speed NE is equal to or higher than a lower threshold value of the engine speed, and is equal to or lower than a higher threshold value of the engine speed. The coolant temperature THW is equal to or higher than a threshold value THWth of the coolant temperature (condition C3). The main feedback control condition is satisfied (condition C4). The engine is not under fuel cut control (condition C5).

Suppose that the value of the parameter acquisition permission flag Xkyoka is "1". In this case, the CPU makes an affirmative decision (Yes) in step 1605, and proceeds to step 1610 to obtain "the current output value Vabyfs of the upstream air-fuel ratio sensor 56". Before executing step 1610, the CPU stores the output value Vabyfs obtained during execution of the last cycle of this routine, as the last output value Vabyfsold. Namely, the last output value Vabyfsold is an output value Vabyfs obtained at the time 4 ms (sampling time ts) prior to the present time. The initial value of the output value Vabyfs is set to a value corresponding to the stoichiometric air-fuel ratio in an initial routine. The initial routine is executed by the CPU when the ignition key switch of the vehicle on which the engine 10 is installed is turned from OFF to ON.

Then, the CPU proceeds to step 1615 to obtain the rate of change ΔAF (differential value d(Vabyfs)/dt) of the output value Vabyfs, update an integrated value SAFD of absolute values |ΔAF| of the change rates ΔAF, and update a cumulative number counter Cn for counting the number of times the absolute value |ΔAF| of the change rate ΔAF is accumulated on the integrated value SAFD. In the following, these updating methods will be specifically described.

(Acquisition of Rate of Change ΔAF) The rate of change ΔAF of the output value Vabyfs (differential value d(Vabyfs)/dt) is data (a basic index amount, a basic parameter) that provides original data of the pre-correction air-fuel ratio imbalance index value RIMB. The CPU obtains the rate of change ΔAF, by subtracting the output value Vabyfsold of the last cycle from the output value Vabyfs of the current cycle. Namely, where the output value Vabyfs of the current cycle is denoted as Vabyfs(n), and the output value Vabyfsold of the last cycle is denoted as Vabyfs(n−1), the CPU determines "the change rate ΔAF(n) of the current cycle" in step 1615, according to Equation (10) as follows.

$$\Delta AF(n)=Vabyfs(n)-Vabyfs(n-1) \tag{10}$$

In this connection, the CPU may obtain a value (post high-pass filtering output value VHPF) obtained by subjecting the output value Vabyfs to high-pass filtering, so as to remove a fluctuation component of the central air-fuel ratio of the engine 10 contained in the output value Vabyfs of the upstream air-fuel ratio sensor 56, from the output value Vabyfs, and may acquire an amount of change of the post high-pass filtering output value VHPF over the sampling time ts, as the rate of change ΔAF.

(Updating of Integrated Value SAFD of Absolute Values |ΔAF| of Change Rates ΔAF) The CPU obtains the integrated value SAFD(n) of this cycle, according to Equation (11) below. Namely, the CPU updates the integrated value SAFD by adding the absolute value |ΔAF(n)| of the calculated change rate ΔAF of this cycle, to the last integrated value SAFD(n−1) as of the time when the CPU proceeds to step 1615.

$$SAFD(n)=SAFD(n-1)+|\Delta AF(n)| \quad (11)$$

Figure 9C:
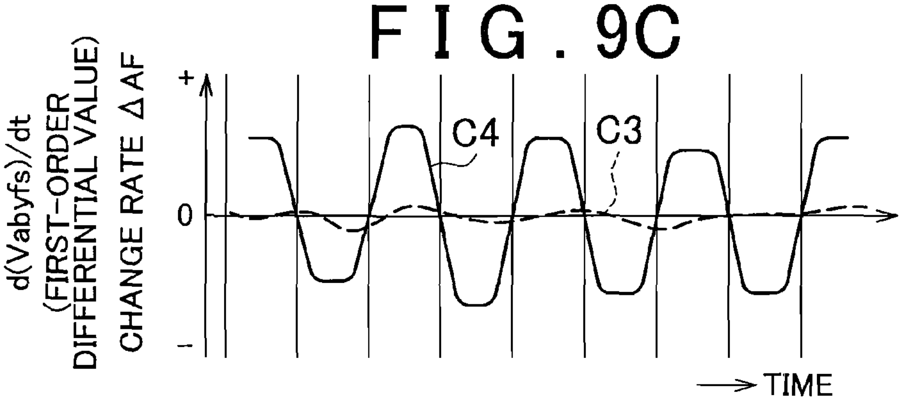

"The absolute value |ΔAF(n)| of the change rate ΔAF(n) of this cycle" is added to the integrated value SAFD, because the rate of change ΔAF(n) may be a positive value or a negative value, as is understood from FIG. 9B and FIG. 9C. The integrated value SAFD is also set to "0" in the above-described initial routine.

(Updating of Cumulative Number Counter Cn for Counting the Number of Times Absolute Value |ΔAF| of Change Rate ΔAF is Accumulated on Integrated Value SAFD) The CPU increases the value of the counter Cn by "1", according to Equation (12) below. Cn(n) is a counter value after updating, and Cn(n−1) is a counter value before updating. The value of the counter Cn is set to "0" in the above-described initial routine, and is also set to "0" in step 1660 and step 1665 which will be described later. Thus, the value of the counter Cn indicates the number of items of data representative of the absolute value |ΔAF| of the change rate ΔAF, which have been integrated or accumulated to provide the integrated value SAFD.

$$Cn(n)=Cn(n-1)+1 \quad (12)$$

Then, the CPU proceeds to step 1620 to determine whether the crank angle CA (absolute crank angle CA) relative to the compression top dead center of the reference cylinder (the first cylinder in this embodiment) is equal to 720° crank angle. In this step, if the absolute crank angle CA is smaller than 720°, the CPU makes a negative decision (No) in step 1620, and directly proceeds to step 1695 to once finish the routine of FIG. 16A and FIG. 16B.

Step 1620 is provided for defining the minimum unit period for obtaining the average value of the absolute values |ΔAF| of the change rates ΔAF. In this embodiment, "720° crank angle as a unit combustion cycle period" corresponds to the minimum period. While the minimum period may be shorter than 720° crank angle, it is desirable that the minimum period is equal to or longer than a period that is two or more times as long as the sampling time ts. Further, it is desirable that the minimum period is obtained by multiplying the unit combustion cycle period by a natural number or positive integer.

If, on the other hand, the absolute crank angle CA is equal to 720° crank angle when the CPU executes step 1620, the CPU makes an affirmative decision (Yes) in step 1620, and proceeds to step 1625. In step 1625, the CPU obtains "the current intake air amount Ga and the current engine speed NE". Then, the CPU proceeds to step 1630.

In step 1630, the CPU calculates the average value AveΔAF of the absolute values |ΔAF| of the change rates ΔAF, updates the integrated value Save of the average values AveΔAF, updates the integrated value SGa of the intake air amounts Ga, updates the integrated value SNE of the engine speeds NE, and updates a cumulative number counter Cs. In the following, these updating methods will be specifically described.

(Calculation of Average Value AveΔAF of Absolute Values |ΔAF| of Change Rates ΔAF) The CPU calculates the average value AveΔAF of the absolute values |ΔAF| of the change rates ΔAF, by dividing the integrated value SAFD by the value of the counter Cn, as indicated in Equation (13) below. Then, the CPU sets the integrated value SAFD and the value of the counter Cn to "0".

$$Ave\Delta AF=SAFD/Cn \quad (13)$$

(Updating of Integrated Value Save of Average Values AveΔAF) The CPU obtains the integrated value Save(n) of this cycle, according to Equation (14) below. Namely, the CPU updates the integrated value Save, by adding the calculated average value AveΔAF of this cycle to the integrated value Save(n−1) of the last cycle as of the time when the CPU proceeds to step 1630. The value of the integrated value Save(n) is set to "0" in the initial routine as described above, and is also set to "0" in step 1660 which will be described later.

$$Save(n)=Save(n-1)+Ave\Delta AF \quad (14)$$

(Updating of Integrated Value SGa of Intake Air Amounts Ga) The CPU obtains the integrated value SGa(n) of this cycle, according to Equation (15) below. Namely, the CPU updates the integrated value SGa, by adding the intake air amount Ga of this cycle obtained in the above step 1625, to the integrated value SGa(n−1) of the last cycle as of the time when the CPU proceeds to step 1630. The value of the integrated value SGa(n) is set to "0" in the initial routine as described above, and is also set to "0" in step 1660 which will be described later.

$$SGa(n)=SGa(n-1)+Ga \quad (15)$$

(Updating of Integrated Value SNE of Engine Speed NE) The CPU obtains the integrated value SNE(n) of this cycle, according to Equation (16) below. Namely, the CPU updates the integrated value SNE, by adding the engine speed NE of this cycle obtained in the above step 1625, to the integrated value SNE(n−1) of the last cycle as of the time when the CPU proceeds to step 1630. The integrated value SNE(n) is set to "0" in the initial routine as described above, and is also set to "0" in step 1660 which will be described later.

$$SNE(n)=SNE(n-1)+NE \quad (16)$$

(Updating of Cumulative Number Counter Cs) The CPU increases the value of the counter Cs by "1", according to Equation (17) below. Cs(n) denotes a value of the counter Cs after updating, and Cs(n−1) denotes a value of the counter Cs before updating. The value of the counter Cs is set to "0" in the initial routine as described above, and is also set to "0" in step 1660 which will be described later. Accordingly, the value of the counter Cs represents the number of items of data representing the average value AveΔAF, which have been integrated or accumulated into the integrated value Save, the number of items of data representing the intake air amount Ga, which have been integrated into the integrated value SGa, and the number of items of data representing the engine speed NE, which have been integrated into the integrated value SNE.

$$Cs(n)=Cs(n-1)+1 \quad (17)$$

Then, the CPU proceeds to step 1635, and determines whether the value of the counter Cs is equal to or larger than a threshold value Csth. If the value of the counter Cs is smaller than the threshold value Csth at this time, the CPU makes a negative decision (No) in step 1635, and directly proceeds to step 1695 to once finish the routine of FIG. 16A and FIG. 16B. The threshold value Csth is a natural number, and is desirably equal to 2 or larger.

On the other hand, if the value of the counter Cs is equal to or larger than the threshold value Csth, at the time when the CPU executes step 1635, the CPU makes an affirmative decision (Yes) in step 1635, and proceeds to step 1640. The CPU acquires a pre-correction air-fuel ratio imbalance index value RIMB, by dividing the integrated value Save by the value (=Csth) of the counter Cs according to Equation (18) below. The pre-correction air-fuel ratio imbalance index value RIMB is obtained by averaging the average value AveΔAF of the absolute value(s) |ΔAF| of the change rate(s) ΔAF (differential value(s) d(Vabyfs)/dt) in (over) each unit combustion cycle period, with respect to the plurality of (Csth pieces of) unit combustion cycle periods.

$$RIMB=Save/Csth \quad (18)$$

Then, the CPU proceeds to step 1645, and obtains "an intake air amount correlation value GaAve" as an average value of the intake air amounts Ga, by dividing the integrated value SGa by the value (=Csth) of the counter Cs, according to Equation (19) below. The intake air amount correlation value GaAve increases as the intake air amount Ga over a period in which the pre-correction air-fuel ratio imbalance index value RIMB is acquired (which will be called "index value acquisition period") increases.

$$GaAve=SGa/Csth \quad (19)$$

Then, the CPU proceeds to step 1650, and obtains "an engine speed correlation value NEAve" as an average value of the engine speeds NE, by dividing the integrated value SNE by the value (=Csth) of the counter Cs, according to Equation (20) below. The engine speed correlation value NEAve increases as the engine speed NE over the index value acquisition period increases.

$$NEAve=SNE/Csth \quad (20)$$

Then, the CPU proceeds to step 1655, and acquires a post-correction air-fuel ratio imbalance index value RIMBh, by correcting the pre-correction air-fuel ratio imbalance index value RIMB based on "the intake air amount correlation value GaAve and the engine speed correlation value NEAve". More specifically, in step 1655, the CPU executes "a routine for acquiring a post-correction air-fuel ratio imbalance index value" illustrated in FIG. 17, which will be described later. The post-correction air-fuel ratio imbalance index value RIMBh can be represented by a function f(GaAve, NEAve, RIMB) of the intake air amount correlation value GaAve, engine speed correlation value NEAve, and the pre-correction air-fuel ratio imbalance index value RIMB. The post-correction air-fuel ratio imbalance index value RIMBh is stored as a learned value RIMBgaku in the backup RAM.

Then, the CPU proceeds to step 1660, and sets (clears) respective values (ΔAF, SAFD, Cn, AveΔAF, Save, SGa, SNE, CS, etc.) used for calculating "the pre-correction air-fuel ratio imbalance index value RIMB and the post-correction air-fuel ratio imbalance index value RIMBh", to "0". Then, the CPU proceeds to step 1695 to once finish the routine of FIG. 16A and FIG. 16B.

If the value of the parameter acquisition permission flag Xkyoka is not equal to "1" when the CPU proceeds to step 1605, the CPU makes a negative decision (No) in step 1605, and proceeds to step 1665. In step 1665, the CPU sets (clears) "respective values (ΔAF, SAFD, Cn, etc.) used for calculating the average value AveΔAF" to "0". Then, the CPU proceeds to step 1695, and once finishes the routine of FIG. 16A and FIG. 16B.

When there is no imbalance in the air-fuel ratio among the individual cylinders (namely, when the air-fuel ratios of all of the cylinders are equal), the rate of change ΔAF is equal to "0", and therefore, the post-correction air-fuel ratio imbalance index value RIMBh obtained in the manner as described above is equal to the reference value "0".

(Acquisition of Post-correction Air-fuel Ratio Imbalance Index Value RIMBh) Next, a process for acquiring the post-correction air-fuel ratio imbalance index value RIMBh will be described. If the CPU proceeds to step 1655 of FIG. 16A and FIG. 16B (namely, if the CPU acquires the pre-correction air-fuel ratio imbalance index value, and proceeds to the routine for acquiring the post-correction air-fuel ratio imbalance index value), the CPU starts processing from step 1700, and goes to step 1710. In step 1710, the CPU determines a correction coefficient Kgn.

The electric control unit 70 stores a look-up table (or a set of look-up tables) that specifies the relationship between "the engine speed NE, intake air amount Ga and the pre-correction air-fuel ratio imbalance index value RIMB" and "the correction coefficient Kgn". Data stored in this table is obtained in advance by way of experiment, or the like. The correction coefficient Kgn is a coefficient with which the pre-correction air-fuel ratio imbalance index value RIMB is corrected, so that one post-correction air-fuel ratio imbalance index value RIMBh is obtained if the degree of ununiformity (imbalance) in the air-fuel ratio among cylinders is equal to a certain value (the imbalance proportion is equal to a particular value).

Figure 16A:
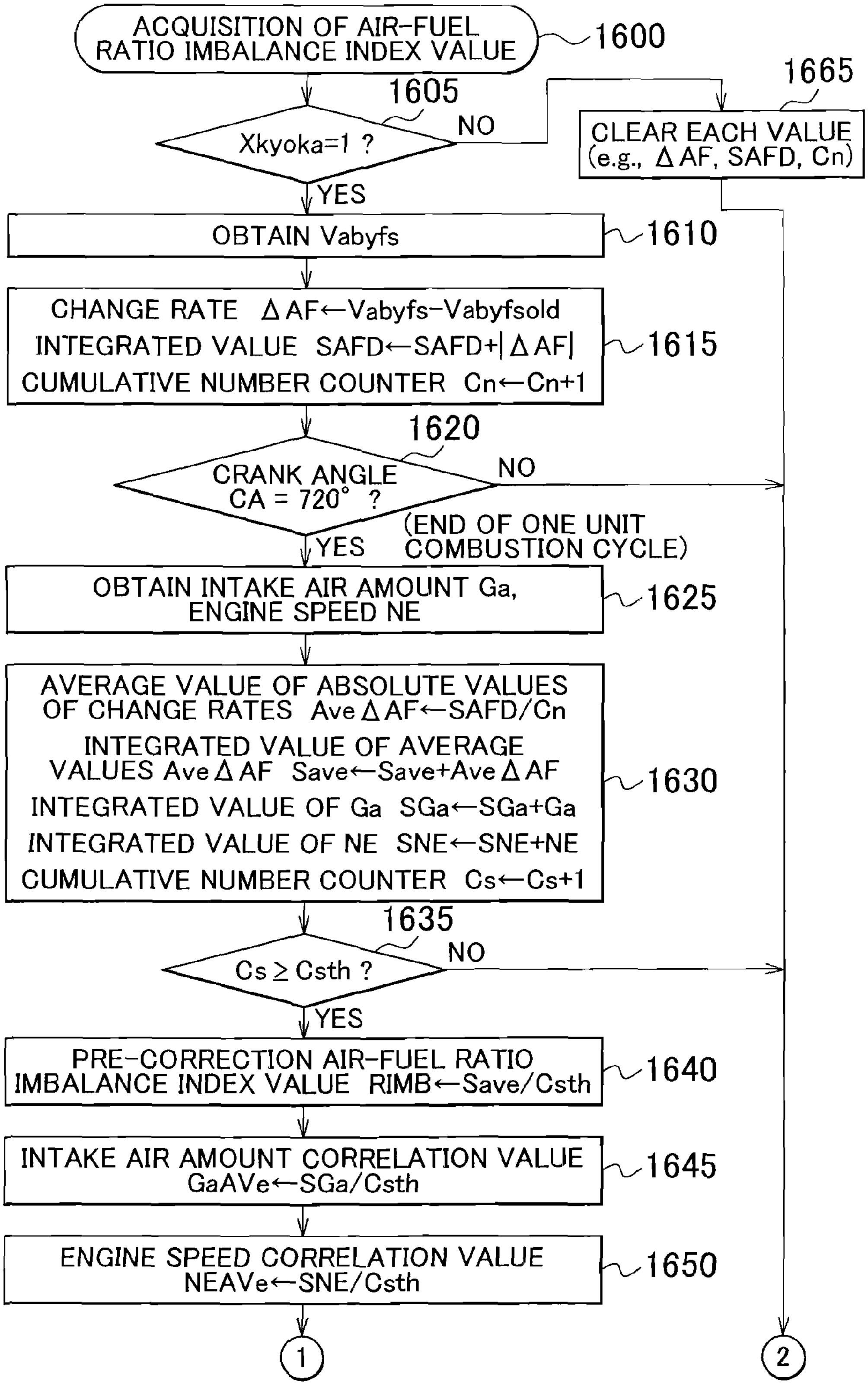
FIG. 16A and FIG. 16B are a flowchart illustrating a routine executed by the CPU of the first control device.
Figure 16B:
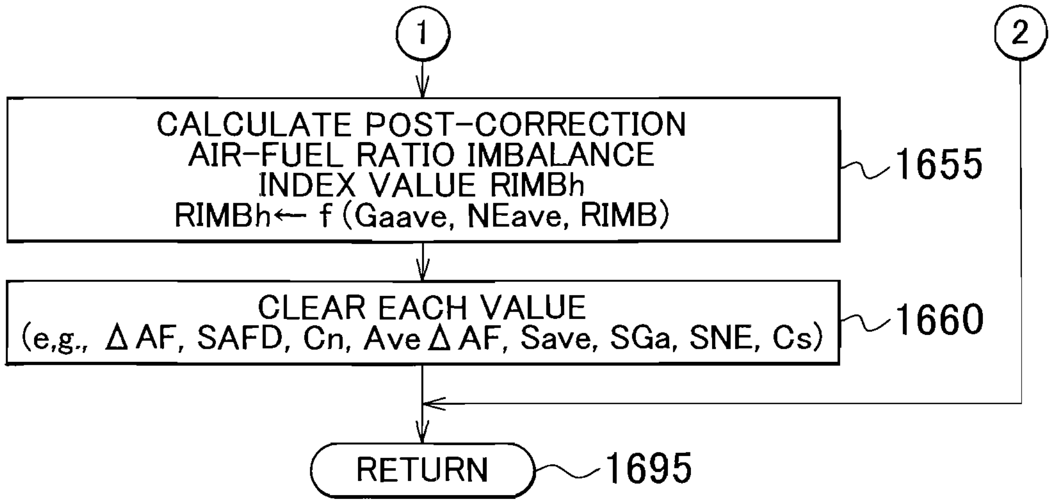

More specifically described, the CPU selects a look-up table that specifies the relationship between "the intake air amount Ga and the pre-correction air-fuel ratio imbalance index value RIMB" and "the correction coefficient Kgn", which relationship is determined with respect to an engine speed that is closest to the engine speed correlation value NEAve obtained in step 1650 of FIG. 16A and FIG. 16B. For example, if the engine speed correlation value NEAve obtained in step 1650 of FIG. 16A and FIG. 16B is 2000 rpm, for example, the CPU selects table B in step 1710 of FIG. 17.

Then, the CPU reads a correction coefficient Kgn corresponding to the intake air amount correlation value GaAve obtained in step 1645 of FIG. 16A and FIG. 16B and the pre-correction air-fuel ratio imbalance index value RIMB obtained in step 1640 of FIG. 16A and FIG. 16B, from the selected table. For example, if the engine speed correlation value NEAve is 2000 rpm, and the intake air amount correlation value GaAve is 30 (g/s), while the pre-correction air-fuel ratio imbalance index value RIMB is 0.48, the correction coefficient Kgn is 0.9390. Generally, the correction coefficient Kgn decreases as the intake air amount correlation value GaAve increases; accordingly, the correction coefficient Kgn increases as the intake air amount correlation value GaAve decreases. Also, the correction coefficient Kgn generally increases as the engine speed correlation value NEAve increases; accordingly, the correction coefficient Kgn decreases as the engine speed correlation value NEAve decreases.

Then, the CPU proceeds to step 1720, and obtains a post-correction air-fuel ratio imbalance index value RIMBh by multiplying the pre-correction air-fuel ratio imbalance index value RIMB by the correction coefficient Kgn, according to Equation (21) below. Since the correction coefficient Kgn is determined based on the intake air amount correlation value GaAve and the engine speed correlation value NEAve, the post-correction air-fuel ratio imbalance index value RIMBh is a value obtained by correcting the pre-correction air-fuel ratio imbalance index value RIMB based on "the intake air amount correlation value GaAve and the engine speed correlation value NEAve". Then, the CPU proceeds to step 1660 of FIG. 16A and FIG. 16B, via step 1795.

$$RIMBh=Kgn \cdot RIMB \quad (21)$$

(Determination of Target Air-fuel Ratio abyfr) Next, a process for determining the target air-fuel ratio abyfr will be described. The CPU repeatedly executes "a target air-fuel ratio determining routine" illustrated in the flowchart of FIG. 18 each time a predetermined time elapses. Each time the predetermined time expires, the CPU starts processing from step 1800, and proceeds to step 1810 to determine a target air-fuel ratio correction amount daf, based on "the post-correction air-fuel ratio imbalance index value RIMBh and the intake air amount Ga". The target air-fuel ratio correction amount daf is obtained according to a target air-fuel ratio correction amount table Mapdaf (RIMBh, Ga) provided in the block of step 1810 of FIG. 18.

According to the target air-fuel ratio correction amount table Mapdaf (RIMBh, Ga), the target air-fuel ratio correction amount daf is determined as follows. The target air-fuel ratio correction amount daf increases as the intake air amount Ga increases. The target air-fuel ratio correction amount daf increases as the post-correction air-fuel ratio imbalance index value RIMBh increases.

Then, the CPU proceeds to step 1820, and obtains an acceleration index amount dGa indicative of the degree of acceleration of the engine 10. More specifically, the CPU obtains an amount of change of the intake air amount Ga per unit time, as an acceleration index amount dGa, by subtracting a previous intake air amount Gaold obtained a given time (e.g., 16 ms) prior to the present time, from the current intake air amount Ga. The acceleration index amount dGa may also be any one of the amount of change dTA of the throttle opening TA per unit time, the amount of change dKL of the load KL per unit time, and the amount of change dAccp of the accelerator pedal operation amount Accp per unit time.

Then, the CPU proceeds to step 1830 to obtain an acceleration correction value kacc based on the acceleration index amount dGa. Namely, the CPU obtains the acceleration correction value kacc according to an acceleration correction value table Mapkacc (dGa) provided in the block of step 1830 of FIG. 18. According to the acceleration correction value table Mapkacc (dGa), the acceleration correction value kacc is determined so as to "gradually increase within a range larger than 1" as the acceleration index amount dGa increases.

Then, the CPU proceeds to step 1840 to determine the target air-fuel ratio abyfr, according to Equation (22) below. Namely, the CPU obtains the target air-fuel ratio abyfr, by subtracting the sub-feedback amount KSFB, and further subtracting "the product of the acceleration correction value kacc and the target air-fuel ratio correction amount daf", from the stoichiometric air-fuel ratio stoich. Then, the CPU proceeds to step 1895 to once finish the routine of FIG. 18. The CPU may always set the acceleration correction value kacc to "1". Namely, the CPU may determine the target air-fuel ratio abyfr by subtracting the target air-fuel ratio correction amount daf from (stoichi-KSFB), without obtaining the acceleration index amount dGa.

$$abyfr = stoich - KSFB - kacc \cdot daf \quad (22)$$

As a result, the target air-fuel ratio abyfr is reduced (i.e., set to a richer air-fuel ratio) so that the absolute value of a difference between the target air-fuel ratio abyfr and the stoichiometric air-fuel ratio stoich is increased, as the post-correction air-fuel ratio imbalance index value RIMBh increases, the intake air amount Ga increases, and/or the acceleration index amount dGa increases.

Accordingly, the designated fuel injection amount Fi is corrected so as to increase as the post-correction air-fuel ratio imbalance index value RIMBh increases, and also increase, as the intake air amount Ga increases, by an amount further larger than an amount commensurate with the increase of the intake air amount Ga (i.e., an amount of increase of the designated fuel injection amount Fi that increases based on the increase of the intake air amount Ga when the target air-fuel ratio abyfr is constant). Furthermore, the designated fuel injection amount Fi is corrected so as to increase as the acceleration index amount dGa increases.

Consequently, the designated fuel injection amount Fi is appropriately controlled depending on the intake air amount Ga, the degree of ununiformity (imbalance) in the air-fuel ratio among cylinders, an accelerating condition, and so forth, so that the designated fuel injection amount Fi becomes an appropriate value. Accordingly, the amount of emissions of nitrogen oxides can be reduced even in the case where the degree of ununiformity in the air-fuel ratio among cylinders is large.

As is apparent from the target air-fuel ratio correction amount table Mapdaf (RIMBh, Ga) provided in the block of step 1810 of FIG. 18, the target air-fuel ratio abyfr is changed to a smaller value than the stoichiometric air-fuel ratio stoich (actually, stoich-KSFB), only when operation conditions defined by the intake air amount Ga and the post-correction air-fuel ratio imbalance index value RIMBh are specific operating conditions. Namely, the designated air-fuel ratio is corrected to a richer air-fuel ratio, in an operating region (large intake air amount region and high imbalance proportion condition) of the target air-fuel ratio correction amount table Mapdaf (RIMBh, Ga) in which numerical values other than "0" are entered. In other words, "when the intake air amount Ga is larger than a threshold value Gavth of the intake air amount which is smaller as the post-correction air-fuel ratio imbalance index value RIMBh is larger", the designated fuel injection amount Fi is corrected to be increased, and the designated air-fuel ratio is set to a richer air-fuel ratio. Accordingly, the amount of emissions of nitrogen oxides can be reduced, without performing wasteful correction to increase the designated fuel injection amount Fi.

As explained above, the first control device is concerned with a fuel injection amount control device of an internal combustion engine including a designated fuel injection amount determining means (see step 1320 through step 1350 of FIG. 13, FIG. 14, etc.) for determining a designated value of the amount of fuel injected from each of the plurality of fuel injection valves 33 (a designated fuel injection amount Fi), by feedback-correcting the amount of fuel injected from the fuel injection valve 33 based on "the output value of the upstream air-fuel ratio sensor 56" so that the air-fuel ratio of exhaust gas flowing into the three-way catalyst 43 coincides with the target air-fuel ratio, and an injection command signal sending means (see step 1360 of FIG. 13) for sending an injection command signal to the fuel injection valves 33 so that the fuel is injected from each of the fuel injection valves 33 in an amount corresponding to the designated fuel injection amount Fi. The fuel injection amount control device further includes a pre-correction index value acquiring means (see step 1605 through step 1640 of FIG. 16A) for acquiring a pre-correction air-fuel ratio imbalance index value RIMB that increases as "the degree of ununiformity in the air-fuel ratio of an air-fuel mixture supplied to the combustion chamber 21 of each of the plurality of cylinders, among the plurality of cylinders, (in the air-fuel ratio among the individual cylinders)" is larger, based on "at least a value (differential value d(Vabyfs)/dt) correlated with the output value Vabyfs of the upstream air-fuel ratio sensor 56", a post-correction index value acquiring means (see step 1655 of FIG. 16B, FIG. 17, etc.) for acquiring an intake air amount correlation value GaAve that increases with increase of the intake air amount Ga over a period (index value acquisition period) in which the pre-correction air-fuel ratio imbalance index value RIMB is acquired (step 1625 through step 1635, and step 1645 of FIG. 16A), and acquiring a post-correction air-fuel ratio imbalance index value RIMBh by correcting the pre-correction air-fuel ratio imbalance index value RIMB based on the intake air amount correlation value GaAve, and a fuel amount increasing means (see FIG. 18, step 1320 of FIG. 13, step 1425 of FIG. 14, etc.) for increasing the designated fuel injection amount Fi for correction thereof based on the post-correction air-fuel ratio imbalance index value RIMBh, so that the air-fuel ratio (designated air-fuel ratio) determined by the designated fuel injection amount Fi is reduced as the acquired post-correction air-fuel ratio imbalance index value RIMBh is larger.

Furthermore, the first control device is configured to acquire an engine speed correlation value NEAve that increases as the engine speed NE in the index value acquisition period increases (see step 1625 through step 1635, and step 1650 of FIG. 16A), and acquire the post-correction air-fuel ratio imbalance index value RIMBh by correcting the acquired pre-correction air-fuel ratio imbalance index value RIMB based on the acquired intake air amount correlation value GaAve and the acquired engine speed correlation value NEAve (see step 1655 of FIG. 16B and FIG. 17).

Accordingly, the post-correction air-fuel ratio imbalance index value RIMBh acquired by the first control device does not vary depending on "the intake air amount and the engine speed" over the index value acquisition period, and represents the degree of ununiformity (or imbalance) in the air-fuel ratio among the cylinders with high accuracy. It is thus possible to make up for the above-described erroneous lean correction, by increasing the designated fuel injection amount Fi for correction thereof based on the post-correction air-fuel ratio imbalance index value RIMBh. Also, since the post-correction air-fuel ratio imbalance index value RIMBh represents the degree of ununiformity in the air-fuel ratio among the cylinders with high accuracy, it is possible to prevent the amount of fuel from being excessively increased. Accordingly, the amount of emissions of NOx and unburned substances can be reduced.

Generally, the response of the output value of the upstream air-fuel ratio sensor 56 to "variations in the air-fuel ratio of exhaust gas to be sensed" increases as the intake air amount is larger (namely, as the flow rate of exhaust gas is higher). Accordingly, in the case where the pre-correction air-fuel ratio imbalance index value is acquired as a value that increases as fluctuations in the output value of the upstream air-fuel ratio sensor 56 are larger, the pre-correction air-fuel ratio imbalance index value increases as "the intake air amount over the index value acquisition period" is larger.

Accordingly, by correcting the pre-correction air-fuel ratio imbalance index value to a smaller value as the intake air amount correlation value becomes larger, it is possible to acquire a post-correction air-fuel ratio imbalance index value that accurately represents the degree of ununiformity in the air-fuel ratio among the cylinders, without depending on "the intake air amount over the index value acquisition period".

(Second Embodiment) Next, a control device according to a second embodiment of the invention (which will be simply called "second control device") will be described. The second control device calculates a pre-correction air-fuel ratio imbalance index value RIMB, based on a value corresponding to a sub-feedback amount KSFB (actually, sub-feedback learned value KSFBg) (see, for example, Japanese Patent Application Publication No. 2009-30455 (JP-A-2009-30455)).

Namely, the degree of erroneous lean correction due to the main feedback control as described above increases as the degree of ununiformity or imbalance in the air-fuel ratio among the cylinders increases. On the other hand, the downstream air-fuel ratio sensor 57 generates an output value Voxs close to the true average air-fuel ratio of the engine 10, even when the degree of ununiformity in the air-fuel ratio among the cylinders is large.

Figure 19:
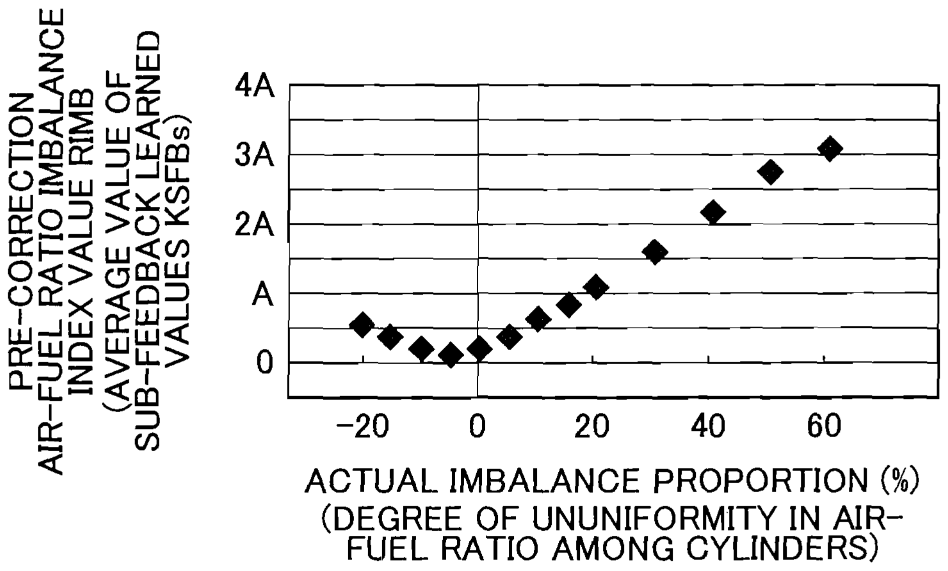
FIG. 19 is a graph relating to a second embodiment of the invention, and indicating the relationship between the actual imbalance proportion (the degree of ununiformity in the air-fuel ratio among cylinders), and a pre-correction air-fuel ratio imbalance index value obtained based on a value corresponding to a sub-feedback amount.

As a result, the sub-feedback amount KSFB (or sub-feedback learned value KSFBg) shifts the air-fuel ratio (target air-fuel ratio abyfr) of the engine to "a richer air-fuel ratio" as the degree of ununiformity in the air-fuel ratio among the cylinders increases. It is thus possible to acquire an air-fuel ratio imbalance index value (namely, pre-correction air-fuel ratio imbalance index value RIMB) indicative of the degree of ununiformity in the air-fuel ratio among the cylinders, based on the sub-feedback amount KSFB (or sub-feedback learned value KSFBg) (see FIG. 19).

Figure 20:
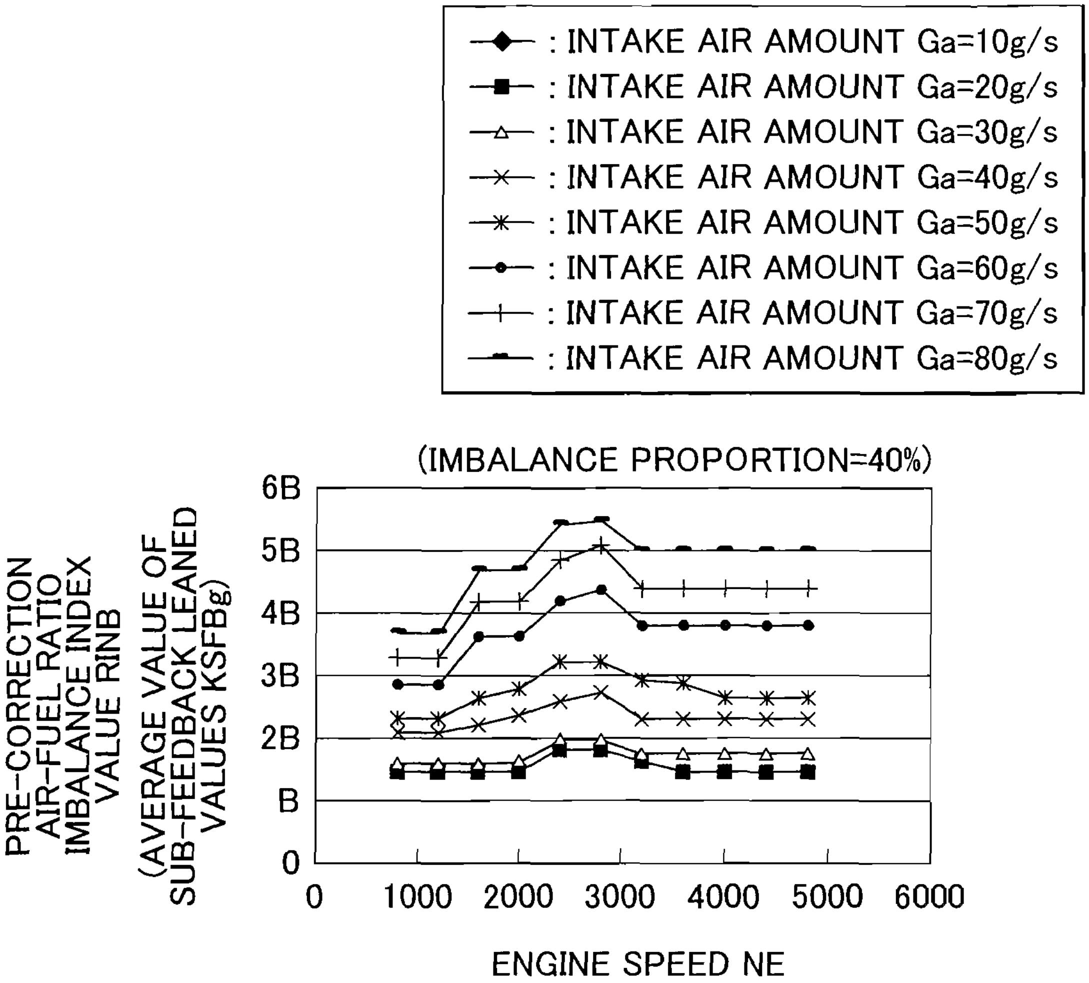
FIG. 20 is a graph relating to the second embodiment of the invention, and indicating the relationship between the pre-correction air-fuel ratio imbalance index value obtained based on the value corresponding to the sub-feedback amount, and the intake air amount and the engine speed.

However, according to the result of experiments conducted by the inventor, as shown in FIG. 20, the pre-correction air-fuel ratio imbalance index value RIMB obtained based on a value corresponding to the sub-feedback amount KSFB varies depending on "the intake air amount Ga and the engine speed NE" measured when the pre-correction air-fuel ratio imbalance index value RIMB is acquired, even where the degree of ununiformity (imbalance proportion) in the air-fuel ratio among the cylinders is equal to "a certain particular value". Furthermore, how the pre-correction air-fuel ratio imbalance index value RIMB is influenced by "the intake air amount Ga and the engine speed NE" is different between the case where the degree of ununiformity in the air-fuel ratio among the cylinders is a first value and the case where the degree of ununiformity is a second value.

Therefore, it is preferable to correct the pre-correction air-fuel ratio imbalance index value RIMB obtained based on the value corresponding to the sub-feedback amount KSFB, based on "the intake air amount Ga and the engine speed NE" measured when the pre-correction air-fuel ratio imbalance index value RIMB is acquired, so that the pre-correction air-fuel ratio imbalance index value RIMB appropriately represents the degree of ununiformity in the air-fuel ratio among the cylinders. If the designated air-fuel ratio is changed based on the pre-correction air-fuel ratio imbalance index value RIMB in the case where the pre-correction air-fuel ratio imbalance index value RIMB does not appropriately represent the degree of ununiformity in the air-fuel ratio among the cylinder, appropriate air-fuel ratio control cannot be performed.

Then, the second control device corrects the pre-correction air-fuel ratio imbalance index value RIMB obtained based on the value corresponding to the sub-feedback amount KSFB, based on "the intake air amount Ga and the engine speed NE" measured when the pre-correction air-fuel ratio imbalance index value RIMB is obtained, so as to acquire a post-correction air-fuel ratio imbalance index value RIMBh. Further, the second control device controls the air-fuel ratio of the engine based on the post-correction air-fuel ratio imbalance index value RIMBh.

(Actual Operation) The CPU of the second control device executes routines similar to the routines executed by the CPU of the first control device. However, the CPU of the second control device executes a routine illustrated in FIG. 21, in place of the routine of FIG. 16A and FIG. 16B, each time a predetermined time elapses, and executes a routine illustrated in FIG. 22, in place of the routine of FIG. 17.

Each time the predetermined time expires, the CPU starts processing from step 2100, and proceeds to step 2105 to determine whether the present time is "a point of time immediately after the sub-feedback learned value KSFBg was updated". If the present time is not the time point immediately after updating of the sub-feedback learned value, the CPU directly proceeds to step 2195 and once finishes the routine of FIG. 21.

On the other hand, if the present time is immediately after updating of the sub-feedback learned value, the CPU makes an affirmative decision (Yes) in step 2105, and proceeds to step 2145 after executing step 2110 through step 2140 as will be described below, in the order indicated in FIG. 21.

The CPU increases a value of a learned value integration counter Cexe by "1" (step 2110). The CPU reads the sub-feedback learned value KSFBg updated in step 1540 of FIG. 15 (step 2115).

The CPU updates an integrated value SKSFBg of the sub-feedback learned value KSFBg (step 2120). Namely, the CPU obtains a new integrated value SKSFBg, by adding "the sub-feedback learned value KSFBg read in step 2115" to "the current integrated value SKSFBg". The integrated value SKSGBg is set to "0" in the above-mentioned initial routine. Also, the integrated value SKSFBg is set to "0" in step 2170 which will be described later.

The CPU obtains the current intake air amount Ga (step 2125). The CPU obtains an integrated value SGa of the intake air amount of this cycle (i.e., updates the integrated value SGa), by adding the intake air amount Ga obtained in step 2125 to the integrated value SGa of the intake air amount obtained in the last cycle, according to an equation similar to the above-indicated Equation (15) (step 2130). The integrated value SGa is set to "0" in the above-mentioned initial routine. Also, the integrated value SGa is set to "0" in step 2170 which will be described later.

The CPU obtains the current engine speed NE (step 2135). The CPU obtains an integrated value SNE of the engine speed of this cycle (i.e., updates the integrated value SNE), by adding the engine speed NE obtained in step 2135 to the integrated value SNE of the engine speed obtained in the last cycle, according to an equation similar to the above-indicated Equation (16) (step 2140). The integrated value SNE is set to "0" in the above-mentioned initial routine. Also, the integrated value SNE is set to "0" in step 2170 which will be described later.

Then, the CPU proceeds to step 2145, and determines whether the value of the learned value integration counter Cexe is equal to or larger than a counter threshold value Cth. If the value of the learned value integration counter Cexe is smaller than the counter threshold value Cth, the CPU makes a negative decision (No) in step 2145, and directly proceeds to step 2195 to once finish the routine of FIG. 21. On the other hand, if the value of the learned value integration counter Cexe is equal to or larger than the counter threshold value Cth, the CPU makes an affirmative decision (Yes) in step 2145, and proceeds to step 2195 to once finish this routine, after executing step 2150 through step 2170 as will be described below, in the order indicated in FIG. 21.

The CPU obtains a pre-correction air-fuel ratio imbalance index value RIMB, by dividing "the integrated value SKSFBg of the sub-feedback learned value KSFBg" by "the value of the learned value integration counter Cexe (=Cth)" (step 2150). Namely, the pre-correction air-fuel ratio imbalance index value RIMB is an average value of the sub-feedback learned values KSFBg the number of which is equal to the counter threshold value Cth.

The CPU obtains "an intake air amount correlation value GaAve" as an average value of the intake air amount Ga over a period (index value acquisition period) in which the pre-correction air-fuel ratio imbalance index value RIMB is acquired, by dividing "the integrated value SGa of the intake air amount" by "the learned value integration counter Cexe (=Cth)" (step 2155).

The CPU obtains "an engine speed correlation value NEAve" as an average value of the engine speed NE over the index value acquisition period, by dividing "the integrated value SNE of the engine speed" by "the learned value integration counter Cexe (=Cth)" (step 2160).

Figure 22:
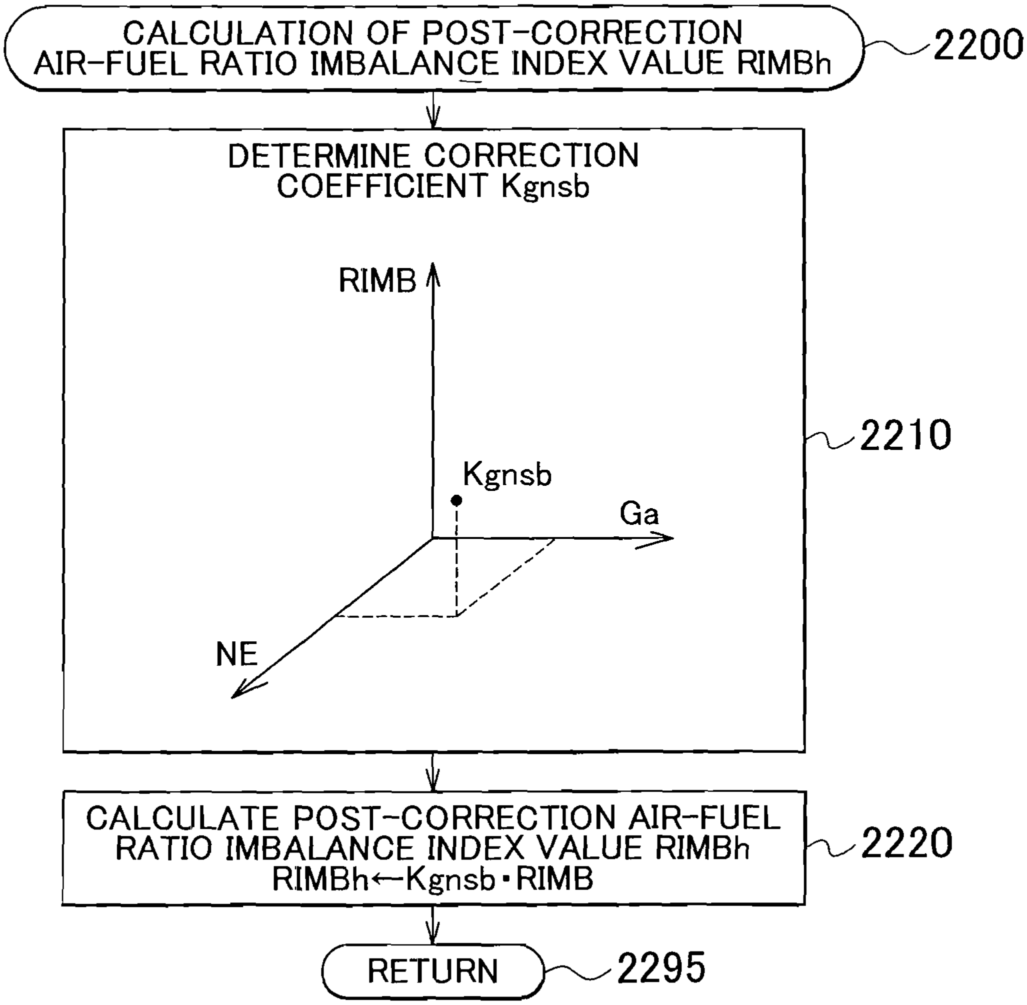
FIG. 22 is a flowchart illustrating a routine executed by the CPU of the second control device.

The CPU acquires a post-correction air-fuel ratio imbalance index value RIMBh, by correcting the pre-correction air-fuel ratio imbalance index value RIMB obtained in step 2150, based on "the intake air amount correlation value GaAve and the engine speed correlation value NEAve" (step 2165). More specifically, in step 2165, the CPU executes "a routine for acquiring a post-correction air-fuel ratio imbalance index value" which is illustrated in FIG. 22 and will be described later. The post-correction air-fuel ratio imbalance index value RIMBh may be represented by a function g (GaAve, NEAve, RIMB) of the intake air amount correlation value GaAve, the engine speed correlation value NEAve, and the pre-correction air-fuel ratio imbalance index value RIMB. The post-correction air-fuel ratio imbalance index value RIMBh is stored as a learned value RIMBgaku in the backup RAM.

The CPU sets (clears) respective values (Cexe, SKSFBg, SGa, SNE) used for calculating "the pre-correction air-fuel ratio imbalance index value RIMB and the post-correction air-fuel ratio imbalance index value RIMBh", to "0" (step 2170). Then, the CPU proceeds to step 2195 to once finish the routine of FIG. 21.

Next, a process for acquiring the post-correction air-fuel ratio imbalance index value RIMBh will be described. When the CPU proceeds to step 2165 of FIG. 21 (namely, when the CPU acquires the pre-correction air-fuel ratio imbalance index value RIMB, and proceeds to the routine for acquiring the post-correction air-fuel ratio imbalance index value), the CPU starts processing from step 2200, and goes to step 2210. In step 2210, the CPU determines a correction coefficient Kgn in substantially the same manner as in step 1710 of FIG. 17.

Namely, the electric control unit 70 stores a look-up table that specifies the relationship between "the engine speed NE, intake air amount Ga and the pre-correction air-fuel ratio imbalance index value RIMB" and "the correction coefficient Kgnsb", in the ROM. Data stored in the table is obtained in advance by way of experiment, or the like. The correction coefficient Kgnsb is a coefficient with which the pre-correction air-fuel ratio imbalance index value RIMB is corrected, so that one post-correction air-fuel ratio imbalance index value RIMBh can be obtained if the degree of ununiformity in the air-fuel ratio among the cylinders is a given value (if the imbalance proportion is a specified value).

Figure 21:
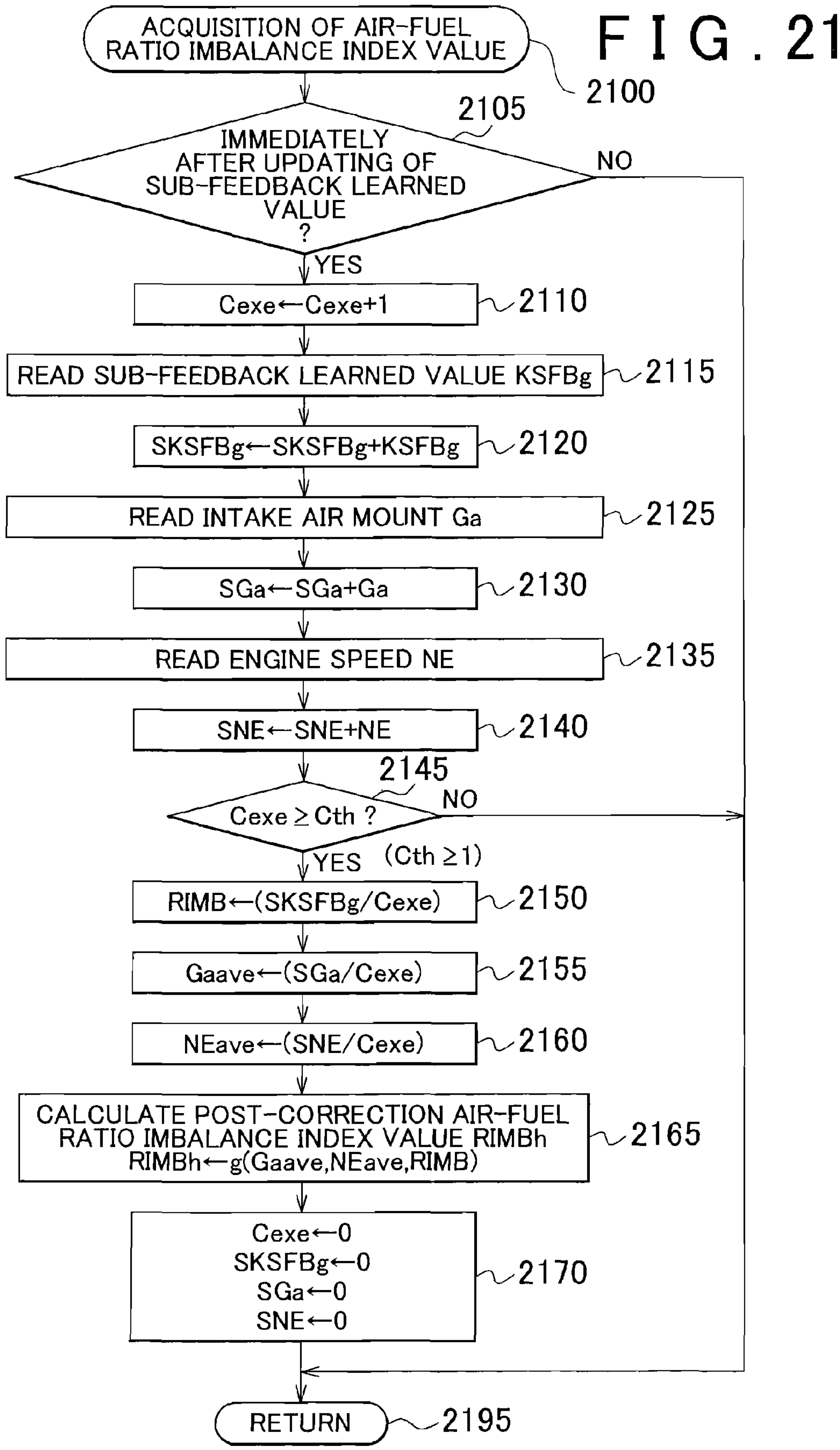
FIG. 21 is a flowchart illustrating a routine executed by CPU of a fuel injection amount control system (a second control device) according to the second embodiment of the invention.

The CPU obtains the correction coefficient Kgnsb, by applying "the pre-correction air-fuel ratio imbalance index value RIMB, intake air amount correlation value GaAve and the engine speed correlation value NEAve" obtained in step 2150 through step 2160 of FIG. 21, to the above-mentioned table.

Then, the CPU proceeds to step 2220, and obtains the post-correction air-fuel ratio imbalance index value RIMBh by multiplying the pre-correction air-fuel ratio imbalance index value RIMB by the correction coefficient Kgnsb, according to an equation similar to the above-indicated Equation (21). Since the correction coefficient Kgnsb is determined based on the intake air amount correlation value GaAve and the engine speed correlation value NEAve, the post-correction air-fuel ratio imbalance index value RIMBh is referred to as a value obtained by correcting the pre-correction air-fuel ratio imbalance index value RIMB, based on "the intake air amount correlation value GaAve and the engine speed correlation value NEAve". Then, the CPU proceeds to step 2170 of FIG. 21, via step 2295.

The CPU determines the target air-fuel ratio abyfr, using the thus obtained post-correction air-fuel ratio imbalance index value. Namely, the CPU determines the target air-fuel ratio abyfr according to the routine illustrated in FIG. 18.

As explained above, the second control device includes a designated fuel injection amount determining means for calculating the main feedback amount DFi for feedback-correcting the designated fuel injection amount Fi so that the air-fuel ratio (sensed air-fuel ratio abyfs) represented by the output value Vabyfs of the upstream air-fuel ratio sensor 56 coincides with the target air-fuel ratio abyfr (see FIG. 14), calculating the sub-feedback amount KSFB for feedback-correcting the designated fuel injection amount Fi so that the output value Voxs of the downstream air-fuel ratio sensor 57 coincides with the downstream-side target value Voxsref (see FIG. 15), and determining the designated fuel injection amount Fi based on the main feedback amount DFi and the sub-feedback amount KSFB (see step 1320 through step 1350 of FIG. 13, step 1840 of FIG. 18, etc.).

Furthermore, the pre-correction index value acquiring means of the second control device is configured to obtain a value that increases as a steady-state component of the sub-feedback amount (sub-feedback learned value KSFBg or time integral value SDVoxs) increases (see step 2110 through step 2120, step 2145 and step 2150 of FIG. 21).

In addition, the post-correction index value acquiring means of the second control device is configured to acquire “the intake air amount correlation value GaAve and the engine speed correlation value NEAve” over the index value acquisition period, and acquire the post-correction air-fuel ratio imbalance index value RIMBh by correcting the acquired pre-correction air-fuel ratio imbalance index value RIMB, based on the acquired “intake air amount correlation value GaAve and the engine speed correlation value NEAve” (see step 2125 through step 2145 and step 2155 through step 2165 of FIG. 21, FIG. 22, etc.).

Accordingly, the post-correction air-fuel ratio imbalance index value RIMBh obtained by the second control device does not vary depending on “the intake air amount and the engine speed” in the index value acquisition period, and represents the degree of ununiformity in the air-fuel ratio among the individual cylinders. Thus, by increasing the designated fuel injection amount Fi for correction thereof based on the post-correction air-fuel ratio imbalance index value RIMBh, it is possible to make up for the above-described erroneous lean correction, and prevent the amount of fuel from being excessively increased. Accordingly, the amount of emissions of NOx and unburned substances can be reduced.

As the degree of ununiformity in the air-fuel ratio among the cylinders increases, the degree of erroneous lean correction due to the main feedback control as described above increases. On the other hand, exhaust gas of which hydrogen has been converted and removed by the three-way catalyst reaches the downstream air-fuel ratio sensor. Accordingly, the output value of the downstream air-fuel ratio sensor is close to the true average air-fuel ratio of the engine even when the degree of ununiformity in the air-fuel ratio among the cylinders becomes large. As a result, the sub-feedback amount is determined so that the air-fuel ratio of the engine shifts to “a richer air-fuel ratio” as the degree of ununiformity in the air-fuel ratio among the cylinders increases (namely, as the degree of erroneous lean correction due to the main feedback control increases). Accordingly, an air-fuel ratio imbalance index value (i.e., pre-correction air-fuel ratio imbalance index value) indicative of the degree of ununiformity in the air-fuel ratio among the cylinders can be obtained based on the sub-feedback amount (see FIG. 19). As described above, the sub-feedback amount represents the result of feedback control (main feedback control) based on the output value of the upstream air-fuel ratio sensor; therefore, the sub-feedback amount may be referred to as “value correlated with the output value of the upstream air-fuel ratio sensor”. However, the pre-correction air-fuel ratio imbalance index value also varies depending on the intake air amount and/or the engine speed in the index value acquisition period (see FIG. 20). Accordingly, an appropriate post-correction air-fuel ratio imbalance index value can be obtained by correcting the thus obtained pre-correction air-fuel ratio imbalance index value, using the intake air amount, etc. in the index value acquisition period.

As explained above, the fuel injection amount control device according to each embodiment of the invention acquires a value (post-correction air-fuel ratio imbalance index value RIMBh) that accurately represents the degree of ununiformity or imbalance in the air-fuel ratio among the individual cylinders, without depending on “the intake air amount Ga and the engine speed NE” over the index value acquisition period, and controls the designated fuel injection amount (accordingly, the designated air-fuel ratio) based on the post-correction air-fuel ratio imbalance index value RIMBh. As a result, the amount of emissions of NOx, or the like, can be reduced, irrespective of the degree of ununiformity in the air-fuel ratio among the cylinders.

In other words, the fuel injection amount control device according to each embodiment of the invention eventually sets the target air-fuel ratio abyfr (accordingly, the designated air-fuel ratio) based on the post-correction air-fuel ratio imbalance index value RIMBh represented by the function f (GaAve, NEAve, RIMB) or function g (GaAve, NEAve, RIMB), and the actual intake air amount Ga (see step 1655 of FIG. 16B, step 2165 of FIG. 21, and step 1810 and step 1840 of FIG. 18).

In this case, the fuel injection amount control device may obtain the target air-fuel ratio abyfr, using a function “f1(f, Ga)=f1(GaAve, NEAve, RIMB, Ga)=abyfr)” that defines the relationships among the above function f, the actual intake air amount Ga and the target air-fuel ratio abyfr, without determining the post-correction air-fuel ratio imbalance index value RIMBh itself (namely, without using the post-correction air-fuel ratio imbalance index value RIMBh). Similarly, the fuel injection amount control device may obtain the target air-fuel ratio abyfr, using a function “g1(g, Ga)=g1(GaAve, NEAve, RIMB, Ga)=abyfr)” which defines the relationships among the above-indicated function g, the actual intake air amount Ga, and the target air-fuel ratio abyfr.

In addition, the dependence of the pre-correction air-fuel ratio imbalance index value RIMB on the engine speed correlation value is smaller than the dependence of the pre-correction air-fuel ratio imbalance index value RIMB on the intake air amount correlation value; therefore, the post-correction air-fuel ratio imbalance index value RIMBh may be obtained by correcting the pre-correction air-fuel ratio imbalance index value RIMB solely based on the intake air amount correlation value. In this case, the fuel injection amount control device sets the target air-fuel ratio abyfr (accordingly, the designated air-fuel ratio), based on the post-correction air-fuel ratio imbalance index value RIMBh represented by a function f2 (GaAve, RIMB) or a function g2 (GaAve, RIMB), and the actual intake air amount G.

It follows, from the above description, that the fuel injection amount control device includes a pre-correction index value acquiring means for acquiring a pre-correction air-fuel ratio imbalance index value that increases as the degree of ununiformity in the air-fuel ratio of an air-fuel mixture supplied to a combustion chamber of each of a plurality of cylinders, among the individual cylinders, is larger, based on at least a value correlated with an output value of the upstream air-fuel ratio sensor, a correlation value acquiring means for acquiring an intake air amount correlation value that increases with increase of the intake air amount of the engine over an index value acquisition period as a period in which the pre-correction air-fuel ratio imbalance index value is acquired, an intake air amount acquiring means for acquiring the actual intake air amount of the engine, and a target air-fuel ratio determining means for determining a target air-fuel ratio based on the acquired pre-correction air-fuel ratio imbalance index value, the acquired intake air amount correlation value, and the acquired actual intake air amount.

Furthermore, it may be stated that, in the fuel injection amount control device, the correlation value acquiring means is configured to acquire an engine speed correlation value that increases with increase of the rotational speed of the engine over the index value acquisition period, and the target air-fuel ratio determining means is configured to determine the target air-fuel ratio based on the acquired intake air amount correlation value, the acquired actual intake air amount, and the acquired engine speed correlation value.

It is to be understood that the invention is not limited to the illustrated embodiments, but various modified examples within the range of this invention may be employed. For example, the pre-correction index value acquiring means for acquiring a pre-correction air-fuel ratio imbalance index value RIMB may obtain "an air-fuel ratio fluctuation index amount AFD that increases as fluctuations in the output value Vabyfs of the upstream air-fuel ratio sensor 56 increase" as the pre-correction air-fuel ratio imbalance index value RIMB, by a method as will be described below. The output value Vabyfs of the upstream air-fuel ratio sensor 56 as described below means a value correlated with the output value Vabyfs of the upstream air-fuel ratio sensor 56. Namely, the output value Vabyfs of the upstream air-fuel ratio sensor 56 as described below may be the output value Vabyfs of the upstream air-fuel ratio sensor 56 itself, or may be a value obtained by subjecting the output value Vabyfs of the upstream air-fuel ratio sensor 56, to high-pass filtering, so that a fluctuating component of the average air-fuel ratio (center air-fuel ratio, base air-fuel ratio) of the engine 10 is removed from the output value Vabyfs of the upstream air-fuel ratio sensor 56.

As described above, the pre-correction index value acquiring means may be configured to obtain a differential value d(Vabyfs)/dt (rate of change ΔAF) of the output value Vabyfs of the upstream air-fuel ratio sensor 56 with respect to time, and obtain a value correlated with the obtained differential value d(Vabyfs)/dt, as a pre-correction air-fuel ratio imbalance index value RIMB.

One example of the value correlated with the obtained differential value d(Vabyfs)/dt is an average value of absolute values of a plurality of differential values d(Vabyfs)/ds obtained over a period that is equal to or two or more (a natural number) times as long as a unit combustion cycle, as described above. Another example of the value correlated with the obtained differential value d(Vabyfs)/ds is a value obtained by averaging the maximum value of absolute values of a plurality of differential values d(Vabyfs)/dt obtained in a unit combustion cycle, with respect a plurality of unit combustion cycles.

A further example of the value correlated with the obtained differential value d(Vabyfs)/dt may be obtained as follows. In a unit combustion cycle period, an absolute value of a differential value d(Vabyfs)/dt having a positive value is obtained each time a given sampling time elapses, and an average value ΔAFPL of the thus obtained absolute values is obtained. In the unit combustion cycle period, an absolute value of a differential value d(Vabyfs)/dt having a negative value is obtained each time a given sampling time elapses, and an average value ΔAFMN of these absolute values is obtained. In one unit combustion cycle period, the larger one of the average value ΔAFPL and the average value ΔAFMN is used as the rate of change ΔAF in the unit combustion cycle period. An average value of the change rates ΔAF obtained in the manner as described above in respective unit combustion cycle periods is used as a pre-correction air-fuel ratio imbalance index value RIMB.

The pre-correction index value acquiring means may be configured to obtain a differential value d(abyfs)/dt of the sensed air-fuel ratio abyfs represented by the output value Vabyfs of the upstream air-fuel ratio sensor 56, with respect to time, and obtain a value correlated with the thus obtained differential value d(abyfs)/dt, as a pre-correction air-fuel ratio imbalance index value RIMB.

One example of the value correlated with the obtained differential value d(abyfs)/dt is an average value of absolute values of a plurality of differential values d(abyfs)/dt obtained over a period that is equal to or two or more (a natural number) times as long as a unit combustion cycle. Another example of the value correlated with the obtained differential value d(abyfs)/ds is a value obtained by averaging the maximum value of absolute values of a plurality of differential values d(abyfs)/dt obtained in a unit combustion cycle, with respect a plurality of unit combustion cycles.

Figure 9D:
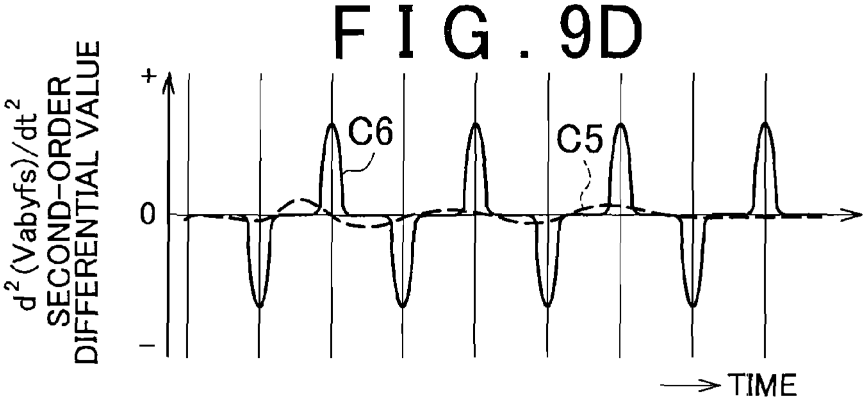

The pre-correction index value acquiring means may be configured to obtain a second-order differential value $d^2$(Vabyfs)/$dt^2$ of the output value Vabyfs of the upstream air-fuel ratio sensor 56 with respect to time, and obtain a value correlated with the obtained second-order differential value $d^2$(Vabyfs)/$dt^2$, as a pre-correction air-fuel ratio imbalance index value RIMB. The second-order differential value $d^2$(Vabyfs)$dt^2$ is relatively small as indicated by broken line C5 in FIG. 9D when differences in the air-fuel ratio among individual cylinders are small, and is relatively large as indicated by solid line C6 in FIG. 9D when differences in the air-fuel ratio among the cylinders are large.

In this connection, the second-order differential value $d^2$(Vabyfs)/$dt^2$ can be obtained by obtaining a differential value d(Vabyfs)/dt at intervals of a given sampling time, by subtracting the output value Vabyfs detected the given sampling time prior to the present time, from the output value Vabyfs detected at the present time, and subtracting a differential value d(Vabyfs)/dt obtained the given sampling time prior to the present time, from the newly obtained differential value d(Vabyfs)/dt.

One example of the value correlated with the obtained second-order differential value $d^2$(Vabyfs)/$dt^2$ is an average value of absolute values of a plurality of second-order differential values $d^2$(Vabyfs)/$dt^2$ obtained over a period that is equal to or two or more (a natural number) times as long as a unit combustion cycle. Another example of the value correlated with the obtained second-order differential value $d^2$(Vabyfs)/$dt^2$ is a value obtained by averaging the maximum value of absolute values of a plurality of second-order differential values $d^2$(Vabyfs)/$dt^2$ obtained in a unit combustion cycle, with respect to a plurality of unit combustion cycles.

The pre-correction index value acquiring means may be configured to obtain a second-order differential value $d^2$(abyfs)/$dt^2$ of the sensed air-fuel ratio abyfs represented by the output value Vabyfs of the upstream air-fuel ratio sensor 56, with respect to time, and obtain a value correlated with the obtained second-order differential value $d^2(abyfs)/dt^2$, as a pre-correction air-fuel ratio imbalance index value RIMB. Since the output value Vabyfs and the sensed air-fuel ratio abyfs are in a substantially proportional relationship (see FIG. 7), the second-order differential value $d^2(abyfs)/dt^2$ shows substantially the same tendency or characteristics as the second-order differential value $d^2(Vabyfs)/dt^2$ of the output value Vabyfs.

One example of the value correlated with the obtained second-order differential value $d^2(abyfs)/dt^2$ is an average value of absolute values of a plurality of second-order differential values $d^2(abyfs)/dt^2$ obtained over a period that is equal to or two or more (a natural number) times as long as a unit combustion cycle. Another example of the value correlated with the obtained second-order differential value $d^2(abyfs)/dt^2$ is a value obtained by averaging the maximum value of absolute values of a plurality of second-order differential values $d^2(abyfs)/dt^2$ obtained in a unit combustion cycle, with respect to a plurality of unit combustion cycles.

The pre-correction index value obtaining means may be configured to obtain a value correlated with a difference ΔX between the maximum value and the minimum value of the output value Vabyfs of the upstream air-fuel ratio sensor 56, over a predetermined period (for example, a period that is equal to or two or more (a natural number) times as long as one unit combustion cycle), or a value correlated with a difference ΔY between the maximum value and the minimum value of the sensed air-fuel ratio abyfs represented by the output value Vabyfs of the upstream air-fuel ratio sensor 56 over the predetermined period, as a pre-correction air-fuel ratio imbalance index value RIMB. As is apparent from solid line C2 and broken line C1 indicated in FIG. 9B, the difference ΔX (the absolute value of ΔX) is larger as differences in the air-fuel ratio among the individual cylinders are larger. Accordingly, the difference ΔX (the absolute value of ΔX) increases with increase of the differences in the air-fuel ratio among the cylinders. One example of the value correlated with the difference ΔX (or difference ΔY) is an average value of absolute values of a plurality of differences ΔX (or ΔY) obtained over a period that is equal to or two or more (a natural number) times as long as one unit combustion cycle.

The pre-correction index value acquiring means may be configured to obtain a value correlated with a trace length of the output value Vabyfs of the upstream air-fuel ratio sensor 56 over a predetermined period, or a value correlated with a trace length of the sensed air-fuel ratio abyfs represented by the output value Vabyfs of the upstream air-fuel ratio sensor 56 over the predetermined period, as a pre-correction air-fuel ratio imbalance index value RIMB. As is apparent from FIG. 9B, these trace lengths become larger as differences in the air-fuel ratio among the individual cylinders are larger. One example of the value correlated with the trace length is an average value of absolute values of a plurality of trace lengths obtained over a period that is equal to or two or more (a natural number) times as long as one unit combustion cycle.

For example, the trace length of the sensed air-fuel ratio abyfs may be determined by obtaining an output value Vabyfs each time a given sampling time ts elapses, converting the output value Vabyfs into a sensed air-fuel ratio abyfs, and integrating an absolute value of a difference between the sensed air-fuel ratio and a sensed air-fuel ratio obtained the given sampling time ts prior to the present time.

In the meantime, each of the above-described control devices may be applied to a V-type engine. In this case, the V-type engine has a right-bank upstream catalyst located downstream of an exhaust gathering portion of two or more cylinders that belong to the right bank of the engine. Further, the V-type engine has a left-bank upstream catalyst located downstream of an exhaust gathering portion of two or more cylinders that belong to the left bank of the engine.

In addition, the V-type engine may include upstream air-fuel ratio sensor and downstream air-fuel ratio sensor for the right bank, which are respectively located upstream and downstream of the right-bank upstream catalyst, and upstream air-fuel ratio sensor and downstream air-fuel ratio sensor for the left bank, which are respectively located upstream and downstream of the left-bank upstream catalyst. Like the above-described upstream air-fuel ratio sensor 56, each upstream air-fuel ratio sensor is disposed between the exhaust gathering portion of each bank and the upstream catalyst of each bank. In this case, main feedback control and sub-feedback control for the right bank are executed, and main feedback control and sub-feedback control for the left bank are executed, independently of those for the right bank.

Further, in this case, the control device obtains "a post-correction air-fuel ratio imbalance index value RIMBh for the right bank", based on the output value of the upstream air-fuel ratio sensor for the right bank, and corrects the target air-fuel ratio abyfr of main feedback control for the cylinders belonging to the right bank, using the obtained post-correction air-fuel ratio imbalance index value RIMBh. Similarly, the control device obtains "a post-correction air-fuel ratio imbalance index value RIMBh for the left bank", based on the output value of the upstream air-fuel ratio sensor for the left bank, and corrects the target air-fuel ratio abyfr of main feedback control for the cylinders belonging to the left bank, using the obtained post-correction air-fuel ratio imbalance index value RIMBh.

The first control device as described above may determine a correction coefficient Kgn, using a model expression, such as Equation (23) below, as the above-described function f or function g. In Eq. (23), values a1, a2, a3 and a4 are constants.

$$Kgn = a1/GaAve + a2 \cdot NEAVe + a3 \cdot RIMB + a4 \quad (23)$$

The first control device as described above obtains the correction coefficient Kgn from the table (set of tables) provided in the block of step 1710 of FIG. 17, and obtains the product of the correction coefficient Kgn and the pre-correction air-fuel ratio imbalance index value RIMB as the post-correction air-fuel ratio imbalance index value RIMBh. However, data contained in the table provided in the block of step 1710 may be those of "the product of the correction coefficient Kgn and the pre-correction air-fuel ratio imbalance index value RIMB", so that step 1720 of FIG. 17 can be eliminated.

Further, the first control device may perform main feedback control, by using "an oxygen concentration sensor of the same electromotive force type as the downstream air-fuel ratio sensor 57 (known concentration cell type oxygen concentration sensor using a solid electrolyte, such as stabilized zirconia), as the upstream air-fuel ratio sensor 56.

Figure 23:
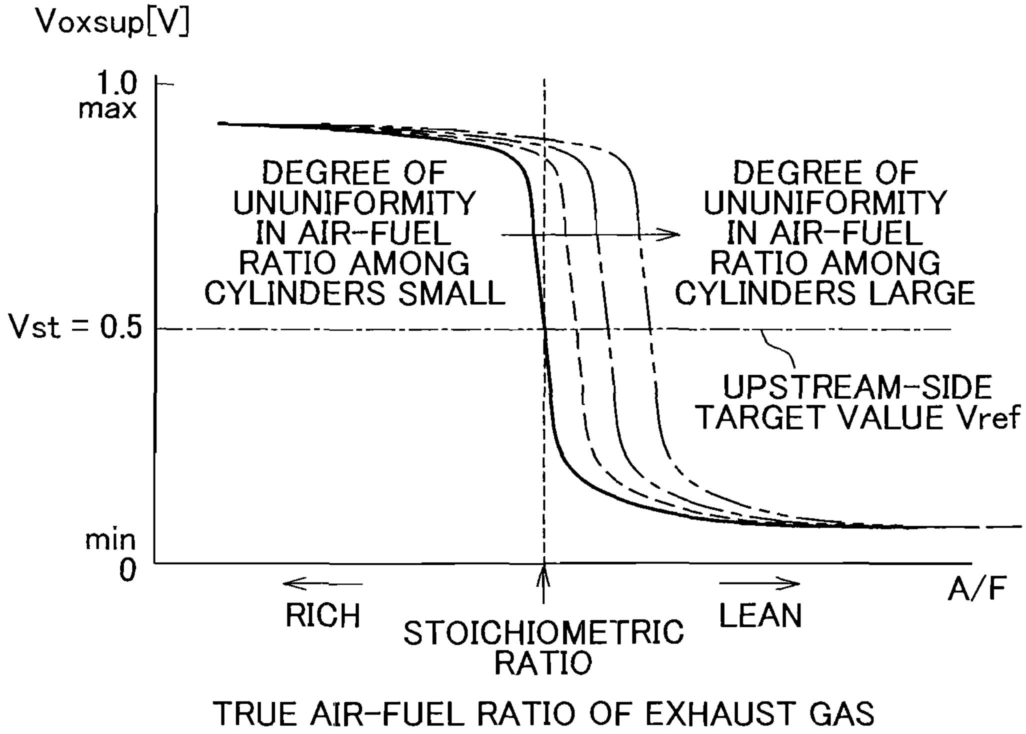
FIG. 23 is a graph relating to a modified example of the invention, and indicating the relationship between the air-fuel ratio of exhaust gas flowing into a three-way catalyst, and an output value of an air-fuel ratio sensor in the form of "an electromotive force type oxygen concentration sensor" located upstream of the three-way catalyst.

As described above, the electromotive force type oxygen concentration sensor also includes a porous layer. Accordingly, if the electromotive force type oxygen concentration sensor is placed "between the exhaust gathering portion HK and the upstream catalyst 43", the output value (denoted as Voxsup so as to be distinguished from the output value Voxs of the downstream air-fuel ratio sensor 57) of the electromotive force type oxygen concentration sensor is influenced by selective diffusion of hydrogen. Therefore, the output value Voxsup responsive to the true air-fuel ratio of exhaust gas flowing into the upstream catalyst 43 varies depending on the degree of ununiformity of the air-fuel ratio among the individual cylinders, as shown in FIG. 23.

Generally, when the electromotive force type oxygen concentration sensor is used as "the upstream air-fuel ratio sensor for main feedback control", feedback control of the air-fuel ratio is performed so that the output value Voxup becomes equal to an upstream-side target value Vref that is set to "a value Vst corresponding to the stoichiometric air-fuel ratio as a target air-fuel ratio". Accordingly, as the degree of ununiformity in the air-fuel ratio among the cylinders increases, the average of the true air-fuel ratio of exhaust gas obtained as a result of the main feedback control shifts to a leaner air-fuel ratio than the stoichiometric ratio. Namely, erroneous lean correction takes place.

Furthermore, the output value Voxsup varies depending on the intake air amount Ga and/or the engine speed NE. Accordingly, "the pre-correction air-fuel ratio imbalance index value RIMB (e.g., a value correlated with a differential value d(Voxsup)/dt) based on the output value Voxsup" which increases with increase of fluctuations in the output value Voxsup changes depending on "the intake air amount Ga and the engine speed NE" over an index value acquisition period.

Therefore, when the electromotive force type oxygen concentration sensor is used as "the upstream air-fuel ratio sensor for main feedback control", too, it is preferable to acquire a post-correction air-fuel ratio imbalance index value RIMBh, by correcting the pre-correction air-fuel ratio imbalance index value RIMB based on the output value Voxsup, based on "a intake air amount correlation value and an engine speed correlation value" over the index value acquisition period, and correct "the upstream-side target value Vref" to a value (larger than value Vst) corresponding to a richer air-fuel ratio, based on the post-correction air-fuel ratio imbalance index value RIMBh. In this manner, an influence of erroneous lean correction can be suppressed or reduced, and the amount of fuel is prevented from being excessively increased.

In the first control device and the second control device as described above, the sub-feedback amount KSFB is used for directly correcting the target air-fuel ratio abyfr. Instead of using the sub-feedback amount KSFB, "a sub-feedback amount Vafsfb calculated similarly to the sub-feedback amount KSFB" may be added to the output value Vabyfs of the upstream air-fuel ratio sensor 56, as indicated in Equation (24) below, so as to provide an output value Vabyfc for use in feedback control.

$$Vabyfc=Vabyfs+Vafsfb \tag{24}$$

Then, as indicated in Equation (25) below, the output value Vabyfc for feedback control is applied to the table Mapabyfs as shown in FIG. 7, so as to obtain an air-fuel ratio abyfsc for use in feedback control, and a main feedback amount DFi may be determined so that the air-fuel ratio abyfsc for feedback control becomes equal to "the target air-fuel ratio abyfr corrected based on the post-correction air-fuel ratio imbalance index value RIMBh". Namely, in this embodiment, the target air-fuel ratio abyfr is not directly corrected by the sub-feedback amount, but the target air-fuel ratio abyfr is substantially corrected by correcting the output value Vabyfs of the upstream air-fuel ratio sensor 56 with the sub-feedback amount.

$$abyfsc=Mapabyfs(Vabyfc) \tag{25}$$

Further, the intake air amount correlation value GaAve calculated by the first control device may be a value corresponding to the average value of the intake air amounts Ga obtained at the same time that the rate of change ΔAF is obtained. Similarly, the engine speed correlation value NEAve calculated by the first control device may be a value corresponding to the average value of the engine speeds NE obtained at the same time that the rate of change ΔAF is obtained. Also, the intake air amount correlation value GaAve may be determined based on other parameters (such as the load KL, the flow rate of exhaust gas, and the throttle opening TA) which substantially represent the intake air amount Ga.

Further, the first control device may determine whether the degree of ununiformity or imbalance in the air-fuel ratio among the cylinders is excessively large (whether a cylinder-to-cylinder air-fuel ratio imbalance condition has occurred), based on the post-correction air-fuel ratio imbalance index value RIMBh.

What is claimed is:

1. A fuel injection amount control system of a multi-cylinder internal combustion engine, comprising:

a three-way catalyst mounted at a position downstream of an exhaust gathering portion of an exhaust passage of the engine into which exhaust gases emitted from a plurality of cylinders of the multi-cylinder internal combustion engine are collected;

an upstream air-fuel ratio sensor located between the exhaust gathering portion of the exhaust passage and the three-way catalyst;

a plurality of fuel injection valves each of which is arranged to inject fuel contained in an air-fuel mixture supplied to a combustion chamber of each of said plurality of cylinders;

a designated fuel injection amount determining section that determines a designated fuel injection amount as a command value indicative of an amount of fuel injected from each of said plurality of fuel injection valves, by feedback-correcting the amount of fuel injected from said each fuel injection valve based on at least an output value of the upstream air-fuel ratio sensor, so that an air-fuel ratio of exhaust gas flowing into the three-way catalyst coincides with a target air-fuel ratio;

an injection command signal sending section that sends an injection command signal to said plurality of fuel injection valves so that the fuel is injected from said each fuel injection valve in an amount corresponding to the designated fuel injection amount;

a pre-correction index value acquiring section that acquires a pre-correction air-fuel ratio imbalance index value that increases as a degree of ununiformity in the air-fuel ratio of the air-fuel mixture supplied to the combustion chamber of each of said plurality of cylinders, among said plurality of cylinders, is larger, based on at least a value correlated with the output value of the upstream air-fuel ratio sensor; and a post-correction index value acquiring section that acquires an intake air amount correlation value that increases with increase of an intake air amount of the engine over an index value acquisition period as a period in which the pre-correction air-fuel ratio imbalance index value is acquired, and acquiring a post-correction air-fuel ratio imbalance index value by correcting the acquired pre-correction air-fuel ratio imbalance index value based on the acquired intake air amount correlation value.

2. The fuel injection amount control system according to claim 1, further comprising a fuel amount increasing section that increases the designated fuel injection amount for correction thereof, based on the post-correction air-fuel ratio imbalance index value, so that a designated air-fuel ratio as an air-fuel ratio determined by the designated fuel injection amount is reduced as the acquired post-correction air-fuel ratio imbalance index value is larger.

3. The fuel injection amount control system according to claim 1, wherein the post-correction index value acquiring section acquires an engine speed correlation value that increases with increase of an engine rotational speed of the engine over the index value acquisition period, and acquires the post-correction air-fuel ratio imbalance index value by correcting the acquired pre-correction air-fuel ratio imbalance index value, based on the acquired intake air amount correlation value and the acquired engine speed correlation value.

4. The fuel injection amount control system according to claim 3, wherein the engine speed correlation value is an average value of the engine speed correlation value over the index value acquisition period.

5. The fuel injection amount control system according to claim 1, wherein:

the pre-correction index value acquiring section is configured to obtain an air-fuel ratio fluctuation index amount that increases with increase of fluctuations in the output value of the upstream air-fuel ratio sensor, based on a value correlated with the output value, as the pre-correction air-fuel ratio imbalance index value; and the post-correction index value acquiring section is configured to acquire the post-correction air-fuel ratio imbalance index value, by correcting the acquired pre-correction air-fuel ratio imbalance index value to a smaller value as the intake air amount correlation value increases.

6. The fuel injection amount control system according to claim 5, wherein the pre-correction index value acquiring section obtains one selected from a value correlated with a differential value of the output value of the upstream air-fuel ratio sensor with respect to time, a value correlated with a differential value of a sensed air-fuel ratio represented by the output value of the upstream air-fuel ratio sensor with respect to time, a value correlated with a second-order differential value of the output value of the upstream air-fuel ratio sensor with respect to time, and a value correlated with a second-order differential value of the sensed air-fuel ratio represented by the output value of the upstream air-fuel ratio sensor with respect to time, as a basic parameter, and obtains a value correlated with the obtained basic parameter, as the pre-correction air-fuel ratio imbalance index value.

7. The fuel injection amount control system according to claim 5, wherein the pre-correction index value acquiring section obtains a value correlated with a difference between a maximum value and minimum value of the output value of the upstream air-fuel ratio sensor over a predetermined period, or a value correlated with a difference between a maximum value and minimum value of a sensed air-fuel ratio represented by the output value of the upstream air-fuel ratio sensor over a predetermined period, as the pre-correction air-fuel ratio imbalance index value.

8. The fuel injection amount control system according to claim 5, wherein the pre-correction index value acquiring section obtains a value correlated with a trace length of the output value of the upstream air-fuel ratio sensor over a predetermined period, or a value correlated with a trace length of a sensed air-fuel ratio represented by the output value of the upstream air-fuel ratio sensor over a predetermined period, as the pre-correction air-fuel ratio imbalance index value.

9. The fuel injection amount control system according to claim 1, further comprising a downstream air-fuel ratio sensor located downstream of the three-way catalyst of the exhaust passage, wherein:

the designated fuel injection amount determining section is configured to calculate a main feedback amount for feedback-correcting the designated fuel injection amount so that an air-fuel ratio represented by the output value of the upstream air-fuel ratio sensor coincides with the target air-fuel ratio, calculate a sub-feedback amount for feedback-correcting the designated fuel injection amount so that an output value of the downstream air-fuel ratio sensor coincides with a given downstream-side target value, and determine the designated fuel injection amount based on the main feedback amount and the sub-feedback amount; and the pre-correction index value acquiring section is configured to obtain a value that increases as the sub-feedback amount increases, as the pre-correction air-fuel ratio imbalance index value.

10. The fuel injection amount control system according to claim 1, wherein the intake air amount correlation value is an average value of the intake air amount over the index value acquisition period.

11. The fuel injection amount control system according to claim 1, wherein the value correlated with the output value of the upstream air-fuel ratio sensor is at least one of a differential value of the output value of the upstream air-fuel ratio sensor or a differential value of an output value obtained by subjecting the output value of the upstream air-fuel ratio sensor to high-pass filtering, and a differential value of an air-fuel ratio represented by the output value of the upstream air-fuel ratio sensor or a differential value of an air-fuel ratio represented by an output value obtained by subjecting the output value of the upstream air-fuel ratio sensor to high-pass filtering.

12. The fuel injection amount control system according to claim 1, wherein the upstream air-fuel ratio sensor includes at least one of a limiting current type air-fuel ratio sensor and an electromotive force type oxygen concentration sensor.

13. A fuel injection amount control system of a multi-cylinder internal combustion engine, comprising:

a three-way catalyst mounted at a position downstream of an exhaust gathering portion of an exhaust passage of the engine into which exhaust gases emitted from a plurality of cylinders of the multi-cylinder internal combustion engine are collected;

an upstream air-fuel ratio sensor located between the exhaust gathering portion of the exhaust passage and the three-way catalyst;

a plurality of fuel injection valves each of which is arranged to inject fuel contained in an air-fuel mixture supplied to a combustion chamber of each of said plurality of cylinders;

a designated fuel injection amount determining section that determines a designated fuel injection amount as a command value indicative of an amount of fuel injected from each of said plurality of fuel injection valves, by feedback-correcting the amount of fuel injected from said each fuel injection valve based on at least an output value of the upstream air-fuel ratio sensor, so that an air-fuel ratio of exhaust gas flowing into the three-way catalyst coincides with a target air-fuel ratio;

an injection command signal sending section that sends an injection command signal to said plurality of fuel injection valves so that the fuel is injected from said each fuel injection valve in an amount corresponding to the designated fuel injection amount;

a pre-correction index value acquiring section that acquires a pre-correction air-fuel ratio imbalance index value that increases as a degree of ununiformity in the air-fuel ratio of the air-fuel mixture supplied to the combustion chamber of each of said plurality of cylinders, among said plurality of cylinders, is larger, based on at least a value correlated with the output value of the upstream air-fuel ratio sensor;

a correlation value acquiring section that acquires an intake air amount correlation value that increases with increase of an intake air amount of the engine over an index value acquisition period as a period in which the pre-correction air-fuel ratio imbalance index value is acquired;

an intake air amount acquiring section that acquires an actual intake air amount of the engine; and a target air-fuel ratio determining section that determines the target air-fuel ratio based on the acquired pre-correction air-fuel ratio imbalance index value, the acquired intake air amount correlation value, and the acquired actual intake air amount.

14. The fuel injection amount control system according to claim 13, wherein:

the correlation value acquiring section is configured to acquire an engine speed correlation value that increases with increase of a rotational speed of the engine over the index value acquisition period; and the target air-fuel ratio determining section determines the target air-fuel ratio, based on the acquired pre-correction air-fuel ratio imbalance index value, the acquired intake air amount correlation value, the acquired actual intake air amount, and the acquired engine speed correlation value.

15. A fuel injection amount control device of a multi-cylinder internal combustion engine including: a three-way catalyst mounted at a position downstream of an exhaust gathering portion of an exhaust passage of the engine into which exhaust gases emitted from a plurality of cylinders of the multi-cylinder internal combustion engine are collected; an upstream air-fuel ratio sensor located between the exhaust gathering portion of the exhaust passage and the three-way catalyst; a plurality of fuel injection valves each of which is arranged to inject fuel contained in an air-fuel mixture supplied to a combustion chamber of each of said plurality of cylinders; a designated fuel injection amount determining section that determines a designated fuel injection amount as a command value indicative of an amount of fuel injected from each of said plurality of fuel injection valves, by feedback-correcting the amount of fuel injected from said each fuel injection valve based on at least an output value of the upstream air-fuel ratio sensor, so that an air-fuel ratio of exhaust gas flowing into the three-way catalyst coincides with a target air-fuel ratio; and an injection command signal sending section that sends an injection command signal to said plurality of fuel injection valves so that the fuel is injected from said each fuel injection valve in an amount corresponding to the designated fuel injection amount; the fuel injection amount control device comprising:

a pre-correction index value acquiring section that acquires a pre-correction air-fuel ratio imbalance index value that increases as a degree of ununiformity in the air-fuel ratio of the air-fuel mixture supplied to the combustion chamber of each of said plurality of cylinders, among said plurality of cylinders, is larger, based on at least a value correlated with the output value of the upstream air-fuel ratio sensor; and a post-correction index value acquiring section that acquires an intake air amount correlation value that increases with increase of an intake air amount of the engine over an index value acquisition period as a period in which the pre-correction air-fuel ratio imbalance index value is acquired, and acquiring a post-correction air-fuel ratio imbalance index value by correcting the acquired pre-correction air-fuel ratio imbalance index value based on the acquired intake air amount correlation value.

16. A fuel injection amount control device of a multi-cylinder internal combustion engine including: a three-way catalyst mounted at a position downstream of an exhaust gathering portion of an exhaust passage of the engine into which exhaust gases emitted from a plurality of cylinders of the multi-cylinder internal combustion engine are collected; an upstream air-fuel ratio sensor located between the exhaust gathering portion of the exhaust passage and the three-way catalyst; a plurality of fuel injection valves each of which is arranged to inject fuel contained in an air-fuel mixture supplied to a combustion chamber of each of said plurality of cylinders; a designated fuel injection amount determining section that determines a designated fuel injection amount as a command value indicative of an amount of fuel injected from each of said plurality of fuel injection valves, by feedback-correcting the amount of fuel injected from said each fuel injection valve based on at least an output value of the upstream air-fuel ratio sensor, so that an air-fuel ratio of exhaust gas flowing into the three-way catalyst coincides with a target air-fuel ratio; and an injection command signal sending section that sends an injection command signal to said plurality of fuel injection valves so that the fuel is injected from said each fuel injection valve in an amount corresponding to the designated fuel injection amount; the fuel injection amount control device comprising:

a pre-correction index value acquiring section that acquires a pre-correction air-fuel ratio imbalance index value that increases as a degree of ununiformity in the air-fuel ratio of the air-fuel mixture supplied to the combustion chamber of each of said plurality of cylinders, among said plurality of cylinders, is larger, based on at least a value correlated with the output value of the upstream air-fuel ratio sensor;

a correlation value acquiring section that acquires an intake air amount correlation value that increases with increase of an intake air amount of the engine over an index value acquisition period as a period in which the pre-correction air-fuel ratio imbalance index value is acquired;

an intake air amount acquiring section that acquires an actual intake air amount of the engine; and a target air-fuel ratio determining section that determines the target air-fuel ratio based on the acquired pre-correction air-fuel ratio imbalance index value, the acquired intake air amount correlation value, and the acquired actual intake air amount.

* * * * *